(12) United States Patent
Adornato et al.

(10) Patent No.: US 8,712,857 B1
(45) Date of Patent: Apr. 29, 2014

(54) METHODS AND APPARATUS FOR INTELLIGENT SELECTION OF GOODS AND SERVICES IN MOBILE COMMERCE

(75) Inventors: Rocco L. Adornato, Omaha, NE (US); David C. Mussman, Omaha, NE (US)

(73) Assignee: Tuxis Technologies LLC, Jersey City, NJ (US)

( * ) Notice: Subject to any disclaimer, the term of this patent is extended or adjusted under 35 U.S.C. 154(b) by 2616 days.

(21) Appl. No.: 10/675,934

(22) Filed: Sep. 30, 2003

Related U.S. Application Data

(63) Continuation-in-part of application No. 10/403,822, filed on Mar. 31, 2003.

(51) Int. Cl.
*G06Q 30/00* (2012.01)

(52) U.S. Cl.
USPC .............................. 705/26; 705/27

(58) Field of Classification Search
USPC ............................... 705/14, 26, 27
See application file for complete search history.

(56) References Cited

U.S. PATENT DOCUMENTS

| | | | |
|---|---|---|---|
| 4,195,864 A | 4/1980 | Morton et al. | |
| 4,706,121 A | 11/1987 | Young | |
| 4,758,823 A * | 7/1988 | Berruyer et al. | 340/524 |
| 4,792,968 A | 12/1988 | Katz | |
| 4,799,156 A | 1/1989 | Shavit | |
| 4,812,628 A | 3/1989 | Boston | |
| 4,825,045 A | 4/1989 | Humble | |
| 4,833,308 A | 5/1989 | Humble | |
| 4,845,658 A | 7/1989 | Gifford | |
| 4,845,739 A | 7/1989 | Katz | |

(Continued)

FOREIGN PATENT DOCUMENTS

| CA | 2222229 | 11/1997 |
|---|---|---|
| EP | 0265083 A1 | 9/1987 |

(Continued)

OTHER PUBLICATIONS

Schwartau, Winn; "New Keys to Network Security"; InfoWorld; San Mateo; May 15, 1995; vol. 17 Iss 20; p. 51, 2 pgs.*

(Continued)

*Primary Examiner* — Garcia Ade
(74) *Attorney, Agent, or Firm* — Lerner, David, Littenberg, Krumholz & Mentlik, LLP

(57) ABSTRACT

Methods for providing an offer of an upsell item to users of a given self-service device, and systems and computer-readable media suitable for practicing the methods. The method can comprise enabling initiation of a given primary transaction between a given user and the given self-service device, with the given primary transaction involving a specific good and/or a specific service that is obtained using the given self-service device. The given user is identified, and the geographic location of the given user when initiating the given primary transaction is established. A second data element relating to the given user is obtained utilizing data representing the identity of the given user. The upsell item is determined utilizing, at least in part, the second data element and data representing the geographic position of the given user. The upsell item is then offered to the given user. Illustrative self-service devices can include devices that enable the user to obtain commodities such as gasoline, cash, snacks, drinks, paper items, or the like. Further aspects of the invention project the user's future position, arrival times, and anticipated needs based on primary transaction data and further data related to the user.

157 Claims, 12 Drawing Sheets

(56) References Cited

U.S. PATENT DOCUMENTS

| | | |
|---|---|---|
| 4,870,579 A | 9/1989 | Hey |
| 4,908,761 A | 3/1990 | Tai |
| 4,910,672 A | 3/1990 | Off |
| 4,947,028 A | 8/1990 | Gorog |
| 4,967,366 A | 10/1990 | Kaehler |
| 4,992,940 A | 2/1991 | Dworkin |
| 4,996,642 A | 2/1991 | Hey |
| 5,010,485 A | 4/1991 | Bigari |
| 5,053,957 A | 10/1991 | Suzuki |
| 5,056,019 A | 10/1991 | Schultz |
| 5,173,851 A | 12/1992 | Off et al. |
| 5,201,010 A | 4/1993 | Deaton |
| 5,209,665 A | 5/1993 | Billings |
| 5,231,571 A | 7/1993 | D'Agostino |
| 5,235,509 A | 8/1993 | Mueller |
| 5,237,620 A | 8/1993 | Deaton |
| 5,270,920 A | 12/1993 | Pearse |
| 5,293,615 A | 3/1994 | Amada |
| 5,295,064 A | 3/1994 | Malec |
| 5,305,196 A | 4/1994 | Deaton |
| 5,319,542 A | 6/1994 | King, Jr. |
| 5,327,508 A | 7/1994 | Deaton |
| 5,353,218 A | 10/1994 | De Lapa |
| 5,353,219 A | 10/1994 | Mueller |
| 5,369,571 A | 11/1994 | Metts |
| 5,388,165 A | 2/1995 | Deaton |
| 5,398,186 A * | 3/1995 | Nakhla ............ 701/16 |
| 5,412,708 A | 5/1995 | Katz |
| 5,430,644 A | 7/1995 | Deaton |
| 5,442,771 A | 8/1995 | Filepp et al. |
| 5,446,891 A | 8/1995 | Kaplan et al. |
| 5,448,471 A | 9/1995 | Deaton |
| 5,459,306 A | 10/1995 | Stein |
| 5,481,094 A | 1/1996 | Suda |
| 5,481,294 A | 1/1996 | Thomas |
| 5,483,278 A | 1/1996 | Strubbe et al. |
| 5,490,060 A | 2/1996 | Malec |
| 5,495,284 A | 2/1996 | Katz |
| 5,500,681 A | 3/1996 | Jones |
| 5,502,368 A | 3/1996 | Syverson et al. |
| 5,502,636 A | 3/1996 | Clarke |
| 5,504,675 A | 4/1996 | Cragun |
| 5,532,735 A | 7/1996 | Blahut et al. |
| 5,535,130 A | 7/1996 | Long |
| 5,537,590 A | 7/1996 | Amado |
| 5,566,353 A | 10/1996 | Cho |
| 5,576,951 A | 11/1996 | Lockwood |
| 5,583,763 A | 12/1996 | Atcheson |
| 5,592,378 A | 1/1997 | Cameron et al. |
| 5,592,560 A | 1/1997 | Deaton |
| 5,612,868 A | 3/1997 | Off |
| 5,615,342 A | 3/1997 | Johnson |
| 5,615,408 A | 3/1997 | Johnson et al. |
| 5,621,812 A | 4/1997 | Deaton |
| 5,625,276 A | 4/1997 | Scott et al. |
| 5,625,776 A | 4/1997 | Johnson |
| 5,630,068 A | 5/1997 | Vela |
| 5,631,544 A | 5/1997 | Syverson et al. |
| 5,636,346 A | 6/1997 | Saxe |
| 5,638,457 A | 6/1997 | Deaton |
| 5,642,485 A | 6/1997 | Deaton |
| 5,644,723 A | 7/1997 | Deaton |
| 5,649,114 A | 7/1997 | Deaton |
| 5,659,469 A | 8/1997 | Deaton |
| 5,675,662 A | 10/1997 | Deaton |
| 5,679,940 A | 10/1997 | Templeton |
| 5,687,322 A | 11/1997 | Deaton |
| 5,689,553 A | 11/1997 | Ahuja |
| 5,701,400 A | 12/1997 | Amado |
| 5,710,887 A | 1/1998 | Chelliah |
| 5,715,399 A | 2/1998 | Bezos |
| 5,717,923 A * | 2/1998 | Dedrick ............ 1/1 |
| 5,721,583 A | 2/1998 | Harada et al. |
| 5,721,832 A | 2/1998 | Westrope |
| 5,727,163 A | 3/1998 | Bezos |
| 5,732,265 A | 3/1998 | Dewitt et al. |
| 5,732,398 A | 3/1998 | Tagawa |
| 5,732,400 A | 3/1998 | Mandler |
| 5,740,035 A | 4/1998 | Cohen |
| 5,740,252 A | 4/1998 | Minor |
| 5,740,549 A | 4/1998 | Reilly |
| 5,742,929 A | 4/1998 | Kallman |
| 5,745,681 A | 4/1998 | Levine |
| 5,748,907 A | 5/1998 | Crane |
| 5,748,908 A | 5/1998 | Yu |
| 5,749,081 A | 5/1998 | Whiteis |
| 5,754,938 A | 5/1998 | Herz et al. |
| 5,758,257 A | 5/1998 | Herz |
| 5,758,328 A | 5/1998 | Giovannoli |
| 5,761,601 A | 6/1998 | Nemirofsky |
| 5,774,670 A | 6/1998 | Montulli |
| 5,774,868 A | 6/1998 | Cragun et al. |
| 5,778,178 A | 7/1998 | Arunachalam |
| 5,780,133 A | 7/1998 | Engstrom |
| 5,790,793 A | 8/1998 | Higley |
| 5,790,935 A | 8/1998 | Payton |
| 5,794,207 A | 8/1998 | Walker |
| 5,794,209 A | 8/1998 | Agrawal |
| 5,796,967 A | 8/1998 | Filepp et al. |
| 5,806,045 A | 9/1998 | Biorge et al. |
| 5,815,665 A | 9/1998 | Teper et al. |
| 5,821,513 A | 10/1998 | O'Hagan |
| 5,826,240 A | 10/1998 | Brockman |
| 5,838,314 A | 11/1998 | Neel |
| 5,842,199 A | 11/1998 | Miller et al. |
| 5,845,263 A | 12/1998 | Camaisa |
| 5,848,396 A | 12/1998 | Gerace |
| 5,855,008 A | 12/1998 | Goldhaber |
| 5,857,175 A | 1/1999 | Day |
| 5,870,721 A | 2/1999 | Norris |
| 5,870,724 A | 2/1999 | Lawlor |
| 5,873,068 A | 2/1999 | Beaumont et al. |
| 5,878,401 A | 3/1999 | Joseph |
| 5,878,403 A | 3/1999 | DeFrancesco |
| 5,890,137 A | 3/1999 | Koreeda |
| 5,893,075 A | 4/1999 | Plainfield |
| 5,905,973 A | 5/1999 | Yonezawa |
| 5,905,974 A | 5/1999 | Fraser |
| 5,909,492 A | 6/1999 | Payne |
| 5,914,472 A | 6/1999 | Foladare |
| 5,915,243 A | 6/1999 | Smolen |
| 5,918,213 A | 6/1999 | Bernard |
| 5,926,796 A | 7/1999 | Walker |
| 5,933,811 A | 8/1999 | Angles et al. |
| 5,937,390 A | 8/1999 | Hyodo |
| 5,940,495 A | 8/1999 | Bondarenko |
| 5,940,809 A | 8/1999 | Musmanno |
| 5,948,061 A | 9/1999 | Merriman |
| 5,970,469 A | 10/1999 | Scroggie et al. |
| 5,970,473 A | 10/1999 | Gerszberg |
| 5,983,069 A | 11/1999 | Cho |
| 5,991,735 A | 11/1999 | Gerace |
| 5,999,914 A | 12/1999 | Blinn et al. |
| 6,009,411 A | 12/1999 | Kepecs |
| 6,010,669 A | 1/2000 | Miola et al. |
| 6,014,634 A | 1/2000 | Scroggie |
| 6,014,638 A * | 1/2000 | Burge et al. .............. 705/7.29 |
| 6,018,578 A | 1/2000 | Bondarenko |
| 6,018,715 A | 1/2000 | Lynch et al. |
| 6,020,883 A | 2/2000 | Herz |
| 6,026,370 A | 2/2000 | Jermyn |
| 6,029,141 A | 2/2000 | Bezos |
| 6,029,149 A | 2/2000 | Dykstra |
| 6,035,288 A | 3/2000 | Solomon |
| 6,055,513 A | 4/2000 | Katz |
| 6,064,980 A | 5/2000 | Jacobi |
| 6,064,987 A | 5/2000 | Walker |
| 6,075,551 A | 6/2000 | Berezowski |
| 6,078,896 A | 6/2000 | Kaehler |
| 6,081,788 A | 6/2000 | Appleman |
| 6,085,164 A | 7/2000 | Smith |
| 6,086,477 A | 7/2000 | Walker |
| 6,088,686 A | 7/2000 | Walker |
| 6,088,722 A | 7/2000 | Herz |

(56) References Cited

U.S. PATENT DOCUMENTS

| | | | |
|---|---|---|---|
| 6,091,956 A * | 7/2000 | Hollenberg | ............... 455/456.5 |
| 6,108,493 A | 8/2000 | Miller | |
| 6,112,186 A | 8/2000 | Bergh | |
| 6,113,493 A | 9/2000 | Walker et al. | |
| 6,119,099 A | 9/2000 | Walker | |
| 6,125,356 A | 9/2000 | Brockman | |
| 6,128,663 A | 10/2000 | Thomas | |
| 6,134,309 A | 10/2000 | Carson | |
| 6,134,532 A | 10/2000 | Lazarus | |
| 6,135,349 A | 10/2000 | Zirkel | |
| 6,138,911 A | 10/2000 | Fredregill | |
| 6,144,944 A | 11/2000 | Kurtzman | |
| 6,144,948 A | 11/2000 | Walker et al. | |
| 6,161,059 A | 12/2000 | Tedesco et al. | |
| 6,161,103 A | 12/2000 | Rauer | |
| 6,167,383 A | 12/2000 | Henson | |
| 6,169,542 B1 | 1/2001 | Hooks | |
| 6,169,985 B1 | 1/2001 | Almgren | |
| 6,185,558 B1 | 2/2001 | Bowman | |
| 6,196,458 B1 | 3/2001 | Walker | |
| 6,198,739 B1 | 3/2001 | Neyman | |
| 6,199,762 B1 | 3/2001 | Hohle | |
| 6,202,334 B1 | 3/2001 | Reynolds | |
| 6,216,111 B1 | 4/2001 | Walker et al. | |
| 6,223,163 B1 | 4/2001 | Van Luchene | |
| 6,226,624 B1 | 5/2001 | Watson | |
| 6,236,978 B1 | 5/2001 | Tuzhilin | |
| 6,248,946 B1 | 6/2001 | Dwek | |
| 6,256,614 B1 | 7/2001 | Wecker | |
| 6,266,649 B1 | 7/2001 | Linden | |
| 6,266,668 B1 | 7/2001 | Vanderveldt | |
| 6,282,548 B1 | 8/2001 | Burner et al. | |
| 6,298,331 B1 | 10/2001 | Walker | |
| 6,298,348 B1 | 10/2001 | Eldering | |
| 6,314,089 B1 | 11/2001 | Szlam | |
| 6,317,718 B1 | 11/2001 | Fano | |
| 6,317,722 B1 | 11/2001 | Jacobi et al. | |
| 6,317,723 B1 | 11/2001 | Walker | |
| 6,321,221 B1 | 11/2001 | Bieganski | |
| 6,330,548 B1 | 12/2001 | Walker | |
| 6,332,126 B1 | 12/2001 | Peirce | |
| 6,334,112 B1 | 12/2001 | Walker | |
| 6,334,113 B1 | 12/2001 | Walker | |
| 6,334,127 B1 | 12/2001 | Bieganski | |
| 6,336,099 B1 | 1/2002 | Barnett et al. | |
| 6,336,104 B1 | 1/2002 | Walker | |
| 6,337,904 B1 | 1/2002 | Gisby | |
| 6,351,736 B1 | 2/2002 | Weisberg | |
| 6,353,390 B1 | 3/2002 | Beri | |
| 6,356,838 B1 | 3/2002 | Paul | |
| 6,369,840 B1 | 4/2002 | Barnett | |
| 6,381,583 B1 | 4/2002 | Kenney | |
| 6,389,337 B1 | 5/2002 | Kolls | |
| 6,397,057 B1 | 5/2002 | Malackowski | |
| 6,397,193 B1 | 5/2002 | Walker | |
| 6,405,174 B1 | 6/2002 | Walker | |
| 6,405,181 B2 | 6/2002 | Lent et al. | |
| 6,424,706 B1 | 7/2002 | Katz et al. | |
| 6,424,949 B1 | 7/2002 | Deaton | |
| 6,434,231 B2 | 8/2002 | Neyman | |
| 6,434,532 B2 | 8/2002 | Goldband | |
| 6,434,534 B1 | 8/2002 | Walker et al. | |
| 6,460,036 B1 | 10/2002 | Herz | |
| 6,501,832 B1 | 12/2002 | Saylor | |
| 6,505,619 B2 | 1/2003 | Hulm | |
| 6,526,335 B1 | 2/2003 | Treyz et al. | |
| 6,543,209 B1 | 4/2003 | Siegel et al. | |
| 6,546,193 B1 | 4/2003 | Um | |
| 6,553,178 B2 | 4/2003 | Abecassis | |
| 6,567,787 B1 | 5/2003 | Walker | |
| 6,571,279 B1 | 5/2003 | Herz | |
| 6,574,614 B1 | 6/2003 | Kesel | |
| 6,598,024 B1 | 7/2003 | Walker | |
| 6,598,026 B1 | 7/2003 | Ojha et al. | |
| 6,650,758 B1 * | 11/2003 | Van Schyndel | ............... 381/97 |
| 6,665,837 B1 | 12/2003 | Dean | |
| 6,671,879 B1 | 12/2003 | Schlarb | |
| 6,694,300 B1 | 2/2004 | Walker | |
| 6,698,020 B1 | 2/2004 | Zigmond | |
| 6,701,317 B1 | 3/2004 | Wiener | |
| 6,704,727 B1 | 3/2004 | Kravets | |
| 6,718,551 B1 | 4/2004 | Swix | |
| 6,756,997 B1 | 6/2004 | Ward, III | |
| 6,760,727 B1 | 7/2004 | Schroeder et al. | |
| 6,773,351 B2 | 8/2004 | Brown | |
| 6,782,370 B1 | 8/2004 | Stack | |
| 6,813,777 B1 | 11/2004 | Weinberger et al. | |
| 6,823,319 B1 | 11/2004 | Lynch | |
| 6,942,143 B1 | 9/2005 | Iida et al. | |
| 6,950,986 B1 | 9/2005 | Jacobi, Jr. et al. | |
| 6,954,732 B1 | 10/2005 | DeLapa et al. | |
| 7,016,864 B1 | 3/2006 | Notz et al. | |
| 7,054,830 B1 | 5/2006 | Eggleston et al. | |
| 7,072,849 B1 | 7/2006 | Filepp et al. | |
| 7,117,172 B1 | 10/2006 | Black | |
| 7,167,711 B1 * | 1/2007 | Dennis | ............... 455/456.1 |
| 7,233,912 B2 | 6/2007 | Walker et al. | |
| 7,249,050 B1 | 7/2007 | Walker et al. | |
| 7,356,486 B2 | 4/2008 | Sullivan et al. | |
| 7,386,485 B1 | 6/2008 | Mussman et al. | |
| 7,427,233 B2 | 9/2008 | Walker et al. | |
| 7,437,313 B1 | 10/2008 | Mussman | |
| 7,472,074 B1 | 12/2008 | Walker et al. | |
| 7,509,274 B2 | 3/2009 | Kam et al. | |
| 7,792,702 B1 | 9/2010 | Katz et al. | |
| 7,822,647 B1 | 10/2010 | Mussman et al. | |
| 7,822,847 B2 | 10/2010 | Kusama et al. | |
| 7,853,488 B1 | 12/2010 | Mussman et al. | |
| 8,078,503 B1 | 12/2011 | Mussman et al. | |
| 2001/0012439 A1 | 8/2001 | Young et al. | |
| 2001/0014868 A1 | 8/2001 | Herz | |
| 2001/0032137 A1 | 10/2001 | Bennett | |
| 2001/0034718 A1 | 10/2001 | Shaked et al. | |
| 2001/0037288 A1 | 11/2001 | Bennett | |
| 2001/0039516 A1 | 11/2001 | Bennett | |
| 2001/0042016 A1 | 11/2001 | Muyres et al. | |
| 2001/0044742 A1 | 11/2001 | Ko et al. | |
| 2001/0047307 A1 | 11/2001 | Bennett | |
| 2002/0012428 A1 | 1/2002 | Neyman | |
| 2002/0023272 A1 | 2/2002 | Pocock | |
| 2002/0026351 A1 | 2/2002 | Coleman | |
| 2002/0026394 A1 | 2/2002 | Savage | |
| 2002/0026478 A1 | 2/2002 | Rodgers et al. | |
| 2002/0026496 A1 | 2/2002 | Boyer | |
| 2002/0046124 A1 | 4/2002 | Alderucci | |
| 2002/0055906 A1 | 5/2002 | Katz et al. | |
| 2002/0077960 A1 | 6/2002 | Kiely | |
| 2002/0091632 A1 | 7/2002 | Turock | |
| 2002/0111867 A1 | 8/2002 | Walker | |
| 2002/0116260 A1 | 8/2002 | Szabo | |
| 2002/0116282 A1 | 8/2002 | Martin | |
| 2002/0120496 A1 | 8/2002 | Scroggie et al. | |
| 2002/0120519 A1 | 8/2002 | Martin | |
| 2002/0169687 A1 | 11/2002 | Perkowski | |
| 2002/0188511 A1 | 12/2002 | Johnson | |
| 2003/0130904 A1 | 7/2003 | Katz et al. | |
| 2003/0172000 A1 | 9/2003 | Foster | |
| 2003/0196204 A1 | 10/2003 | Thiagarajan | |
| 2003/0229897 A1 | 12/2003 | Frisco | |
| 2004/0019900 A1 | 1/2004 | Knightbridge | |
| 2004/0143838 A1 | 7/2004 | Rose | |
| 2005/0018574 A1 | 1/2005 | Jenkins et al. | |
| 2005/0132404 A1 | 6/2005 | Clapp | |

FOREIGN PATENT DOCUMENTS

| | | |
|---|---|---|
| EP | 0751471 A1 | 1/1997 |
| EP | 0827063 B1 | 11/2002 |
| GB | 2336925 A | 11/1999 |
| WO | 9421084 A1 | 9/1994 |
| WO | WO 94/21084 | 9/1994 |
| WO | 9721183 A1 | 6/1997 |
| WO | WO 97/20279 | 6/1997 |
| WO | WO 97/21183 | 6/1997 |

(56) References Cited

FOREIGN PATENT DOCUMENTS

| | | |
|---|---|---|
| WO | WO 98/33135 | 7/1998 |
| WO | WO 98/34189 | 8/1998 |
| WO | WO 98/40832 | 9/1998 |
| WO | WO 98/43149 | 10/1998 |
| WO | WO 98/44699 | 10/1998 |
| WO | WO 98/53406 | 11/1998 |
| WO | WO 98/58334 | 12/1998 |
| WO | WO 99/06914 | 2/1999 |
| WO | WO 99/10794 | 3/1999 |
| WO | WO 99/11006 | 3/1999 |
| WO | WO 99/11007 | 3/1999 |
| WO | WO 99/13424 | 3/1999 |
| WO | WO 99/19809 | 4/1999 |
| WO | WO 99/46706 | 9/1999 |
| WO | WO 99/66438 | 12/1999 |
| WO | WO 00/00916 | 1/2000 |
| WO | WO 00/10069 | 2/2000 |
| WO | WO 00/21005 | 4/2000 |
| WO | WO 00/33222 | 6/2000 |
| WO | WO 00/34910 | 6/2000 |
| WO | WO 00/38122 | 6/2000 |
| WO | WO 00/46720 | 8/2000 |
| WO | WO 00/51050 | 8/2000 |
| WO | WO 01/24032 A2 | 4/2001 |
| WO | WO 01/37183 A1 | 5/2001 |
| WO | WO 01/37193 A1 | 5/2001 |
| WO | WO 01/71683 | 9/2001 |
| WO | WO 01/93119 A1 | 12/2001 |
| WO | WO 02/05122 A2 | 1/2002 |
| WO | WO 92/08997 | 1/2002 |
| WO | WO 02/19203 A2 | 3/2002 |
| WO | WO 02/25909 A2 | 3/2002 |

OTHER PUBLICATIONS

"Amtech Corp. Shares Plummet After Losing 3-State Bid"; Austin American Statesman; Austin, Tex; Mar. 22, 1994; p. E.7.*
Freeman, Laurie; "Supermarkets Sift Through Data"; Advertising Age. (Midwest region edition); Chicago; Oct. 10, 1994. vol. 65, Iss. 43; p. S16, 1 pgs.*
Simon Calder; "Free Ticket From Timeshare Offer Scam"; The Independent; London (UK); Jul. 8, 1995, p. 17.*
Anonymous; "Debit Goes to Dinner"; Credit Card Management; New York; Oct. 1994; vol. 7, Iss 7, p. 20, 2 pgs.*
Nicholas Booth; "Bargains Galore at the Sale of the New Century"; The Times; London (UK); Jan. 7, 1998; p. Interfa.*
Kristi Heim; "Smart Cards Could Present Privacy Threat"; Asian Wall Street Journal; New York, N.Y.; Mar. 9, 1998; p. 1.*
Santi, Albert, Encyclopedia of Mortgage and Real Estate Fiance, Jan. 1998, Mortgage Bankers Association of America's Real Estate Finance Press, Revised Edition, pp. 213 & 218.
Levine, Kay. Anchorage Daily News. Troubleshooter; [Final Edition 30]. Anchorage, Alaska. Jul. 16, 1991. p. B.2.
Geller, Lois. Direct Marketing "10 ways to joggle you out of your direct marketing doldrums". Garden City. Feb. 1998. vol. 60, Iss. 10. p. 18, 4 pgs.
Whelan, Carolyn. Electronic News. "DirectV chooses ATI after AT&T deal folds". New York, Dec. 15, 1997. vol. 43, Iss. 2198. p. 44. 1 pgs.
Stern, Linda. Home Office Computing. "Save $60K this year". Boulder. Jan. 1998. vol. 16, Iss. 1. p. 58, 6 pgs.
Kislik, Elizabeth. Catalog Age. "Beyond the thought that counts". New Canaan. Jul. 1997, vol. 14, Iss. 7, p. 199, 2 pgs.
Galvin, Brian. Telemarketing & Call Center Solutions. "Focus On: The Inbound call center outlook-how emerging technologies will change your business". Norwalk. Apr. 1997, vol. 15, Iss. 10. p. 24, 5 pgs.
Reilly, Brian. Advertising Age's Business Marketing "Upselling strategies hit the net". Chicago. Dec. 1996. vol. 81, Iss. 10. p. M1, 2 pgs.
M2 Presswire. "FIJITSU: Fijitsu introduces developer's toolkit for Edify Electronic Workforce platform". Coventry. Mar. 3, 1998. p. 1.

CNN, Software to Limit Tracking Cell Phone Users, www.cnn.com, Jan. 19, 2004.
Tedeschi, Bob, E-Commerce Report; Demand Among Marketers for Advertistng Next to Search Results Could Soon Outpace Supply, The New York Times, Jul. 19, 2004.
CMF: Associated Press; "Telemarketing Firm Agrees to Alter Sales Policy," Times Union, Sep. 19, 2002, 2 pgs.
Bloomberg; "Web Sites Help Consumers Shop for Hard-to-find Credit Card Deals," Las Vegas Journal, Feb. 28, 1999, 3 pgs.
Fitzgerald, Kate; "Putting Tech into Telemarketing," Credit Card Management, Jul. 1999, v12n4pg34, 8 pgs.
CMF: Lumpur, Kuala; "Credit Card Ties Up With Alumni Life," Jan. 2, 1996, 2 pgs.
Meece, Mickey; "Fertile Sales Turf: Fee-Based Card Services Memberworks' Gary Johnson Counts the Way He Can Sell to Cardholders," American Banker, v162n68pg15, 4 pgs.
Steel, James; "Combating Counterfeit Credit Cards: The Technological Challe," Credit World, May/Jun. 1995, v86n5pg16, 3 pgs.
Throne, Adam; "Capital One's Call Center Soars to New Heights," Call Center Magazine, Mar. 2001, v14n3pg84, 4 pgs.
Nett, Walt, Sweet Deals Can Lull The Unaware Credit Card User, Arizona Daily Star, Jun. 19, 1994, p. 1.D.
Gaither, Chris, Google Designs an Engine for Eggheads, Los Angeles Times, Oct. 27, 2004.
Lisa Chiranky, Web Power: Taking Call Centers to New Dimensions, Internet & Call Center Solutions, www.tmcnet.com, 1997.
Bruce Moxon, Data Mining: Tthe Golden Promise, www.oreview.com, 1997, pp. 1-14.
Nielson Media Research, Who We Are and What We Do, www.nielsenmedia.com.
Christopher Elliott, Hotels Get Pushy About Their Loyalty Programs, The New York Times, Jun. 1, 2004, p. C7.
U.S. Appl. No. 09/505,619, filed Feb. 16, 2002, Ronald A. Katz.
Peppers, et al., The One to One Future Building Relationships One Customer at a Time, copyright 1993, 1996, pp. 3-17; 40-43.
Tehrani, Nadji, Hardware, software . . . humanware, Telemarketing & Call Center Solutions; Norwalk, Sep. 1997.
Knapp, Adam L., Tracking Urban Nomads, www.omnisky.com.
Meeks, Fleming, The Future of the Future, Barron's, Nov. 13, 2000, pp. V5-V6, V8.
Fano, Andrew, Shopper's Eye: Using Location-based Filtering for a Shopping Agent in the Physical World, Second International Conference on Autonomous Agents, 1998.
Binkley, Christina, Soon, the Desk Clerk Will Know All About You, Wall Street Journal, May 8, 2003, p. D4.
Markoff, John, In Searching the Web, Google Finds Riches, The New York Times, Money and Business/Financial Desk, Apr. 13, 2003.
Bruno, Michael, MicroCreditCard to Launch Micro Payment Service, www.washtech.com, Aug. 29, 2000.
Business Logic, Documents from www.blogicsys.com, Sep. 16, 2002.
Be Free, Documents from www.befree.com, Sep. 18, 2002.
SAS, Documents from www. sas.com, Sep. 16, 2002.
Amdocs, Documents from www. amdocs.com, Sep. 18, 2002.
Miva, Documents from www.miva.com, Sep. 18, 2002.
E.Piphany, Documents from www.epiphany.com, Sep. 18, 2002.
Cycorp, Documents from www.cyc.com, Sep. 18, 2002.
Acxiom, Documents from www. acxiom.com, Sep. 18, 2002.
KPMG Consulting, Documents from www.kpmgconsulting.com, Sep. 18, 2002.
SkyGo, Documents from www.skygo.com, Mar. 16, 2001.
Business Objects, Documents from www.businessobjects.com, Sep. 18, 2002.
Convergys, Documents from www.convergys.com, Oct. 8, 2002.
Active Decisions, Documents from www2.activebuyersguide.com, Sep. 17, 2002.
Click2Boost, Documents from www.click2boost.com. Sep. 17, 2002.
ACTV, Inc., Documents from www.actv.com, Apr. 23, 2002.
DoubleClick, Documents from www.doubleclick.com, Sep. 16, 2002.
Gemstar-TV, Documents from www.gemstartvguide.com, Dec. 14, 2001.

(56) References Cited

OTHER PUBLICATIONS

GoldPocket, Documents from www.goldpocket.com, Sep. 17, 2002.
Wink, Documents from www.wink.com, Sep. 16, 2002.
Christopher Helman, Now Hear This, Forbes, Sep. 15, 2003, vol. 172, No. 5, Forbes, Inc., New York, United States.
Kuffel, Chris, Mobile Commerce: Money Keeps Rolling In, International Herald Tribune, Oct. 13, 2003.
Able Solutions, Able Solutions Announces AbleCommerce 2.6, PR Newswire, Sep. 15, 1998.
Net Perceptions, Inc., Building Customer Loyalty and High-Yield Relationships Through GroupLens Collaborative Filtering, White Paper, Nov. 19, 1996.
Resnick, Paul, GroupLens: An Open Architecture for Collaborative Filtering of Netnews, Proceedings of ACM 1994 Conference on Computer Supported Cooperative Work, pp. 175-186.
Miller, Bradley N., Experiences with GroupLens: Making Usenet Useful Again, University of Minnesota, Abstract.
Nash, Edward L., Direct Marketing, Strategy, Planning, Execution, Third Edition McGraw-Hill, Inc., 1995, pp. 164-165, 364-367.
Avery, Christopher, Recommender Systems for Evaluating Computer Messages, Communications from the ACM, Mar. 1997, pp. 88-89, vol. 40, No. 3.
Balabanovic, Marko, Fab: Content-Based, Collaborative Recommendation, Communications of the ACM, Mar. 1997, pp. 66-72, vol. 40, No. 3.
Brier, Steven E., Smart Devices Peep Into Your Grocery Cart, New York Times, Jul. 16, 1998, section G, p. 3, col. 3.
Terveen, Loren, Phoaks: A System for Sharing Recommendations, Communications of the ACM, Mar. 1997, pp. 59-62, vol. 40, No. 3.
Shardanand, Upendra, Social Information Filtering: Algorithms for Automating "Word of Mouth", MIT Media-Lab, Abstract.
Rucker, James, Siteseer: Personalized Navigation for the Web, Communications of the ACM, Mar. 1997, pp. 73-76, vol. 40, No. 3.
Maltz, David, Pointing the Way: Active Collaborative Filtering, CHI '95 Proceedings, 1995, Abstract.
McMains, Andrew, Weiss, Whitten, Stagliano's, Adweek Eastern Edition, p. 82, vol. 39, No. 24.
iCat, iCat Electronic Commerce Suite Takes "Best of Show" Award at WebINNOVATION 97, PR Newswire, Jun. 24, 1997.
iCat, iCat's Commerce Suite Makes Setting up Shop on the 'net Even Easier Than High Street, M2 Presswire, Feb. 19, 1997.
Internet World, IBM to Expand E-Comm Features, Newsbytes News Network, Dec. 16, 1996.
Kautz, Henry, Referral Web: Combining Social Networks and Collaborative Filtering, Communications of the ACM, Mar. 1997, pp. 63-65, vol. 40, No. 3.
Konstan, Joseph A., GroupLens: Applying Collaborative Filtering to Usenet News, Communications of the ACM, Mar. 1997, pp. 77-78, vol. 40, No. 3.
Green, Heather, The Information Gold Mine, Business Week e.biz.
Baran, Paul, Some Changes in Information Technology Affecting Marketing in the Year 2000, Changing Marketing Systems, 1967 Winter Conference, Dec. 27-29, 1967, pp. 76-77, No. 26.
Hays, Laurie, Technology: USing Computers to Divine Who Might Buy a Gas Grill, Wall Street Journal, Aug. 16, 1994, Abstract.
Kalakota, Ravi, Electronic Commerce A Manager's Guide, Addison-Wesley Longman, 1996.
Berry, Jonathan, Database Marketing: A Potent New Tool for Selling, Business Week, Sep. 5, 1994, p. 56, No. 3388.
amazon.Com, Website Printout, www.amazon.com, Feb. 24, 1998.
amazon.Com, Website Prinout. www.amazon.com, Feb. 22, 1998.
Alta Vista Alters Its Vision of the Market, Wall Street Journal, Abstract, Dec. 18, 1996.
Burkhead, J., Fidelity Investments Letter to Investors, Feb. 1, 1998.
Arbor Software, www.arborsoft.com, Jun. 30, 1998.
Charles Schwab, Asset Allocation Toolkit, Website, Feb. 20, 1998.
Posko, J.L., Versatile Services Streamline Global Videoconferencing, AT&T Technology Products, Feb. 1, 1992, pp. 2-8, vol. 7, No. 3.
Paragren, Website Printout, www.paragren.com,Jun. 30, 1998.
amazon.Com, Website Printout, www.amazon.com, Jul. 8, 1998.
Harvey, D.E., Videoconferencing Systems: Seeing is Believing, AT&T Technology Products, Feb. 1, 1992, pp. 7-13, vol. 7, No. 3.
Kohda, Youji, Ubiquitous Advertising on the WWW: Merging Advertisement on the Browser, Proceedings of the Fifth International World Wide Web Conference (France), May 1, 1996.
Middleton, Timothy, IT Stars in Video Chain's Rollout, www.iweek.com, Jan. 30, 1995.
Angiolillo, J., Personal Visual Communications Enters the Marketplace, AT&T Technology Products, Feb. 1, 1992, pp. 18-28, vol. 7, No. 3.
Cosmocom, Computer Telephony, Jul. 1998, p. 1.
Thearling, Kurt, From Data Mining to Database Marketing, DIG White Paper, Oct. 1, 1995.
CDNOW, CDNow Rated Top Music Site by eMarketer, the Authority on Business Online, PR Newswire, Sep. 3, 1998.
Faloutsos, Christos, a Survey of Information Retrieval and Filtering Methods, University of Maryland, Abstract, pp. 1-22.
Dragan, Richard, Advice From the Web, PC Magazine, Sep. 9, 1997, p. 133(7), vol. 16, No. 15.
Delgado, Joaquin, Intelligent Collaborative Information Retrieval, Nagoya Institute of Technology, Abstract.
Delgado, Joaquin, Content-Based Collaborative Information Filtering: Actively Learning to Classify and Recommend Documents, Nagoya Institute of Technology, Abstract.
Brittan, David, Being There-The Promise of Multimedia Communications, Technology Review, May 6, 1992, pp. 43-50.
Ensor, J. Robert, The Rapport Multimedia Conferencing System—A Software Overview, IEEE, pp. 52-58.
Englander, A.C., Creating Tomorrow's Multimedia Systems Today, AT&T Technology Products, Feb. 1, 1992, pp. 24-30, vol. 7, No. 3.
Doubleclick, DoubleClick on New Media Buying, Inside Media, Abstract, Feb. 7, 1996.
DoubleClick in Double Trouble, Yahoo News, Feb. 19, 1998.
Cerbone, R., The Corrting HDTV Wave, AT&T Technology, Feb. 1, 1992, pp. 14-17, vol. 7,3.
Barrios, Jennifer, Billboards That Know You, The New York Times, Dec. 14, 2003, p. 55.
Hill, Kimberly, Autonomy Digs into Contact-Center Market, CRMDaily.com, May 20, 2003.
Cameron, Paul S., Appendix A to Patent No. 5,592,378.
Wagner: Lon, Fry Fight as Fast-Food Chains Face Off With French Fries, We Weigh the Issues for you; Virginian-Pilot, Norfolk, VA; Apr. 6, 1997 extracted on Internet from Proquest Database.
Perkins, ED; Consumer Reports on Travel Careful Shopping Will avoid Bait-and-Switch Promotions; The Atlanta Constitution; Atlanta, GA; Jan. 4, 1995 extracted on Internet from Proquest Database.

* cited by examiner

Figure 11
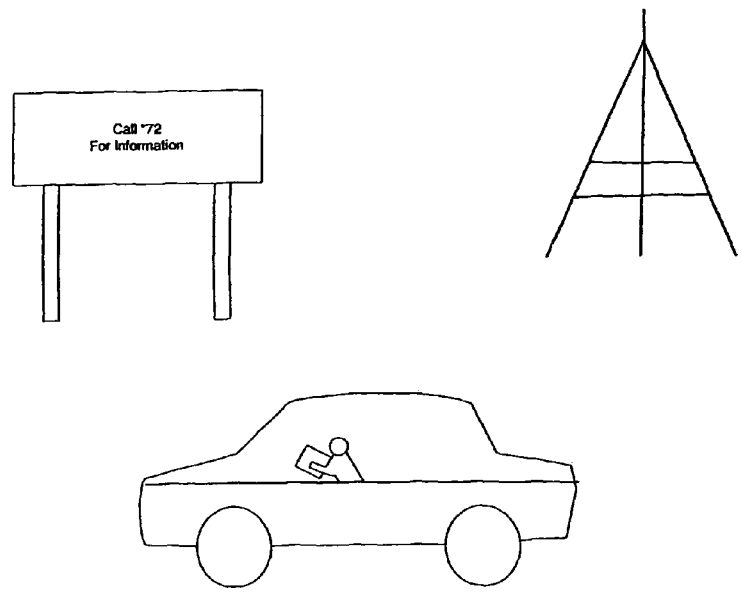
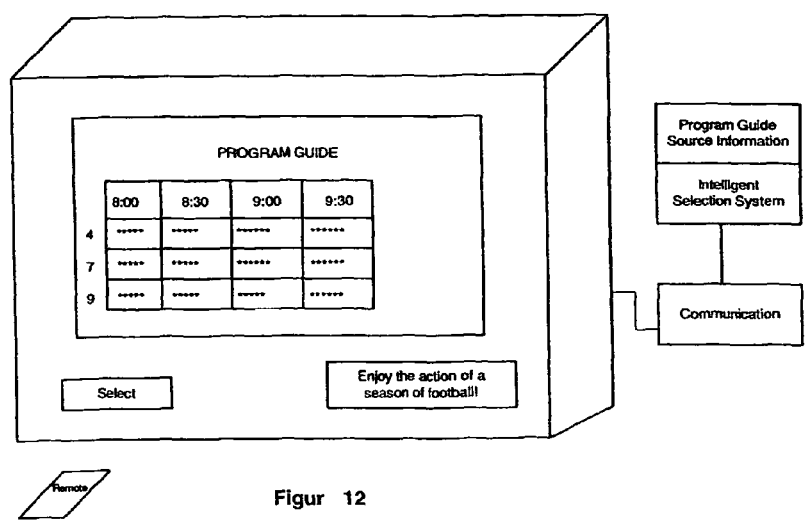
Figur 12

METHODS AND APPARATUS FOR INTELLIGENT SELECTION OF GOODS AND SERVICES IN MOBILE COMMERCE

CROSS-REFERENCE TO RELATED APPLICATIONS

This application is a continuation-in-part of pending U.S. patent application Ser. No. 10/403,822, filed 31 Mar. 2003, entitled "METHODS AND APPARATUS FOR INTELLIGENT SELECTION OF GOODS AND SERVICES IN MOBILE COMMERCE", and the benefit of the filing date of such application is claimed for the subject matter herein to the fullest extent permitted by the 35 U.S.C. §120. The contents of such application are incorporated herein by this reference as if set forth verbatim herein.

This application is also related to pending U.S. patent application Ser. No. 09/691,392, filed 17 Oct. 2000, entitled "Methods and Apparatus for Intelligent Selection of Goods and Services in Telephonic and Electronic Commerce"; which is further related to pending U.S. patent application Ser. No. 09/505,619, filed Feb. 16, 2000, entitled "Methods and Apparatus for Intelligent Selection of Goods and Services in Telephonic and Electronic Commerce", which is a continuation of U.S. patent application Ser. No. 09/038,399, similarly entitled "Methods and Apparatus for Intelligent Selection of Goods and Services in Telephonic and Electronic Commerce", now issued as U.S. Pat. No. 6,055,513. The contents of these applications and issued patent are incorporated herein by this reference as if set forth verbatim herein.

BRIEF DESCRIPTIONS OF THE DRAWINGS

FIG. 11 shows a depiction of a potential customer interacting via a wireless device.

FIG. 12 shows a plan view of a possible on-screen programming guide in conjunction with an upsell determination.

DETAILED DESCRIPTION OF THE INVENTION

Overview

Figure 1:
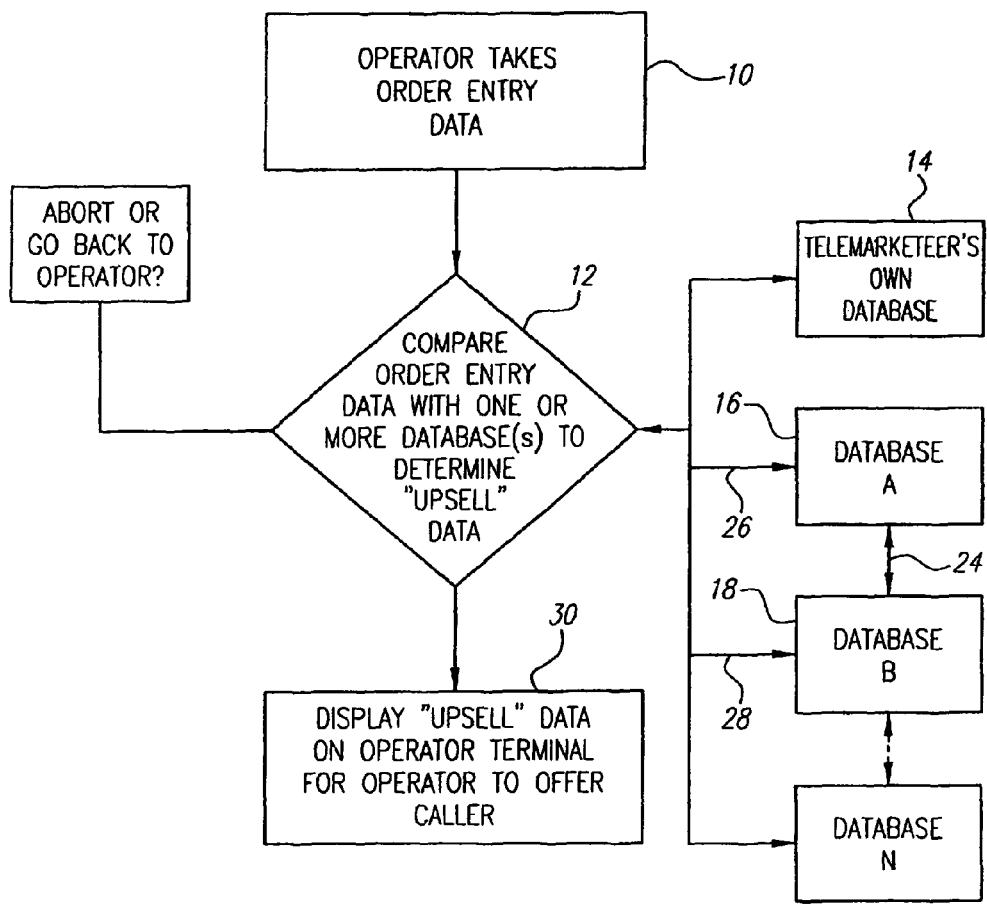
FIG. 1 is a flowchart demonstrating aspects of the upsell system.

Methods and apparatus are provided for effecting commercial transactions at remote locations over communication networks, especially telephonic and electronic commerce transactions. More specifically, the inventions relate to mobile commerce systems, and especially the intelligent product and service selection for proffer to a mobile customer. Most particularly, they relate to the selection and offering of an upsell transaction, namely, where the product or service offered differs materially from the product or service for which the contact was made.

Apparatus and methods are provided for effecting remote commerce, such as in telemarketing (either inbound or outbound) and in electronic commerce, which are particularly adapted for the intelligent selection and proffer of products, services or information to a user or customer. In one implementation of the invention, the system and methods obtain input information for the system from a primary transaction, identify one or more goods or services for possible proffer and upsell to the customer based at least in part upon the primary transaction data information provided to the system, and thereafter, offer the user or customer one or more items determined to be among the optimum upsells.

In one aspect of the invention, a method provides offers of an item constituting a good or a service in the form of an offer for purchase of the item to potential customers as users of the system, utilizing an electronic communications device, such as a telephone, videophone or computer, comprising the steps of, first, establishing communication via the electronic communications device between the user and the system for purpose of a primary transaction; second, obtaining primary transaction data with respect to the transaction, including determining the identity of the prospective customer; third, obtaining at least a second data element relating to the user for the upsell determination; fourth, utilizing at least in part the primary transaction data and the second data element and determining at least one good or service item for prospective upsell to the prospective customer; and fifth, offering the item to the prospective customer.

In the preferred implementation of the inventions, the input information for the system includes primary transaction data and at least a second data element obtained from a database, especially a remote, third party database or databases. Primary transaction data may include data relating to or reflecting the initial or primary contact from the customer to the system. In operation, one or more databases may be accessed, either in parallel or series, to collect and assemble input information for the system to determine the upsell or intelligent product selection.

One example of primary transaction data includes transaction-determining data, which provides an indication of the purpose of the call, for example, whether the primary contact was for purchase of a product, for a service request or an inquiry. Such transaction determination data may either be used to consummate the primary transaction or not. By way of example, a user initiating remote contact with a source of sales or services might initially contact the source, desiring repair of a defective product, whereupon the transaction determination data indicating a repair contact may then be used as an input to the system identifying responses to be proffered. In such a circumstance, while the primary transaction data reflect a service contact, the customer may be offered in response a sales transaction for a new product that includes the functionalities of the product that formed the basis for the primary transaction.

Yet another aspect of primary transaction data may include customer identification data. Such data may be specific data in that it uniquely identifies the contact, such as in person specific data comprising an electronic address, an e-mail address, customer number, billing data or credit card number. Customer identification data may in some instances be less than person specific data, such as residence specific data. For example, a caller's telephone number, such as may be automatically supplied by the automatic number identification (ANI) service or other forms of caller identification, may identify a customer to the level of a residence. Optionally, additional data may be requested so as to specify a subset, e.g., a unique resident, from the household. At yet a less specific level of geographic granularity, identification data may include zip code data or other geographic identifier. Identification data may be obtained automatically from a carrier, such as through the use of ANI for telephonic communications, or through an electronic identifier for electronic commerce, such as transactions over the Internet. Alternatively, non-automatic entry may be utilized, such as where the customer or operator effects data entry.

Yet further aspects of the input information for the system may include a correlation system for matching primary transaction data or other input data with a corresponding or keyed designator number for obtaining yet further input information. For example, while an initial contact to a telemarketer may automatically obtain the caller's telephone number, such as from ANI, a correlation system may then provide a designator, such as a social security number, which may be utilized as an index or key for accessing yet further data bases or sources of information. For example, a caller's telephone number as provided as primary transaction data via ANI may through the correlation system result in a social security number or credit card number which may then be used to determine the credit worthiness of the caller from a database check. The collection of input information for the system may be effected based upon local resident databases, such as a telemarketer's database, or through use of third party databases, such as credit card or credit worthiness databases, or possibly, a combination of both local and remote databases. Any form or content for a local or remote database may be utilized which is consistent with the goals and objects of the invention.

Beyond credit databases and identification databases, numerous other options may be utilized. A demographic database may be utilized to identify direct or predicted attributes of the customer. Specific input information regarding the customer, such as age, sex, income, profession, education level, family status, lifestyle, and/or interests, may be used as separate and discrete inputs, or may be effectively combined to provide a coded designator based upon demographics, socioeconomic analysis or otherwise to provide a coded designator. A third party database provider, such as a credit card issuer (e.g., Visa, MasterCard, American Express), may not wish to provide specific, raw data with respect to a user, such as where they would specifically identify a customer's income as may be known to the credit card issuer through the credit application. In such circumstances, processed data may be provided such as through the use of the coded designator, previously mentioned. In this way, the third party database may provide responsive, effective information for the upsell determination, but yet preserve in confidence the specific details known to it regarding the user, who is a customer of both the upsell service and the credit card company. Yet another type of third party database may include subscription information, such as telephone services subscription information as maintained by telephone companies or other carriers. Such information may include the types of service, such as call waiting, three-way conferencing or the like.

Yet another possible input to the system includes inventory data. Such data serves to minimize or preclude the offering of goods or services to a potential customer which are not then available, or which will not be available in a timely manner. Such inventory information may be used in a positive manner, such as an input for possible offers of an upsell, or in a negative manner, such as where a potential upsell has been determined but is then deleted from the possible proffers based upon its undesirable inventory status.

Yet another possible variable for use in the upsell or other selecting of a good or service for offer to the prospective customer is geographic information. Specifically, the geographic location of the potential customer may be utilized as a factor in the determination. By way of example, a customer utilizing a wireless device, such as a cellular phone, Palm Pilot VII, or other wireless communication or web access device, may provide geographic position information regarding the user of the system. That information may be obtained via global positioning satellite (GPS) information, or may be taken from a knowledge of the base station position. In the wired domain, the geographic position information may be obtained at various levels of granularity, such as through the use of area code information, or more specifically, exchange information, or yet even more particularly, through the use of various databases which map telephone numbers to specific geographies, such as a caller's street address. The geographic position of the user may be determined via an access point to a system, such as where a customer utilizes an automated teller machine (ATM) on a network. The geographic position of the user is known based upon their interaction with the network.

The geographic information may be utilized in combination with other information in determining an offer or upsell. By way of example, the system may know the position of a potential user of a good or service based upon position information from a GPS system, and may utilize that information in offering a good or service, such as a discount coupon, at a geographically local store. Such an offer may be made as the result of a caller contacting the system, or may be provided in an outbound or push based context where the system contacts the potential user of the offer, such as by calling their cellular phone or other wireless device. The geographic position information may additionally be combined with data or information regarding the geography of the person. For example, if the positional information indicates that the person is in a casino at midnight, it may be a valid assumption to assume that the person is not risk averse. In yet another particular application involving a wireless communication device, a display, such as a billboard, may provide a telephone number or code (e.g., *72). By dialing the number, the system may generate a tailored response regarding the good, service or information upon any number of factors, such as knowing the identity of the caller via the mobile identification number (MIN), plus any associated information known about the caller. The use of a code on the billboard may be combined with the knowledge of the base station receiving the call, to uniquely designate the billboard and the requested information.

Another application of the upsell system is in conjunction with on-screen programming guides. Such on-screen programming guides present a viewer of a television or other display with information regarding programming, entertainment or other information categorized in a predefined manner, such as by channel and time. In such a system, the selection (either made or considered) by the user may be provided as input to the decision system. For example, if a viewer selects a Pay-Per-View sports event, that selection may be used as an input to the system as described generally in this application which then results in the selection and offer of another good, service or set of information for the potential customer. Continuing with the example of an order for a Pay-Per-View sporting event, the system may determine, through the various methods described herein, to offer the viewer a series of entertainment events, such as a seasonal football schedule. The input device for such an onscreen programming guide application in the upsell context could be a remote control operated by the viewer.

Yet another class of database information may include third party databases relating to items believed to be possessed by or desired by the customer. For example, a possession database may indicate that the system user possesses a certain formalware pattern, or has a certain number of place settings of a pattern. The status information regarding the possession and/or completeness of a set may be utilized as an input to the system to identify an upsell to the customer. In yet another aspect, a registry database which reflects desired goods or services may be consulted as yet further input information for the system for identifying the proffer.

The system for identifying the potential proffer utilizes the input information so as to generate one or more outputs comprising potential proffers to the user. Various selection methodologies are available, including historical selection criteria keying the proffer to what has effectively resulted in sales or successful transactions in the past, or proffers based upon demographic profile or other inputs as a designator for a potential upsell. In yet other selection methodologies, theme sales may be utilized such as where further goods are required to complete a set, such as a formal ware set.

In yet other aspects, the invention may include actions taken upon the historical factors relating to a specific customer or customer type. For example, the system may adapt to reduce the number or frequency of upsells if it is determined that the customer is unlikely to purchase, or a pattern or time basis to the customer's purchasing is detected or expected. Yet another historical factor may include a quality factor, such as where it has been determined or assumed that the customer is interested in a certain level of quality, and accordingly, the selection of the proffer is based in part upon the quality. In yet another aspect based upon historical factors for a specific customer, knowledge of a user's possession, such as based upon a prior purchase, may be utilized in the proffer. For example, where a computer sales entity possesses the knowledge that the customer owns a particular model of computer, that information may be utilized in the selection of a proffer, such as in the offer of increased computer memory, a new version of a software application or the like. Yet another historical factor may include obsolescence of possessed materials, such as through the passage of time whereby the possessed item becomes worn, outdated, or outgrown.

Yet other factors affecting the upsell may be based beyond those particular to the user. For example, proximity to key calendar events for others, birthdays, anniversaries or other typical gift giving days, may be utilized as a factor in the selection of the upsell. Further, the time of the contact may be utilized, such as where a user contacts the system during the nighttime, wherein an upsell more likely to sell to a 'night owl' will be offered as opposed to what is believed to effectively sell to a 'morning person'. Offers may vary based upon day of the week, or day of the month, such as correlation or actual or expected paydays.

In one aspect of the invention, multiple actions may be taken in one transaction. For example, while credit verification is being effected for a primary transaction, a second credit check may be performed to determine available credit, which is in turn used as an input to the upsell determination system. In yet another aspect, multiple upsells may be selected, whereby multiple potential purchases are offered to the user either simultaneously or serially, and if serially, the reaction to an earlier offer may be utilized in the decision for subsequent offers.

After the upsells have been identified, they are offered to the user. In the telemarketing application, a script directed towards the sale of the selected product is provided to the telemarketing representative. In an electronic commerce environment, a display or other communication of the offer is made, such as through textual data, video, and/or audio communication. Additionally, information may be provided by additional or other modes of communication, such as e-mail, facsimile, independent phone contact, cable contact, etc. The proffer is typically accompanied by a solicitation to consummate the transaction. The results of the proffer response thereto may be utilized in the modification or updating of the system for identifying later upsells.

In one aspect of this invention, a method is provided for presentation of information to users of an electronic system comprising the steps of, first, establishing communication between a user of the system and the electronic system, second, determining characteristics of the user based at least in part upon the communication between the user of the system and the electronic system, third, determining the mode of presentation for the user based at least in part on the determined characteristics of the user, and fourth, presenting the information to the user in the determined mode.

In yet further aspects of the consummation of either or both of the primary transaction or the derivative, upsell transaction, an order fulfillment system may be utilized. Upon receipt of indication that the transaction is to be consummated, the system may so designate the product, and may automatically provide for shipping and billing of the user. Optionally, tracking of the item may be included.

In operation, a user establishes communication with a telemarketer (either with the user establishing communication in an inbound environment or with the telemarketer establishing communication in an outbound environment) or through other electronic contact, such as through a website contact or hit, upon which identity information regarding the user is either automatically obtained such as through the use of ANI or manually obtained, such as through entry of identification information by the user. The identity information may be specific to the user, or may be more generalized such as information relating to the type of primary transaction or interaction. A second data element is then obtained, preferably from a second, and most preferably remote, database which is then used in conjunction with the primary transaction or primary interaction data so as to select a subset of potential of offers of goods, services or information to the user. Upon selection, the goods, services or information are provided to the user, and if the interaction is for the purpose of sale, the transaction is preferably consummated. In the preferred embodiment, inventory checks for the proposed offer, as well as a credit authorization for the proposed offer, are made during the course of the communication, and most preferably, prior to the offer of the secondary item. In yet another aspect, the inventions relate to the intelligent selection and proffer of goods, services or information based upon an initial contact generating at least partial identification data, utilizing a remote, external database to develop yet further identification or information respecting the user, utilizing the collected information in the selection of the good, service or information to be provided to the user, and providing the same to the user. In one application, a user is identified during the course of a primary transaction, and identification information is utilized in an access of a credit card database, whereby raw, processed or coded designator information is obtained from the credit card provider, wherein the information is utilized in the selection of the further good, service or information to be provided to the user. In yet another aspect of this invention, the mode of presentation of the information to the user is based at least in part upon the identification information respecting the user. The mode of presentation may be varied based on demographic information, such as age, sex, income, occupation, education level, family status, lifestyle or interests.

In yet another aspect of this system, an electronic system permits the user of a web or other electronic commerce system to interact with a live operator. In this way, what has heretofore been merely communication between a user and a non-human system may divert the transaction to an operator/transaction assistant.

DETAILED DESCRIPTION OF ILLUSTRATIVE EMBODIMENTS

FIG. 1 shows a hybrid block diagram and flowchart of one implementation of the system and methods of these inventions. The simplified depiction of FIG. 1 reflects aspects of a telemarketing implementation, though it will be understood that various structures and functionalities may be extended to other implementations, such as electronic commerce and the like.

By way of terminology, when the terms "user", "system user", "customer", "potential customer", "contact" or equivalent terminology is used, those terms are meant to refer to a person or entity to whom the efforts of the offering are at least in part directed. Variations in meaning as to this terminology may be taken from context, as necessary. The terms "good(s)" and "service(s)" while distinct, are intended within the scope of the patent to be used interchangeably, where appropriate given the context. When appropriate from context, a good or service may include a coupon, ticket, card or other promotional material, including printed material, having a value designator. Further, a "service" may include information or entertainment. The term "upsell" means an offer or provision of a good or service which is selected for offer to the customer and differs from the good or service for which the primary contact was made. The term "upsell" is not limited to the context in which a primary transaction is intended to be a sales transaction, but additionally includes the offer of a good or service offered in accordance with the selection criteria of the invention even if the primary transaction is not principally sales motivated, such as where an initial contact is for service or repair purposes. The use of "he" is gender neutral, and may be read as "he", "she" or "it". When the term "and" or "or" is used, they may be read in the conjunctive or the disjunctive, where appropriate from context.

Initially, a system user contacts the system for purpose of a primary transaction. As explained, however, the transaction need not be a consummated transaction. If the system user is a potential customer contacting a telemarketing system, at action (statement) block 10 a telemarketing operator may interact with the potential customer and take the order entry data for the primary transaction. Either upon completion of the primary transaction, such as through consummation of a sale or by program flow to further action prior to consummation of a sale, action (decision) block 12 is arrived at wherein data, such as order data or other primary transaction data is compared to one or more databases for analysis. The primary transaction may be a contact for a sale or other commercial transaction, a service or repair transaction or interaction, or may be for the purpose of an inquiry.

As depicted, a first database 14 co-acts with action block 12. Typically, the database 14 is a locally resident database, such as the telemarketer's own database. It should be understood that a locally resident database refers to any database configured for any access by the telemarketer, not necessarily one that is located at the telemarketer's site. Database 14, if a resident database, may handle matters requiring relatively quicker response, such as correlating automatic number identification (ANI) information received over the telephone or communication network with other identification or prior transaction information on the caller.

One or more other databases (database A-database N), such as database A 16 and database B 18 may be coupled to action block 12. As depicted, database A 16 is coupled via coupling path 24 to database B 18. Additionally, coupling path 26 interconnects action block 12 and database A 16. Similarly, action block 12 is coupled to database B 18 via coupling path 28. Any of the databases 14, 16, 18 may be interconnected as desired consistent with the intended functionalities of the systems described herein. Thus, though not expressly shown, the resident database 14 may couple to database B 18, either directly or via a path such as through action block 12 to coupling path 28, or via action block 12, coupling path 26, database A 16 and coupling path 24. These databases may be accessed simultaneously, or in any combination of parallel, serial, sequential or time access. Preferably, the accessing of multiple databases is performed in a manner to minimize any delay in effecting a real-time proffer to the user.

Secured communications are preferably utilized within some or all of the system. For example, encrypted messages or data may be utilized, such as when transmitting raw or analyzed data from, to or between databases. Further, privacy concerns are addressed by precluding or inhibiting the sharing of information between users, or between various database owners or content providers. Further, security qualification or entitlement restrictions may be utilized such as to the entire system, or parts of the system, such as databases.

Sources of input information for the system, such as primary transaction data and other input data for the upsell identifying system may come from any or all of action block 10, or other databases 14, 16 and 18. It will be understood by those skilled in the art that the number and interconnection of the various databases 14, 16 and 18 has been simplified for expository convenience, and is not intended to be a limitation on the scope or teaching of the invention. From action block 12, after the system identifies one or more upsell items for offering to the potential customer, offering block 30 serves to provide the selected items to the potential customer. In the telemarketing application, the telemarketer would at this stage have text or other information available to provide to the customer. Typically, a screen pop including a text directed towards the sale of the upsell item would appear, at which point, the telemarketing sales representative would verbally make the sales presentation to the caller.

Various descriptions of the structure and function of the embodiments is provided in this patent. However, as is understood by those skilled in the art, the performance of a given functionality may be distributed among one or more components, and conversely, multiple structures may be required to achieve a desired functionality. While the detailed descriptions herein have been provided with respect to certain allocations of functionality and structure to various items (such as elements of a block diagram or flowchart) the underlying inventions herein should not be limited to the allocation of those structures, functions, diagrammatic representations or labeling selected for expository convenience herein. By way of example, while routing of telephone calls and computer-based call handling have historically been relatively discrete, segregable functions, and further segregable based upon discrete equipment, the trend is towards integration and distribution of functionality more broadly within a system. Accordingly, the understanding of the inventions herein should be based upon the functionality, as implemented by selected structures, though not necessarily upon which particular unit of structure in which the functionality resides.

Figure 2:
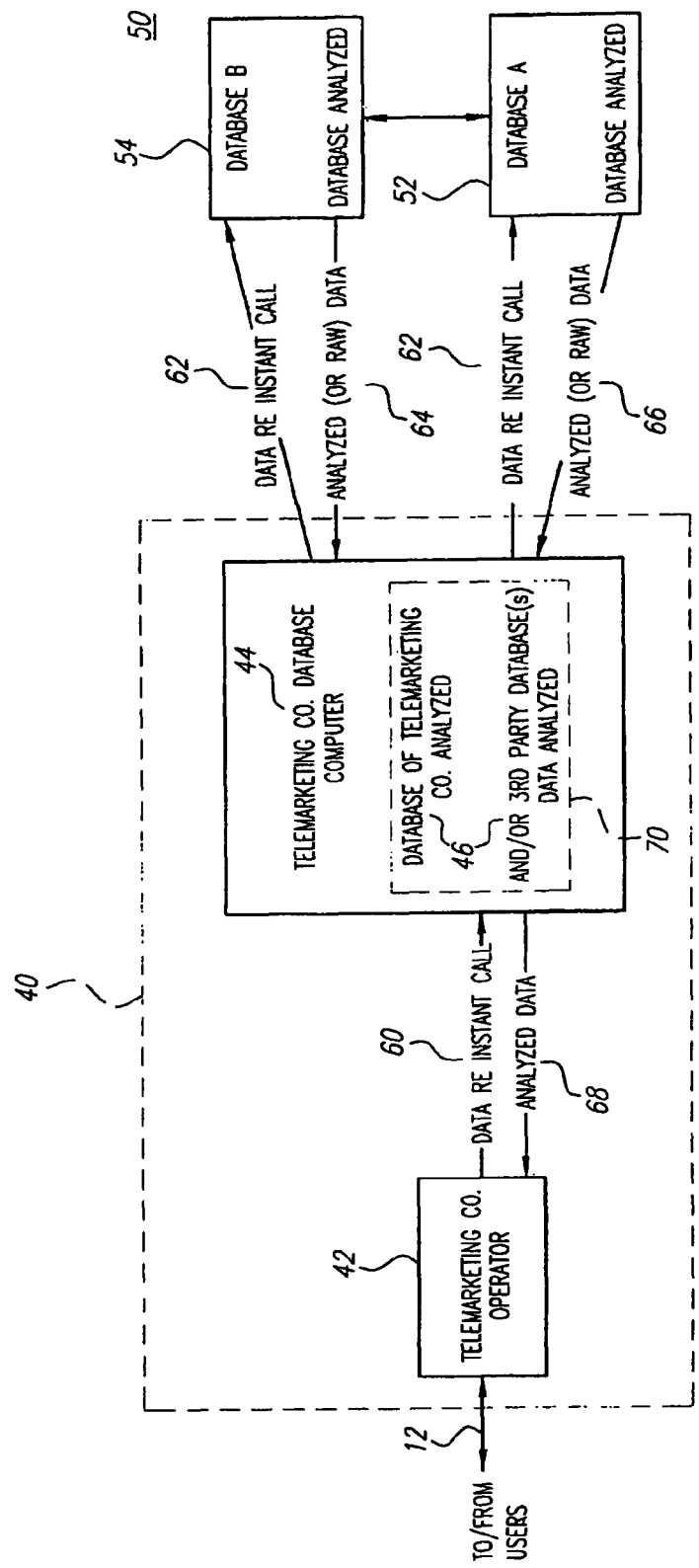
FIG. 2 is a block diagram of a system for implementing the methods of this upsell system.
Figure 3:
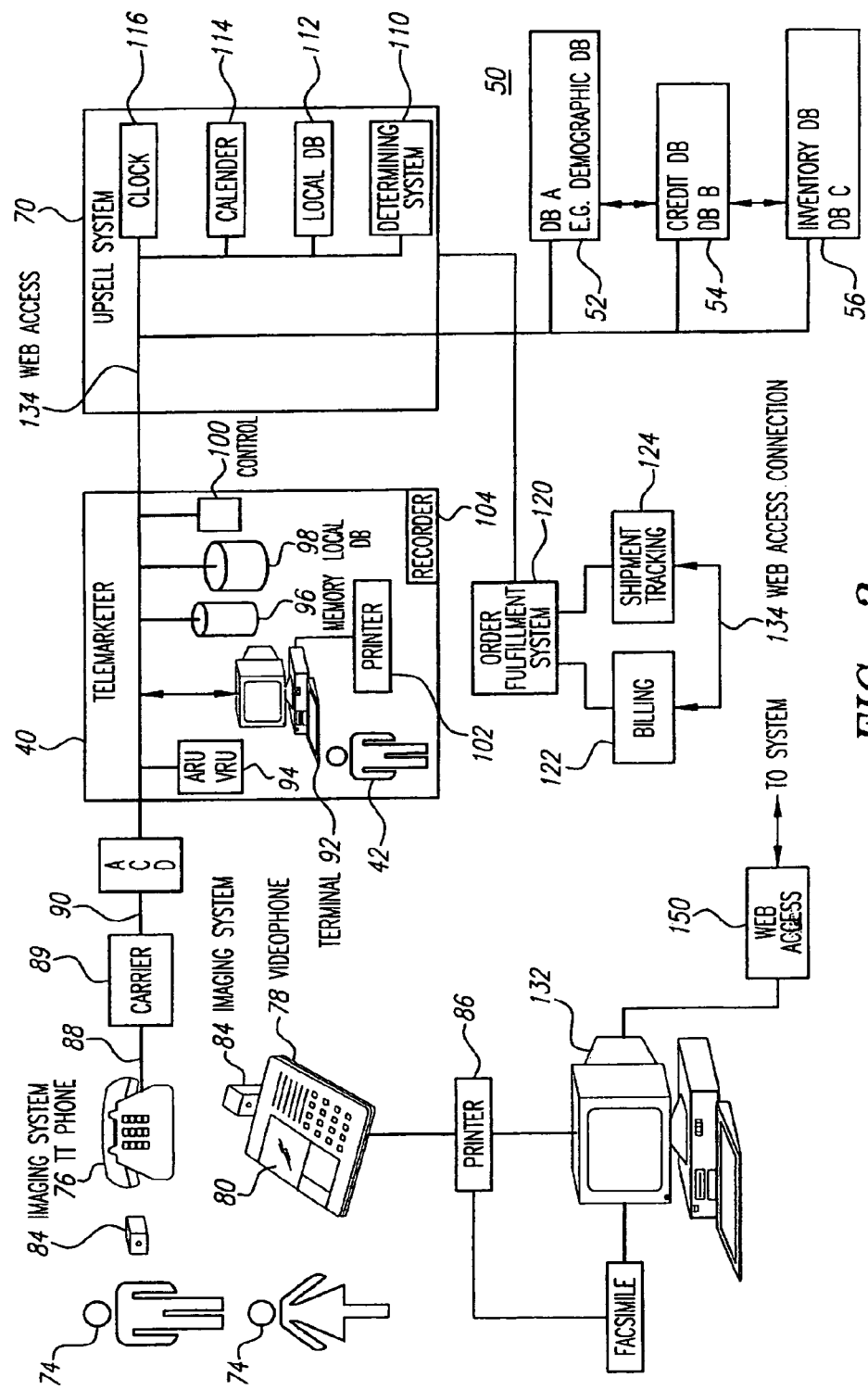
FIG. 3 is a flowchart for an Internet-based order transaction in accordance with the invention.

FIG. 2 is a block diagram of a simplified embodiment of structure usable to achieve the functionality of these inventions when suitably adapted for such use. FIG. 3 is a more detailed schematic diagram of one possible implementation of a structure for use in implementing the functionalities of the inventions here. When feasible, the same numbering will be used in various figures to describe any corresponding element. FIG. 2 shows a block diagram of a telemarketing system 40 adapted for communication with one or more databases 50, as well as a database 42 which may be integral or resident within the telemarketing system 40. Within the telemarketing system 40 are grouped various functionalities, including the telemarketing company operator 42, the database 44 resident at the telemarketing system 40 with its attendant computer for processing and control, as well as a computer 46 for analysis of the inputs and generation of one or more outputs for provision to the user. One or more external databases 50 may be included within the system. A first database A 52 and a second database B 54 are depicted, though it is to be understood that the selection of two databases 50, and the interconnection there between, is selected for expository convenience and is not intended to reflect any limitation on the structure or functionality of the system, provided the functionalities of the invention may be achieved.

FIG. 3 shows a block diagram of one implementation of a telemarketing system at a greater level of detail as compared to FIG. 2. While the following description is generally provided in the context of inbound telemarketing, the inventions herein may also equally be applied to outbound telemarketing. Users 74 (also known as customers, or potential customers) access the telemarketing system 40 via any known manner of telephone, telephonic instrument or its equivalent. As shown, telephone 76 comprises a touch-tone phone having a handpiece including a speaker and receiver, as well as an array of alphanumeric buttons for actuation by the customer 74. Alternatively, video phone 78 provides for both audio communication as well as image or video communication. The video phone 78 includes an array of alphanumeric buttons, a video display 80, typically a handset, and some imaging system 82, comprising a camera or other image generating system. A conventional touch-tone phone 76 may be utilized in association with a separate imaging system 84, if desired. In yet other modes, the customer or user 74 may interact with any other form of man-machine interface which is consistent with the goals and functionalities of these inventions. By way of example, but not of limitation, the customer 74 may interact with a computer, whether standalone or networked (by local area network (LAN), wide area network (WAN) or otherwise), which includes a communication capability (modem, etc.), or may comprise access capabilities to the Internet or web or internet television type systems. Yet further examples of devices permitting interaction between the user and the system include automated teller machines (ATMs), which may include textual displays, potentially video displays and optionally audio displays. Yet other display devices permitting interactivity include various wireless devices, such as the Palm Pilot VII, and Nokia communicator. Various other devices principally for entertainment and game play include the Sony Playstation and the Microsoft X machine. Yet another display device which may include an input capability comprises electronic books (e-books). Various input technologies may be utilized to contact the system, whether touch-tone input, keypad or mouse input, voice response technology, including nuanced voice recognition technology, remote controls, touch screens, etc. Yet another form of input device includes smart cards. A smart card stores information, such as information about the possessor of the smart card. That information may be provided from the card for use in the system. A smart card may include identification data, other personal information or preference data. Any or all of that information may be utilized in order to make a better selection of a good or service for offer to the customer. While the particular implementations and embodiments of the user 74 interface may vary, any interface which provides output to the customer 74 and permits return entry consistent with the functionalities to be achieved herein is acceptable.

Optionally, other devices such as a printer 89 may be included. These various devices then interface with a carrier 89. The interconnection 88 between the end instruments 76, 78 may be of any mode or manner, such as a copper wire connection, optical fiber, cable connection, wireless connection, cellular connection, satellite connection, or any other mode or manner of connection. Similarly, the communication path 88, and carrier 89 may utilize any type or mixture of carrier technologies, whether analog, digital, ISDN, or at any rate of speed consistent with the achievement of the functionalities described herein. Preferably, the carrier 89 includes the ability for provision of more advanced telephony services, including the provision of DNIS, the dialed number identification service, and some form of caller identification such as automatic number identification (ANI, caller ID, etc.). Typically, the DNIS and ANI information are provided from the carrier 89 to the telemarketer 40 over connection 90, and may be either in-band or out of band signaling, such as D-channel signaling in current time division multiplexed modes of operation.

FIG. 3 depicts the telemarketing system 40, and separately identifies the upsell system components 70. The upsell system components 70 may be optionally included broadly within the telemarketing system 40, or may be provided on a standalone basis, such as where the upsell system 70 is geographically distinct from the telemarketing system 40, and indeed where the upsell system 70 may be resident at a third party location and be utilized by one or more telemarketing systems 40.

The telemarketing system 40 interacts with the carrier 89 via communication path 90. Optionally, this path may include various additional structures and functionalities as known to those skilled in the art. For example, automatic call distributors may be utilized at the front end of the telemarketing system 40 so as to serve a routing, holding and/or load leveling function, either done or in combination with other hardware and/or software. Within the telemarketing system 40, one or more operators 42, typically wearing headsets for audio communication, interface with terminals 92 which provide for at least textual display, and optionally, graphic image or video display. The operator 42 interfaces with the terminal 92 through any mode or mechanism, such as a keyboard, mouse or other pointing device, or any other man-machine interface for data entry or communication. Conventionally, the operator 42 is a live operator, though optionally the generation of audio images or video for presentation to the customer 74 may be synthesized or simulated or represent virtual reality. By way of example, a text-to-speech unit or other form of recorded speech may be utilized. An audio response unit 94, also termed an interactive voice response unit, may be utilized to provide some or all of the customer 74 interaction. Additional structures and functionalities required for the operation of the telemarketing system 40 may include local memory 96, local database 98, control (processor unit) 100 to provide overall coordination and control of the various components of the telemarketing system 40 and its interaction with the other units described. Additionally, a printer 102 may be provided for generating a hard copy record, such as of order transactions. Additionally, a recording unit 104, whether for audio, images, or both, may be included.

The upsell system 70 typically includes a determining or type analysis system or unit 110 which serves to receive the various inputs for the determining unit and to generate outputs relating to possible upsells for the customer 74. Optionally, a local database 112 is provided within the upsell system 70. Chronological information, such as provided from a calendar 114 and/or clock 116 may be utilized within the system. The databases 50, whether resident or external, are shown as database A 52, in this depiction being a demographics database, database B 54 being a credit database and database C being an inventory database.

Optionally, the system may include an order fulfillment system or unit 120 which is coupled to receive outputs from the telemarketing system 40 and/or the upsell system 70 indicative of a consummated transaction requiring fulfillment. Optionally, a billing unit 122 and shipping/tracking unit 124 may be utilized in conjunction with the order fulfillment system 120. An electronic notification (such as by e-mail) that an item has been shipped may be provided.

A simplified interconnection is provided in FIG. 2 and FIG. 3. The selection and arrangement of the interconnection, as well as its implementation, are matters which are known to those skilled in the art and depends upon the particular technology in which the system is implemented. Any interconnection or mode of implementation may be utilized which is consistent with the achieving of the goals and functionalities of these inventions. Yet other modes of accessing the system may be utilized. For example, electronic or web access 130 generically depicts access through communication networks, such as through Internet access, cable, television, direct broadcast, satellite broadcast, e-mail, facsimile, voicemail or otherwise. The web access 130 may connect via web access connection 134 to some or all of the various portions of the system, such as the shipping/tracking unit 124 so as to check on shipping or delivery information, the billing unit 122, or to directly access the upsell system 70 as a variation on the point of entry into the overall system. When considering access in a non-telephonic, though still electronic manner, reference should also be made to the descriptions of FIGS. 4 and 5 relating to Internet or web-based access and systems.

The depictions in FIG. 2 and FIG. 3 will be used now for a brief description of one mode of interaction of the customer 74 with the telemarketing system. A customer 74 may utilize a video phone 78 to dial a toll-free telephone number in response to observing a promotion for a good or service. The carrier 89 effects telephonic connection to the telemarketing system 40 preferably providing DNIS information which is utilized by the control unit 100 and local database 98 to provide a textual display on terminal 92 for use by the live operator 42 in interacting with the customer 74. Additionally, the carrier 89 may provide caller identification data, such as ANI data, which may be utilized by the control unit 100 to retrieve information from the database 98 particular to the customer 74. In addition to database 98, geographic designator programs exist which may be utilized to receive ANI data and to identify the geographic location of a customer such as by zip code, or more particularly, by zip code plus four. Based upon the retrieved information as provided to the live operator 42, a dialog is conducted relating to the primary transaction for which the customer 74 made the primary or initial contact with the system. While handling the primary transaction, the system may access one or more databases 50, such as a credit database 54 and a inventory database 56. If the user's credit card number has been obtained, such as during the primary transaction, or is otherwise known to the telemarketer through prior contacts or is devined via a correlation system, the credit card number may be utilized to obtain raw or analyzed data regarding the caller. The response from the credit card issuer or processor may be specific, such as providing data on the user's income, sex, history of purchase transactions or any other personal or demographic information known to it, or may provide a analyzed, coded message in response. The credit information, personal information, demographic information, possession information or other form of input data is then used by the system to generate the upsells or other real time provision of a secondary transaction. The secondary transaction may relate to the offer of a good or a service, or to a coupon, ticket, card or other promotional material having a variable or designated value for the purchase, lease or other acquisition in the future of a good or a service. In the preferred embodiment, there is a real time offer during a real time transaction. If the transaction is consummated, an indication may be provided to an order fulfillment unit 120 and attendant units such as the billing unit 122 and shipping/tracking unit 124.

Within the contemplation of the inventions, while a customer 74 is interacting with the operator 42 with respect to the primary transaction, the upsell system 70 is obtaining various input information for generation of a potential upsell item. As shown in FIG. 2, data regarding the instant call 60 may pass from the telemarketing system 40 to various databases 50, such as directly through path 62, or alternatively, from database A 52 to database B 54 via path 70. Database A 52 may provide in return, analyzed or raw data 66, and similarly database B 54 may provide analyzed or raw data 64 to the analysis system 70 for processing in accordance with the inventions herein. Upon generating the potential upsells, that information is provided to the telemarketing system 40, for presentation to the operator 42 on the terminal 92. As described in more detail in connection with FIG. 8, multiple options may be presented for selection by the operator 42. If a transaction is then consummated with respect to the upsell, the order fulfillment unit 120 and associated units may be utilized as in connection with the primary transaction. As described further below, the data from the proffer of the upsell may then be utilized in subsequent transactions, such as by storing the information in memory 96, or by utilizing it in connection with the determining unit 110.

Reference has been made to the provision of analyzed or raw data 66 in connection with databases 52, 54. The following discussion applies generally with respect to the form of data provided. A database access may provide raw data, such as specific data relating to a given user, e.g., a particular user's income. A system may also provide analyzed or processed data, such as where not all of the data provided is raw data, but includes processed data, e.g., a coded designation indicative of certain aspects of the user. By way of example, third party database possessors often maintain substantial raw data specific to their customers. Financial institutions and transaction processors, such as banks, brokerages, credit card issuers, credit card processors, have extensive databases either from data provided to them such as through application, forms or which is known to them due to their continued course of contact. For example, a credit card company may both know specific raw data relating to a customer through the customer's indication of its income on the original application, but may also possess data relating to purchases (such as transaction frequency, amount, type, item and location) which are obtained in the course of processing the transactions of the user. The third party database owner may be unwilling or unable, e.g., due to legal restrictions, from providing the raw data to other parties for their use in telemarketing or electronic commerce applications. However, process data which does not specifically reveal information of the user may be provided. For example, a coded designator may be provided from the third party database to the transaction or upsell processor, typically through agreed upon codes and formats, whereby the required information is provided, but in a generic enough manner so as not to raise privacy or other concerns. For example, a designator code XYZ may relate to a user with an income over $50,000, expected net worth of $75,000, is a homeowner, and has an interest in stereo equipment. In this way, the specific confidential information of the user may be preserved, while providing effective input for the processing or upsell system. One or more coded designators may be provided. Coded designators may be provided at a finer level of granularity, such as one designator to indicate whether or not the user is a homeowner, has an income within a defined range, etc. In this way, multiple designation may provide a more complete description.

Figure 4:
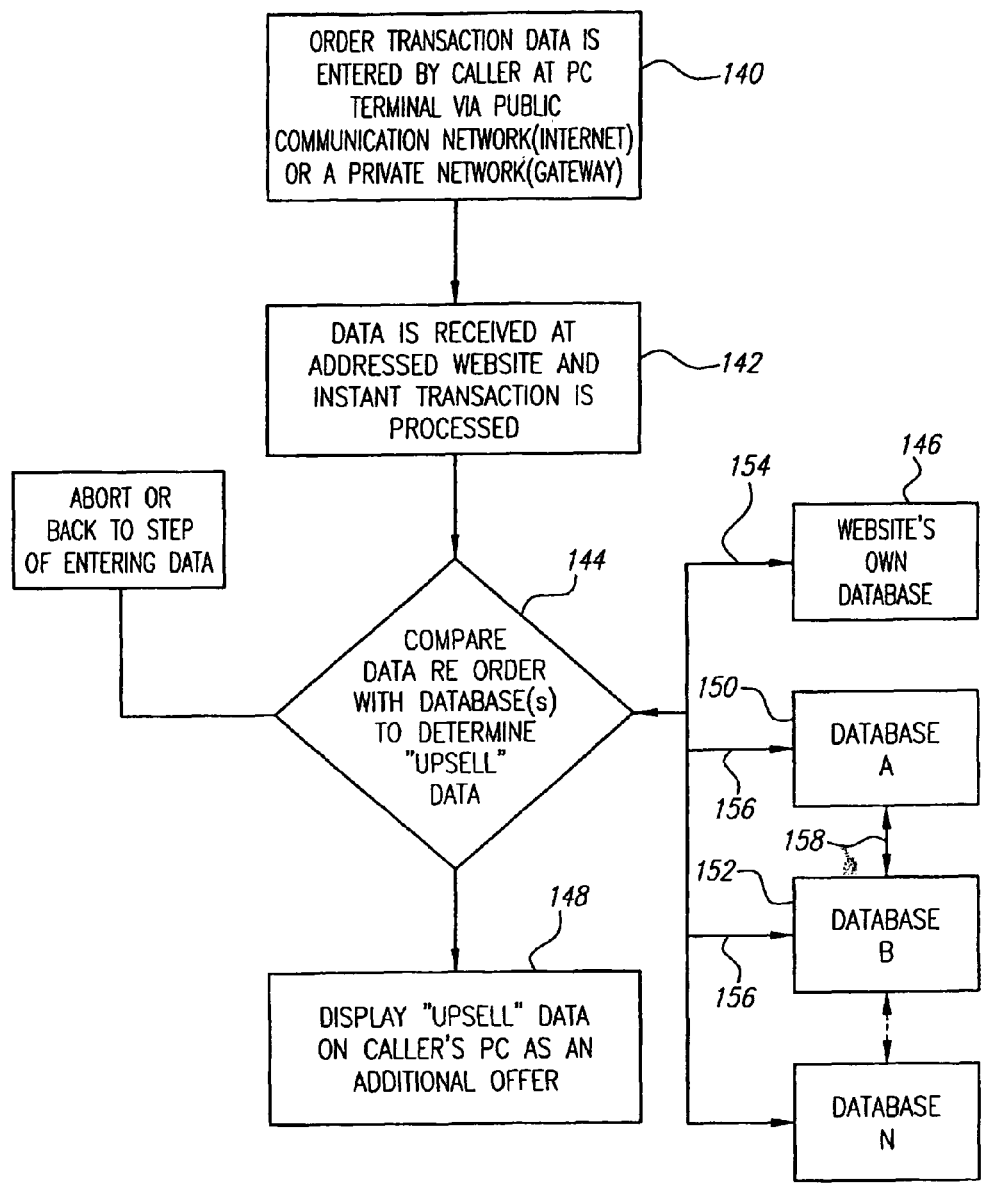
FIG. 4 is a block diagram of a system adapted for telemarketing applications.
Figure 5:
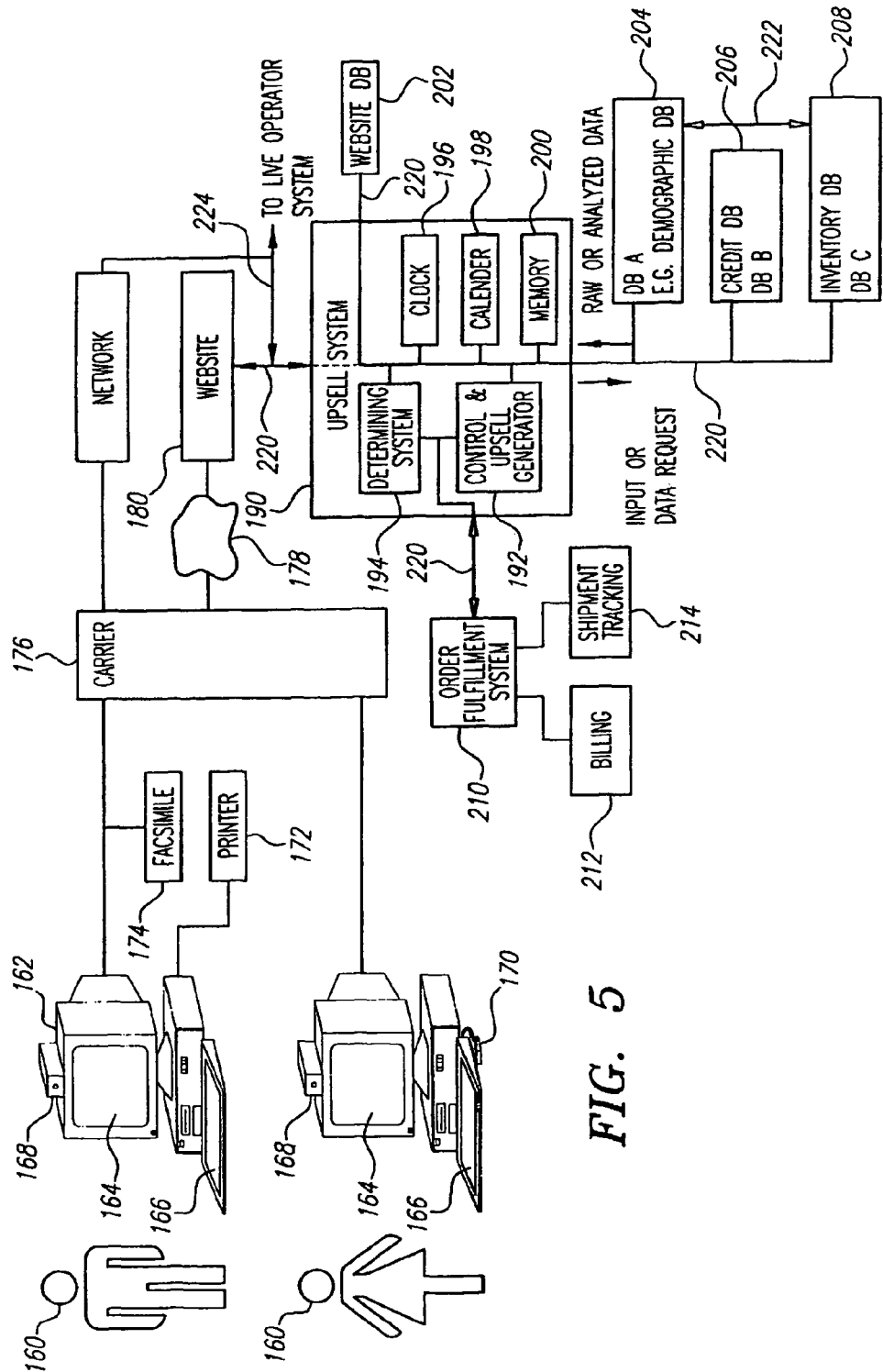
FIG. 5 is a block diagram of a system adapted for Internet or other electronic commerce use.

FIG. 4 shows a simplified flowchart and block diagram depicting an Internet, web-based or other electronic commerce system for performance of the inventions herein. FIG. 5 shows a detailed block diagram of one optional implementation of such a system. To the extent that description provided with respect to other figures described the same or similar structure or functionality, the description is incorporated herein by reference.

As shown in FIG. 4, a user interacts with the system via contact block 140 such as by having a primary transaction comprising an Internet order transaction being entered or effectuated by a user at a personal computer (PC) terminal. During the course of the primary transaction, processing step 142 serves to receive data at a address website and process the primary transaction. That transaction may be optionally consummated or not as suits the overall purpose of the transaction. By way of example, if the upsell serves to obviate the purpose for the primary transaction, such as when the primary transaction is for customer service or repair, and the upsell is successful in providing the customer with a new product in replacement thereof, then the primary transaction need not be consummated in the manner contemplated by the user at the point of initial contact 140. Continuing with the flow of the program, at analysis block 140, the various inputs for use by the analysis system are collected, and subsequently analyzed. In the course of this collection and analysis, various sites, such as the websites own database, 144, remote database A 150 and/or remote database B 152 may be accessed. The coupling 154 between the analysis system 144 and the website database 146, as well as the couplings 156 to the external or other databases, 152, as well as any coupling 158 between the databases 146 (coupling to other databases not shown), 150, 152, may be implemented as known by those skilled in the art. The particular selection of interconnections between various components is left to selection of implementation, where the implementation merely needs to be consistent with the goals, objects and functionalities of this invention. Upon completion of the analysis at analysis block 144, the output of the analysis block 144 is provided to the user through action block 148. The upsell data may then be displayed on the caller's PC as an additional offer, or in lieu of the primary transaction.

FIG. 5 depicts one or more users 160 (also referred to as customers or potential customers) who interface with the system via a computer 162. Typically, the computer 162 includes a display 164, such as a CRT or flat panel display, some input device such as a keyboard 166, and optionally a mouse 170 or other pointing device, and may optionally include an imaging unit 168 to image the user 160. Additional devices such as a printer 172, such as to provide a permanent transaction record or to print images regarding proffered goods or services may be included. Similarly, a facsimile machine 174 may be included, and may be connected to a telephone system for effective communication. Again, any type of human/machine interface consistent with achieving the goals and functionalities of the instant inventions may be utilized with this system. A carrier 176, such as an on-line access service, cable access service, network, or other wired or wireless connection may be used to access the desired website 180. As depicted, connection path 178 is provided which serves as a generalized descriptor for a path, such as a Internet established routing, network routing, or other routing for connection of the user 160 for the website 180. The term website 180 is not intended to be a term of limitation, but rather of generic description, to be an intermediate or terminal node or contact point in the effecting of the electronic provision of goods or services so as to result in commerce or information transfer. While the website 180 may be a site on the Worldwide Web (WWW), it need not be so. The underlying aspects of this invention more broadly encompass the functionalities and structures to achieve them, as those particular implementations to achieve them are modified over time.

The upsell system 190 includes a control and upsell generator system 192, such as implemented through a special purpose computer or a general purpose computer program or otherwise adapted to achieve the functionalities described herein. The program may be implemented in a linear programmed fashion, or may use other decisional bases, such as expert systems, fuzzy logic, neural networks, adaptive systems, or other decisional systems known to the art, and which effectuate the desired functionalities of the inventions. Further, a determining unit 194 may be included to provide an indication of the purpose of the original contact in the primary transaction. Clock 196 and calendar 198 provide date or chronology information, and may be combined as a single unit. Memory 200 may serve to store program information, input information to the control and upsell generator 192 or other data required for effective operation of the system. The website 180 may include its own database 202, either directly connected to the website 180 or to the upsell system 190. Various databases, including database A 204, e.g., a demographics database, database B 206, e.g., a credit database, and database C 208, e.g., an inventory database, may be accessed. Optionally, an order fulfillment unit 210, and associated billing units 212 and shipping/tracking unit 214 may be included as described in more detail with the telemarketing system. The interconnects 220 between the website 180 and the upsell system 190, and between the upsell system and various databases 202, 204, 206, 208, as well as the coupling from the upsell system 190 to the order fulfillment unit 210. Optionally, a connection 224 to a live operator system, such as the telemarketing system previously described, may be utilized. In this way, while an initial access for a primary transaction is provided to a website, through program flow (where the operator may initiate contact with the user) or at the election of the user (where the user may initiate contact with an operator) 160 may be placed in connection with an operator. Such an option provides for the ability to provide individualized interaction between the user 160 and the overall system for the provision of electronic commerce or information transfer.

Figure 6:
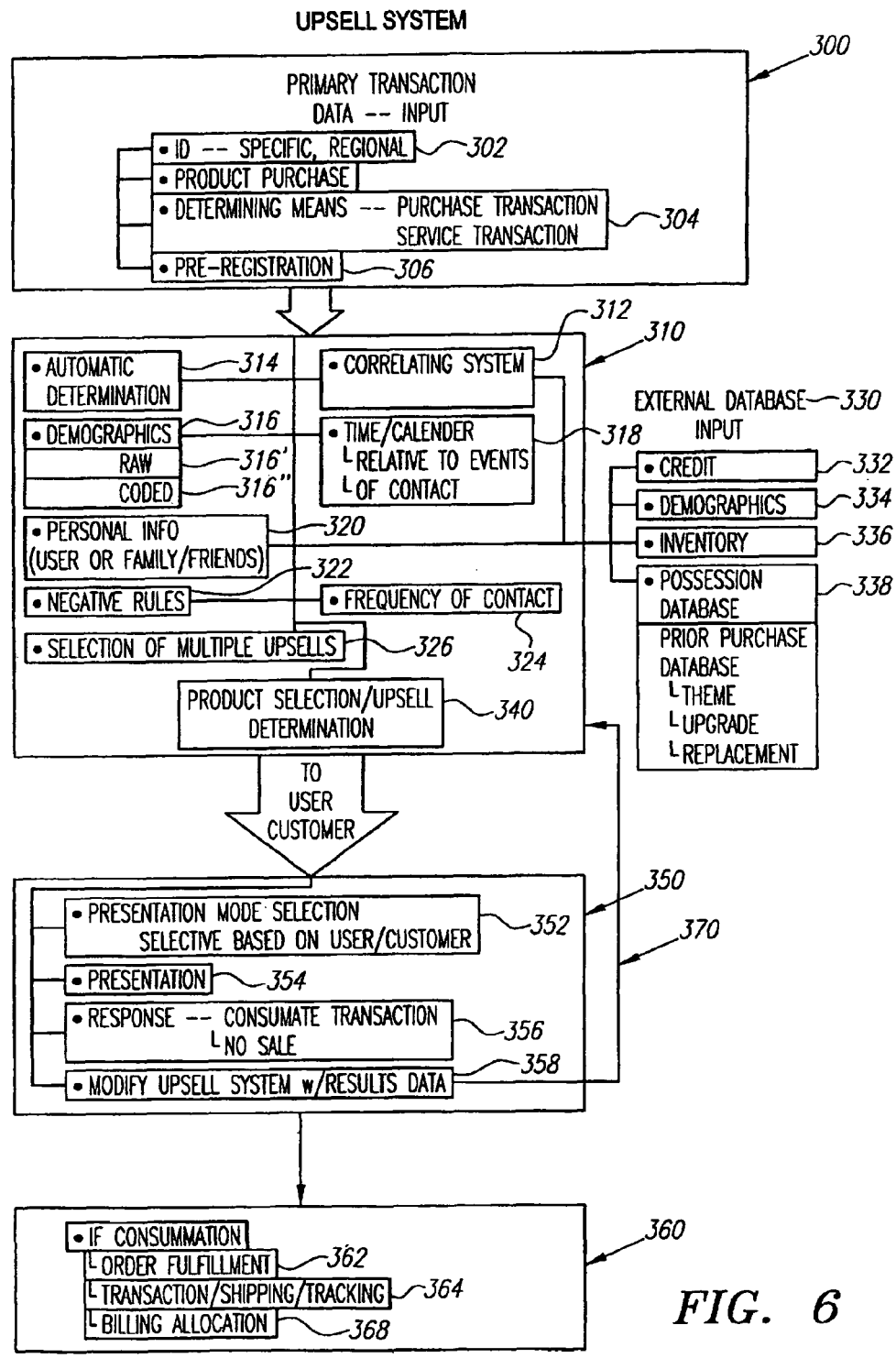
FIG. 6 is a block diagram of the functional aspects of the system.

The various steps in the typical operation of the overall system will now be described, with contemplation that the description may apply to telemarketing-based systems as well as electronic commerce-based systems, the applicability of the particulars to be taken from context. The description will relate to FIG. 6, which shows various interconnected functionalities, and will relate to other figures when noted. Broadly, the following discussion will relate to the primary transaction, both as to the data and completion or consummation of the primary transaction second, to the upsell determination or other identification of specific proffers to the user, and finally the conveyance of that information to the user and the action or consummation taken after that provision of information to the user.

As to the primary transaction data 300, in a first aspect the primary transaction data may include a type of contact component 304. The type of contact may designate a purpose, particularly a primary purpose, for the original contact by the user. By way of example, a type of contact may be a purchase contact, or alternatively, may be a service contact. A system such as the determining unit 194 (FIG. 5) may generate the indication of the type of contact. The type of contact may be determined from the address information utilized by the user, such as where different telephone numbers are provided for sales as opposed to services, in which case the dialed number or DNIS information directly provides indication of type of contact. Alternatively, the selection may be designated by the customer, such as where a menu selection is provided, e.g., press 1 for sales, press 2 for service. The type of contact may also be indeterminant, such as when the user has contacted a site without a specific purpose in mind. The type of contact may be defined at various levels of specificity, such as an indication that the type of contact was for purchasing generally, though without intent as to purchase of a specific item, to the presumption that the type of contact was specifically for purpose of a particular product.

A second aspect of the primary transaction data may include customer identification 302. Customer identification may be specific to a customer. Examples of specific customer identification would include a user's social security number, customer number, personal identification (PIN) number or other designator uniquely identifying the user. In the electronic realm, the customer identification may comprise an e-mail address, e.g., jasmith@aol.com, and Internet provider identification, or a source designator on a network. Various forms of electronic signatures may be provided which serve an identification, verification and authentication function. At a lesser level of specificity, namely, one at which a specific user may not be identified, various forms of identification exists. For example, a telephone number may provide geographic indication, such as through knowledge of its area code, or provide even more geographic specificity through the prefix. Other geographic descriptors, such as zip code or the finest level of geographic granularity (zip code plus 4) may be utilized. A residential customer number may not yet specify a particular customer within a household or location. Other forms of address, such as fax number, may be utilized to provide a local identification.

The user may be identified in yet other terms. For example, the user may be identified based upon the specific items being purchased, or more broadly, the type of item being purchased. Further, the user may be identified by a quality factor, that is, some indication as to the perceived quality of the goods the purchaser may be interested in, such as based upon the initial contact. If the potential customer has contacted the system with respect to a high-end product, the system may classify the caller as one interested in high-end goods. Further, the timing of contact may be utilized to classify a caller. For example, a "night owl" who contacts the system after midnight to purchase computer products may be identified differently from a user who contacts the system at 6:30 in the morning.

As yet another aspect of identification, multiple individual items of identification may be combined or otherwise utilized in combination to provide yet further identification, confirmation or verification of identity.

While user identity may be obtained from the particular contact with the system, that identity, or further identifying data, may be entered during a preliminary or registration phase 306. In such a phase, additional information may be acquired. The data may be acquired in response to specific questions, or through an iterative or interactive approach.

Optionally, the forms of identification may be used in combination to provide higher level of specificity, such as to move from a local identification to a specific customer identification. One mode is to utilize further specific identification, such as initials, or to otherwise designate an identity. Alternatively, or in combination, once the suspected specific customer identification is arrived at, this may be confirmed with the user, e.g., by confirming "Is this John Smith?". Verification may be utilized, such as through provision of personal data, or through provision of an electronic signature or other secure and verifiable means of identification.

The identification may be obtained either automatically or in a non-automatic fashion. Automatic collection of identification may include the receipt of ANI information or electronic identification for electronic commerce or information provision. Non-automatic methods may include data entry, typically in response to prompts, such as through use of an interactive voice response unit.

The final aspect of the primary transaction is the completion or consummation of the primary transaction. In one implementation, the primary transaction may be completed, such as through consummation of a sale or completion of a service call or request. In yet other aspects, the primary transaction may be concluded, though not with the provision of the originally contemplated good or service. For example, in the context of a service contact, if the upsell is successful in providing the user with a replacement product, the primary transaction need not be completed. Optionally, at the caller's discretion, the primary transaction could be completed, such as where a caller does purchase a replacement product, but yet still wishes to obtain service on the product that formed the basis for the original contact, and for the upsell.

After the primary transaction phase 300, the item selection phase 310 is entered. Within the overall contemplation of the system, it may be desirable to include a correlation unit 312 for matching one or more initial contact designators with yet another designator adapted for use in subsequent processing, such as database access. For example, when a caller's telephone number is obtained, and a specific identification arrived at, the correlation unit may provide the user's social security number for further access to databases in which that number provides a key or address. By way of example, third party databases may require specific forms of identification for accessing the databases, such as a combination of social security number and PIN number and that information may be provided from the correlation unit based upon the identification data obtained from the user. In this way, different outputs may be utilized for accessing third party databases, keyed to those databases, without requiring the user to excessively input identification information. Once the correlation unit has obtained unique, individual identification, it may provide the other forms of identification to yet further databases or other components in the system.

The identification of an upsell product or offer is divided into the aspects of identification and obtaining of inputs 300, the upsell determination 310, the output for subsequent offer 350 and, if applicable, order handling 360. As to the inputs for the upsell determination, they include the identification data 302, described previously. Further, demographic data 316 may be utilized relating to the user. The demographic data may be obtained from a database and be either raw data 316' or analyzed data 316". Data relating specifically to the customer 320 may include age, sex, income (either actual or estimated), profession or occupation, education level, family status, e.g., married, divorced, widowed, children, grandchildren, and specific data relating to them, lifestyle indicators, e.g., active outdoor, etc., address (specific address, city of residence, county of residence, state of residence, zip code, zip code plus 4), known interests, known subscriptions, known affiliations (e.g., service organization, alumni association, fraternal organizations, charitable organizations, etc.). In addition to specific information on users, the user may be associated with a code or designator which indicates others of a expected or suspected similar set of interests or reactions to an upsell. For example, the system may identify by code "422" those who are males in the 35-40 year old age bracket, with incomes in excess of $40,000 per year, with an interest in computers. That code may then be used as an input to the upsell selection system.

Credit data 332 may be checked in the course of the primary transaction, as well as in the course of generating inputs or processing for the upsell determination. In one aspect, the credit verification may take place in conjunction with a credit verification for the primary transaction. If the primary transaction is a purchase transaction, the credit verification may be obtained for the primary transaction, and then either obtain a specific credit authorization for an amount equal to the expected upsell, or obtain an indication of the amount of available credit remaining. If the amount of available credit remaining is provided, that will provide an indication of the preferably upper bound on the cost of the upsell offer.

Yet another form of database information includes inventory data 336. In determining the items for upsell, the inventory database may be consulted before, during, or after the upsell determination. The upsell may discount the offering of a product that is unavailable at that time. In another aspect, the system may yet still offer the product if it will become available in a timely manner. As yet a further aspect of inventory status, a delivery time window may be included, such that if the product cannot be obtained from inventory and delivered to the customer in a timely manner, that product is not offered as an upsell.

Third party possession 338 databases may be utilized. A manufacturer may maintain a database which maintains what it believes to be an accurate count of items possessed by the user, or an intended recipient of the sale or upsell. For example, a seller of china or formal dining services may maintain a database of the number of place settings of a particular pattern owned by a potential recipient of yet further settings or related goods. In this way, an input to the upsell determination unit may include the offer of specific items of merchandise that complete or compliment existing possessions.

Turning now to the upsell determination 340 or the selection of the product or service for offer, generally, the system comprises a multiple input, dynamic, preferably real-time system for the selection of a suggested product or service to offer to a potential customer or user. The process includes the identification or selection of a set or subset of all possible goods or services available for offer, with the goal of optimizing the likelihood of upsell, as well as achieving customer satisfaction.

In one aspect, the upsell determination system may utilize, in whole or in part, a system that bases the offer of an upsell based upon prior successful upsells. Thus, if a customer is categorized as being in class 422 who called a telemarketer to buy product X, and was successfully upsold product Y, if a later customer in class 422 contacts the system, the past success may be utilized as a factor in again offering the product Y to the caller.

Various historical factors relating to a specific customer, or to known classes of customers may be utilized. The selection criteria may include negative decision criteria, such as not trying to upsell a customer on an item that the system knows he has previously purchased, or has previously been offered but declined to purchase. Yet another form of negative decision criteria consists of not offering as an upsell a product that is competitive to the underlying or primary transaction. The competitiveness of the primary transaction and the upsell transaction may be in the nature of different types of goods for the same purpose, such as where the primary transaction relates to a gas barbecue but the upsell transaction relates to a charcoal barbecue. Alternatively, the competitive nature may relate to the source of the goods or the sponsor of the call, such as where the primary transaction relates to a first merchandiser, but the second or upsell transaction would relate to a second merchandiser believed to be competitive to the first merchandiser. By way of example, if the primary transaction consisted of a call to LL Bean, the upsell transaction may be subject to a negative criterion such as to not offer an upsell to Lands End. The negative criteria constituting the competitive goods or vendors may be defined in a list stored in memory within the system.

In yet another aspect, a negative criterion may consist of a determination that the caller simply is not a good prospect for a potential upsell. For example, if it is determined by the system that the probability of consummating the upsell transaction is less than a certain percent, e.g., 20%, it may not be economically beneficial to continue with the interaction with the user. This negative criterion has particular applicability where e.g., the sponsor of the system, incurs toll or transport charges such as where a telemarketer pays the charges for the "toll free" call to the telemarketer. In one form of a business model, the sponsor of a primary transaction may be willing to permit an upsell offer to be made, for a fee, upon the completion of the primary transaction. For example, if LL Bean is the sponsor of the primary transaction portion of the call to a telemarketer or a contact to a website, they may be willing to permit an upsell offer to be made on behalf of another vendor in return for a fee. Considered in light of the negative decision criteria, if the cost of the fee to offer the upsell paid to the sponsor of the primary transaction exceeds the probability weighted return to the sponsor of the upsell, the negative decision criteria may suggest to forego the upsell offer with regard to that user or caller. To provide a specific example, if the sponsor of the potential upsell must pay the sponsor of the primary transaction $3.00 for the opportunity to offer an upsell to the customer of the primary transaction vendor, and if the return for a consummated upsell transaction is $10.00, if the probability of consummating the upsell is less than 30%, the negative decision criteria may be set such that the upsell is not made, or that an alternative upsell is offered.

In yet another implementation of a negative criterion, a list may be obtained or generated which comprises a list of potential customers to whom no offer is to be made. The negative criteria may relate to the upsell transaction, or more generally, to both the primary transaction and necessarily, the upsell transaction. Such a list might consist of customers who have exhibited high historical rates of return of merchandise, or who have engaged in illegal or fraudulent activity in the past.

With regard to the negative decision criteria, various actions are possible. One option is to block the call or contact such that the caller or user never is able to even initially access the system. Yet another action may consist of shortening the call so as to terminate the interaction earlier than would otherwise be expected.

In yet another aspect of an upsell transaction, it may occur that a caller or Internet user has requested to be included on a "do not call (or contact)" list. When a person contacts the system and is identified as being on such a list, it may be desirable to offer them the good, service or information that the vendor is otherwise precluded from offering. By way of example, a person may have requested to be on a do not call list regarding long distance phone service solicitations. Should that person call or contact a system for a primary transaction, and is then identified as a person on a do not call list, the vendor who is precluded from contacting the potential customer may pay a premium for the chance to upsell their service to the potential customer.

The system may utilize prior purchases as a factor in determining the upsell for offer. Prior purchases may indicate areas of interest, suggesting the offer of further goods within that general area of interest. For example, a customer who has previously purchased clothing for use in mountain biking may be more susceptible to an offer for mountain bike related goods or services. In a similar vein, theme sales may be utilized. When it is known that the customer has previously purchased a portion of a set, the completion of the set may be a goal. Certain theme sales are based on periodic introduction of a new item, such as a yearly addition of a tree ornament or the like.

Other factors affecting the upsell may include inputs comprising areas of interest, such as based upon known subscriptions, prior contact of the user to other sites, such as other Internet sites may be utilized by the system to determine a user's possible interests, and therefore, their susceptibility to the upsell of particular goods or services. Yet another aspect of basing the upsell selection on prior purchases may include upgrades to prior purchases. For example, where the system determines that the user has previously purchased a computer of a given make and model, the system may offer as an upsell a good or service particularly adapted to improve the performance of the system of the user, such as provision of additional memory, or other modified component. Similarly, if a user is known to have a given version of software, the system may elect to offer a new version of the software. Obsolescence of prior purchases may be determined. This may be from the passage of time, updating of a product, or outgrowing of a prior purchase.

Yet other facts affecting an upsell may include relative considerations. For example, relative proximity to key calendared dates 318 for the user, or others associated with the user, may be incorporated. The relationship of traditional gift giving days to the date of contact may be utilized. Examples would include proximity to known birth dates, Christmas, Hanukkah, anniversaries, Valentines Day, etc. Further, family or relationship status may be utilized, such as offers of products for purchase for children, grandchildren, or others with whom there is a known established relationship.

The frequency of the upsell may be varied based upon expected receptiveness to the upsell at that time. Certain users may, through past particular experience with that user or through assumed desirability based upon studies of others, may determine the frequency with which upsells should be offered, whether to offer an upsell every time there is a contact, every other time, only in association with certain days or date (such as pay days), etc. The frequency may also be decreased if the user has manifested a lack of receptiveness to the offers in the past, or to a certain type or class of offer.

Multiple upsell items 326 may be utilized. In the telemarketing context, the telemarketer may have displayed to them multiple options, either for selection by the telemarketer, or for sequential presentation to the caller. In the electronic commerce context, multiple offers may be made such as on a screen, or provided sequentially to the caller.

Figure 8:
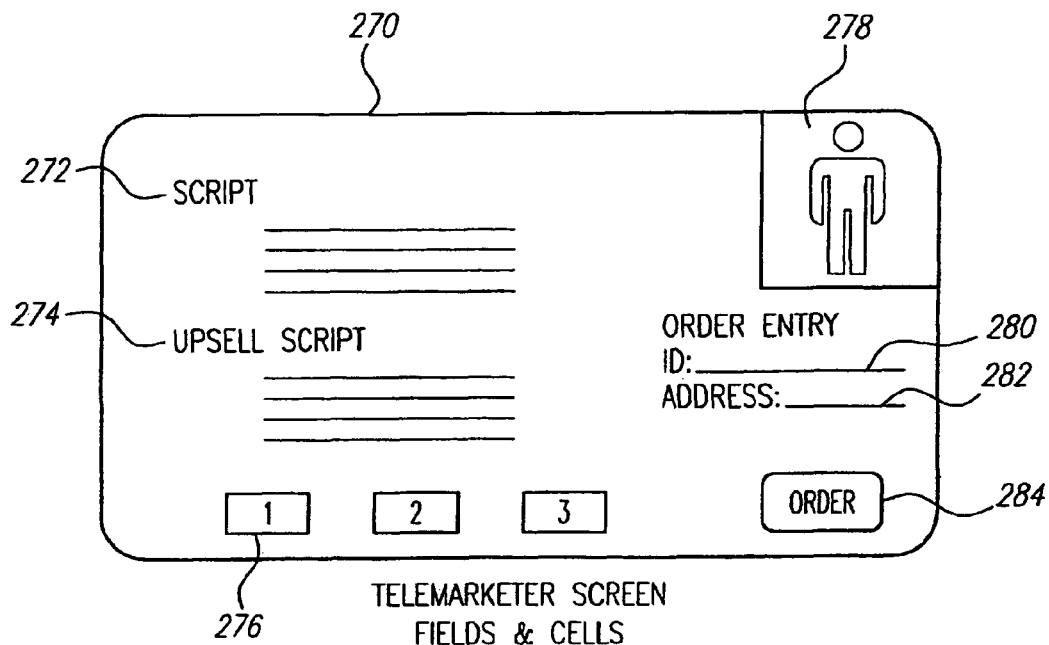
FIG. 8 shows a representative screen display for a telemarketing operator.

The third main component of the upsell consists of the actual offer 350 of the upsell to the user. In the event of a telemarketing upsell offer, the typical mode would include a display on the telemarketer's screen of various script or product information 354, which is then provided to the caller. FIG. 8 shows a representative screen for a telemarketer display. The display 270 may include script 272 for use by the telemarketer for interaction with the caller. Specific upsell scripts 274 may be provided, either as a single option for the telemarketer, or to provide multiple options for selection by the telemarketer. Soft keys or icons 276 provide for selective identification of entry by the telemarketer. Various text or numeric based fields 280, 282 may be provided for entry of information, such as order entry, and specifically including identification data 280 and address data 282. This data may be initially provided automatically from the system, for possible confirmation by the telemarketer, or may be initially input by the telemarketer. Optionally, if image information is provided during the transaction, image 278 may be depicted on the display 270. By way of example, if a videophone system is utilized, the image of the caller may be displayed. Additionally, or alternatively, if image or video is provided from the telemarketer to the customer, those images may also appear on the telemarketer's screen 270 in region 278 to provide the telemarketer the same (though possibly in reduced size such as a picture-in-picture) which is simultaneously being provided to the customer. An order entry icon, tab or button bar 284 may be utilized.

The mode or manner of the offer 352 to the customer may also be varied. The customer's prior history or a determined optimum mode or manner of offer based upon customer designation may be utilized. Certain customers or customer designations may be best offered the upsell in a business-like, straight-forward manner, e.g., "We have a special offer for you today . . . ". Other potential customers who have manifested less than an eagerness to be upsold in the past may be initially addressed with a message of an apologetic tone, e.g., "I know you to not typically consider other times, but we have something that we think you will find worth your time to consider . . . ". Yet other presentations may be in a more elaborate or flowery manner, such as in the addition of music, other audio, images, video. The coded designators, or other data regarding the user, may be used in determining the mode or manner of the offer.

If the upsell is consummated 356, the order may be confirmed. That confirmation may be printed, if desired. Further, the customer may be provided with a confirmation number. If a shipping/tracking unit 364 is utilized, the tracking information, and the mode of accessing that system, may be provided to the customer. In the event the upsell offer is not consummated, the user may be offered an alternative upsell 358. The alternative upsell may be determined before the initial upsell, or may be recomputed, wherein one of the inputs to the determination system includes the negative result from the first upsell offer. Optionally, the customer may be queried regarding their reaction, either positive or negative, with respect to the initial upsell offer, so as to provide yet further specific inputs to the upsell determination system.

The system may be modified over time. For example, the success of prior upsells of specific items may be further incorporated in the decision as to the upsell offers 370. This modification of the rules over time may be either done in real time, or on a periodic basis, such as in a batch mode. Further, the system may receive data from users after the receipt and use of their obtained goods or services, such as wherein the customer satisfaction with the goods and services is then incorporated in the decision criteria for the upsell offer.

Figure 7:
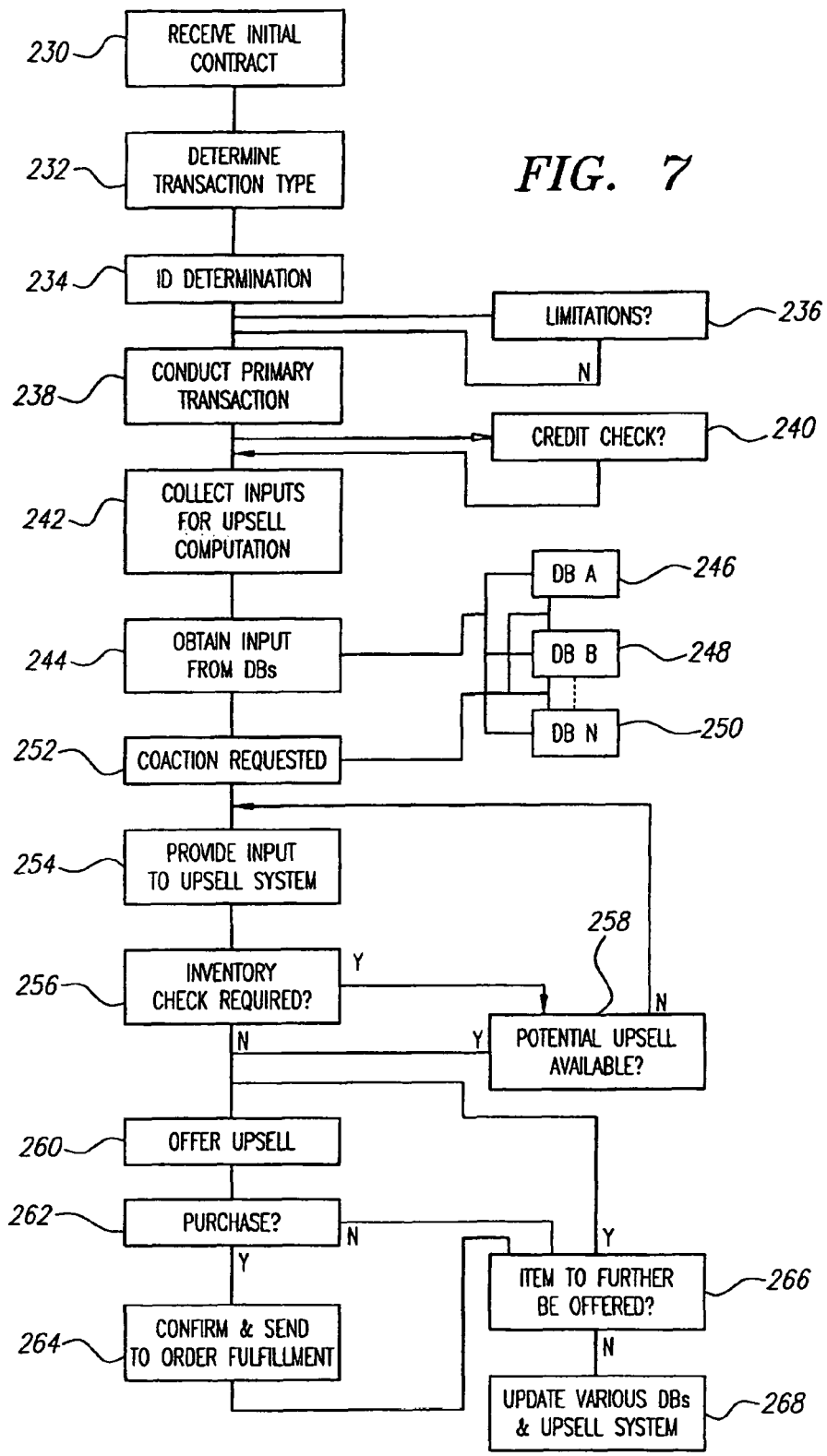
FIG. 7 is a detailed flowchart for one implementation of the methods of these inventions.

FIG. 7 shows a flowchart for one possible path through the system. Upon receiving an initial contact 230, the transaction type may be determined at step 232. Various identification determinations 234 may be collected and then used in determining whether any limitations 236 are to be applied, which if not, the transaction may then be conducted at step 238. Optionally, a credit check 240 may be performed, either for the primary transaction alone, or further, for a potential upsell. The inputs having been collected 242 from prior interaction, database checks 244 may contact and interact with database A 246, database B 248, . . . database N 250, possibly under control when co-action 252 is required. The inputs having been collected are then provided 254 to the system. Optional inventory checks 256 may be performed and then utilized step 258 to determine if the potential upsell item is available. Once the upsell has been determined, the upsell may be offered in step 260, which if purchased at step 262 may then be confirmed and sent to order fulfillment step 264. Optionally, further items may be offered, step 266, in which case the upsell determination may be repeated, or the previously determined second upsell item offered. Typically at the end of the transaction, at step 268 the system will update various databases as appropriate and the upsell system, including the criteria for determining the upsell.

In the offering mode of the website, one variation may include the ability to transfer from the website to a live operator. Such a transfer may be useful wherein the potential customer is interested in obtaining further information regarding the offered product, or has queries that cannot easily be addressed in a web or electronic commerce context. As described in connection with the telemarketing screen, FIG. 8, the screen for the electronic commerce applications may include a display of the live operator, and may also include a display on the live operator console of the customer, if desired.

With regard to the billing system, in one aspect of this invention, it is possible to allocate billing 368 for use of the system. For example, if the primary transaction is financed by company A, and an upsell in the economic interest of company B is successfully effected, piggy-backing on the primary transaction of company A, an accord or allocation may be made between company B and company A regarding payment for the services. Typically, company B would make a contribution to company A, or in some manner reduce the cost for company A to conduct the primary transaction. Consistent with the allocation of expenses between two or more companies, it should be expressly noted that in the upsell system of this invention, the goods or services offered may come from independent sources. That is, the primary transaction may relate to a good or service from company A, and the upsell relate to a good or service from company B, where company A is unaffiliated with company B.

Figure 9:
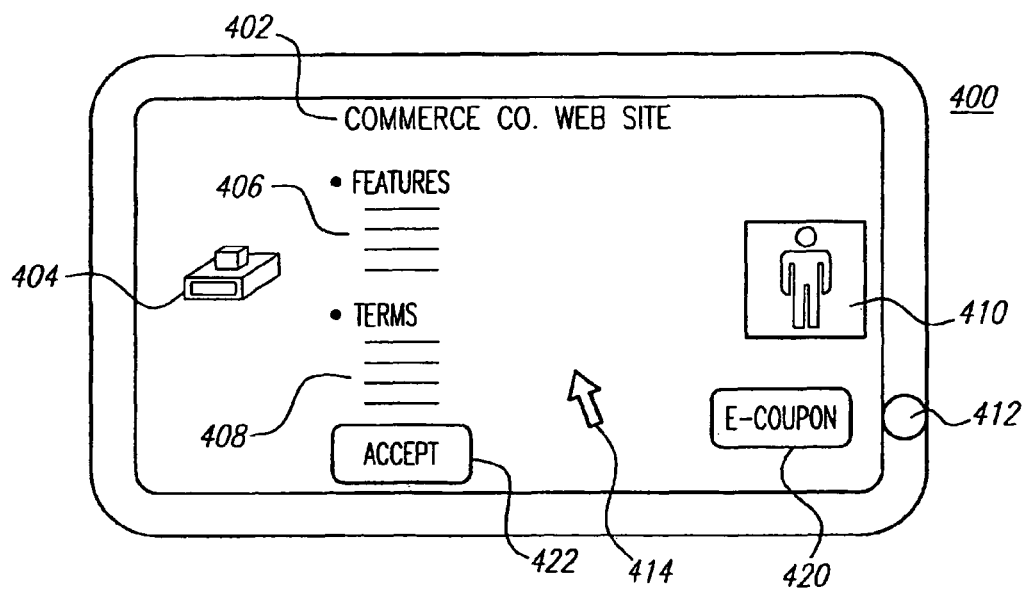
FIG. 9 shows an illustrative display for an Internet-based display.

FIG. 9 shows a highly simplified depiction of a display such as used in one implementation of a electronic commerce application utilizing the inventions of this system. The overall display 400 may include textual information 402 identifying the affiliation of the provider of the good or service. A graphical depiction 404 of the good or service may be provided, which is either a still image or includes motion. Information regarding features 406 may be provided as well as may be the terms 408 of sale, lease or other interchange. Optionally, a display 410 provides a video feed such as from a telemarketing or other operator assisting the user, or provides a created image regarding a assistant for the transaction. Speakers 412 may be optionally utilized to provide audio information, either being one-way communication or two-way communication. Typically, some sort of a pointer 414 is displayed on screen 400 to designate the area of data for entry. For example, an acceptance 422 region may be clicked, or double clicked as required, to accept an offer. Optionally, an electronic coupon 420 or other form of coupon may be provided to the user in a real time manner for later use. The coupon may be for a discount on a later purchase, or may otherwise be a form of incentive to the customer, such as the award of credits that may be accumulated for exchange into other goods or services.

Figure 10:
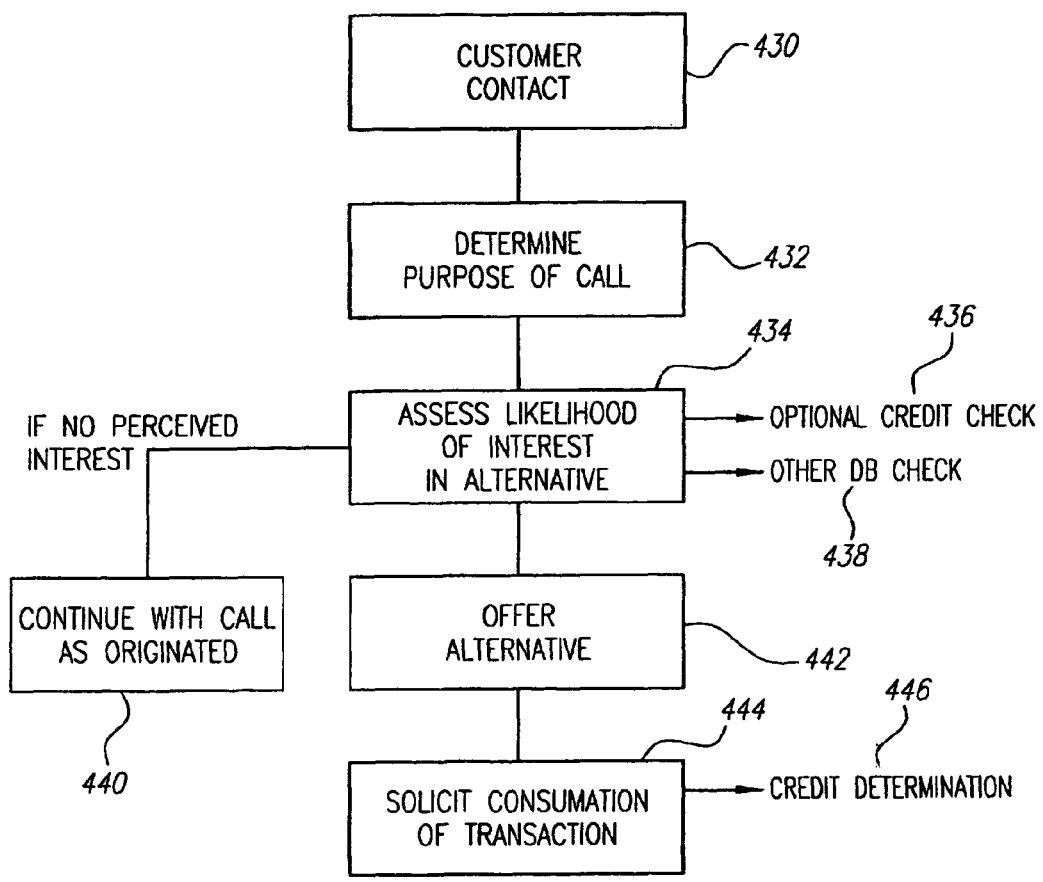
FIG. 10 shows a flowchart for a customer service application.

FIG. 10 shows a high level flowchart for a customer service operation. Upon customer contact 430, the purpose of the call 432 may be determined. The purpose may be determined such as from knowledge of DNIS as indicating a customer service number, or by response by the customer to queries, such as from a live operator or interactive voice response system (e.g., press 1 for purchase, press 2 for service . . . ). Decision block 434 optionally provides a preliminary assessment of the likelihood of interest in an upsell or alternative presentation. In the event an offer is to be made, checks such as a credit check 436 or other database check 438 may be made. The input data is then provided to a processing, upsell system (as described previously) from which an alternative 442 may be generated and offered. The system may optionally then solicit consummation of the transaction 444, and may, if required, again access for credit determination 446. In the event that it is perceived at decision block 434 that no interest exists in an upsell, the system may continue with the call as originated 440. By way of example, assume that a user calls a service number regarding an integrated cellular phone and paging system. The system may obtain the ANI (or mobile identification number) and determine based upon the DNIS that a particular customer is calling a service number. After optionally confirming that the call relates to the repair of the phone/pager associated with the ANI or MIN, the system may determine that this product is sufficiently old that an upsell should be offered for a replacement item. By accessing a database, such as the cellular systems local database, it may be determined that the caller has a now supplanted model of phone, and possesses sufficient credit worthiness to purchase a new system. At that point, the system may offer the caller a purchase option for the replacement item, thereby effecting an upsell from one transaction type, namely, a service contact, into a separate type of transaction, such as a purchase transaction of a replacement or superior item. In this way, an upsell is effected.

FIG. 9 shows a perspective view of a wireless system that utilizes position information in a potential upsell or intelligent information selection application. A user, shown within the automobile, may operate a wireless unit. The wireless device communicates with an antenna. The signal from the wireless unit sends identification information, such as a mobile identification number (MIN). Additionally, position information such as from a GPS receiver may be provided. Combined cellular and GPS systems may be utilized. Yet other position detection systems may be utilized, such as triangulation-based systems. As shown, a billboard may provide advertisement information and prompt the caller to dial a telephone number or code, e.g., *72, for further information. A response to the inquiry may utilize the identification information, such as the MIN, as described within this application and utilize that information to intelligently select a good, service or other information for presentation to the user. By way of example, certain vehicles are currently equipped with systems that place an outgoing wireless call to a service, but also provide position information regarding the caller. One such system is the ONSTAR™ system that may be activated either by the caller depressing a button that causes the preprogrammed dialing of the number corresponding to the service, as well as to provide geographic GPS information. Alternatively, the system is designed to automatically call the service in the event of an accident, such as would be indicated by the deployment of a safety system, such as the airbags deploying. Such a contact to a service identifies both the calling vehicle (e.g., through use of the MIN) plus provides geography information, and optionally, provides information regarding the status of the call, e.g., was the call initiated by the caller or automatically activated because of a safety based call. Some or all of that information may be utilized in an automated system, with or without the additional use of live operators, to select information, goods or services for presentation to the potential customer. For example, if the call were automatically initiated because of airbag deployment, the system could utilize that information, optionally with other information keyed to the identity of the user, such as hotel preferences to select an offer a hotel based upon the assumption that they would reside in that geography for the night. Rather than merely providing a recommendation untailored to the particular caller, the use of the identification information coupled with knowledge about that caller and their circumstance may lead to a better selection of good, service or information.

Considering wireless devices more broadly, a customer utilizing a wireless device, such as a cellular phone, Palm Pilot VII, or other wireless communication or web access device, may provide geographic position information regarding the user of the system. That information may be obtained via global positioning satellite (GPS) information, or may be taken from knowledge of the base station position. In the wired domain, the geographic position information may be obtained at various levels of granularity, such as through the use of area code information, or more specifically, exchange information, or yet even more particularly, through the use of various databases which map telephone numbers to specific geographies, such as a caller's street address. The geographic position of the user may be determined via an access point to a system, such as where a customer utilizes an automated teller machine (ATM) on a network. The geographic position of the user is known based upon their interaction with the network. By way of example, a person accessing an ATM network is identified by information read from the magnetic strip of the bankcard (or provided by a smart card type technology). The identification is of both the customer and of their bank. The bank knows the geographic location of the ATM. From this information, it may be inferred that the customer is outside of their ordinary geography, and presumptively on a trip. In certain circumstances, it may be safe to assume that the user is on vacation, such as where the ATM is located at a resort location or entertainment facility. That information may be utilized by an intelligent system to provide goods, service or information to the user, such as to provide coupons to the ATM user for a free children's meal.

The geographic information may be utilized in combination with other information in determining an offer or upsell. By way of example, the system may know the position of a potential user of a good or service based upon position information from a GPS system, and may utilize that information in offering a good or service, such as a discount coupon, at a geographically local store. Such an offer may be made as the result of a caller contacting the system, or may be provided in an outbound or push based context where the system contacts the potential user of the offer, such as by calling their cellular phone or other wireless device. The geographic position information may additionally be combined with data or information regarding the geography of the person. For example, if the positional information indicates that the person is in a casino at midnight, it may be a valid assumption to assume that the person is not risk averse.

Mobile Commerce Embodiments

Figure 13:
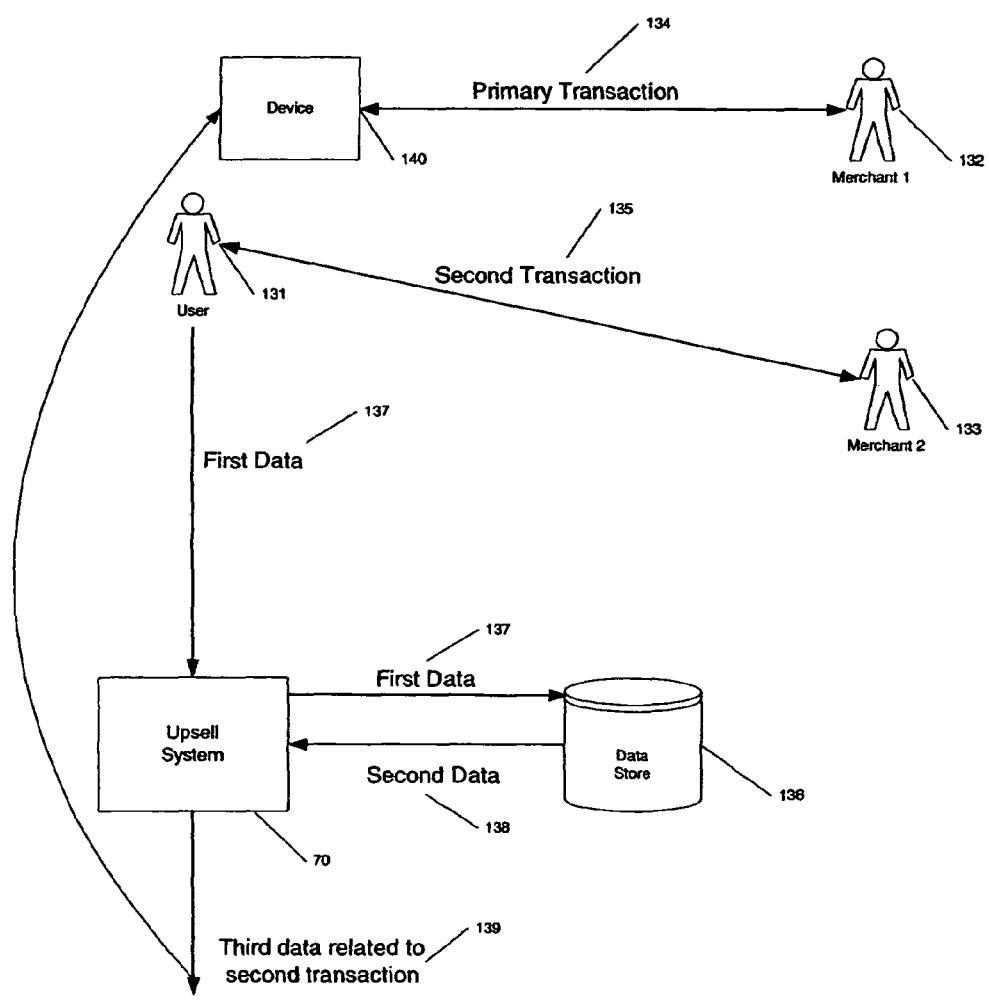
FIG. 13 is a block diagram illustrating additional mobile commerce embodiments of the invention.

FIG. 13 is a block diagram illustrating additional mobile commerce embodiments of the invention. Various aspects of the invention provide methods and systems for processing data associated with a primary transaction 134 involving a user 131 and at least a first merchant 133, so as to at least suggest that the user 74 conduct at least a second transaction 135 with at least a second merchant 133. One way to visualize a system constructed to support execution of the method herein is as "virtual shopping mall," a definition of which is a network of brick and mortar and online merchants that are interconnected by the upsell system 70 and supporting databases (such as data store 136), such that a first transaction 134 with a first merchant 132 is processed by the system 70, resulting in some incentive being provided to the user 131 to conduct at least a second transaction with the second merchant 133. In this sense, the upsell system 70 serves as a "link" with at least one of the merchants 132 or 133 so as to provide incentives for users 131 to conduct further business with the merchant(s) 132 or 133.

An illustrative embodiment of the method includes at least initiating the primary transaction 134 with the user 131, obtaining first data 137 to identify the user 131 during the primary transaction 134, obtaining second data 138 associated with the user 131 based upon the first data 137, and presenting third data 139 to the user 131 based upon an analysis of the first and the second data, the third data 139 being related to the second merchant 133. Each of these sub-steps and others will be fully discussed below. Typically, the user 131 uses a wireless device 140 to at least initiate the primary transaction 134. While FIG. 13 illustrates an embodiment wherein the same device 140 is used to conduct the primary transaction 134 and to receive the third data 139. However, as discussed in more detail below, a different device 140 may receive the third data 139.

The primary transaction 134 is discussed above. The primary transaction 134 need not be completely consummated, but the user 131 typically takes at least some concrete step toward initiating the primary transaction 134, such as by powering-up a communications device 140, dialing a telephone number, or the like. Various forms and types of primary transactions 134 provided by these embodiments are discussed below.

In various illustrative embodiments of the invention, the primary transaction 134 may be a subscription and/or an activation procedure typically done in connection with communication devices 140, especially mobile and/or wireless communications devices 140. The term "subscription" refers to any procedure by which the user 131 enters into any contractual arrangement necessary for the user 131 to use the device 140 or the services associated therewith. The term "activation" refers to any procedure, typically but not necessarily occurring contemporaneously with or after subscription, by which the device 140 itself or the associated services are finally prepared for use by the specific user 131 who has subscribed to use the device 140 and associated services. Typical mobile or wireless devices 140 as contemplated hereunder include any one or more of the following: a cellular telephone; a wireless-enabled personal digital assistant; a pager or other messaging device capable of transmitting or receiving a text message; a satellite-based radio, television, or telephone; a satellite-based navigation system; an in-vehicle, satellite-based navigation system; an in-vehicle, satellite-based telephone system, or the like. The device 140 as shown in FIG. 13 and referenced herein will be understood to refer to any of these examples.

The subscription procedure can take any known form, including by the user 131 placing a telephone call to a provider of services related to the communications device 140, or to a third party acting on behalf of such a provider of services, such as a reseller or value-added reseller. Further alternatives include an in-person visit by the user 131 to a physical storefront of the service provider or that of a third party, or by the user 131 visiting a website associated with the service provider or that of a third party.

Likewise, activation can take any known form, including entering codes, passwords, or other types of configuration data into the device 140, into a computer-based account associated with the device 140, or the like. In any event, according to various embodiments of the invention, the subscription and/or activation can serve as the primary transaction 134 (or "triggering event") for the method as set forth herein, such that user-specific first data 137 obtained from such subscription and/or activation is input to the upsell system 70 for processing. Ultimately, the user 131 may have third data 139 in the form of an upsell offer—selected and presented according to the teaching herein—awaiting him/her after the subscription and/or activation is complete and the user 131 uses the device 140 for the first time.

In other embodiments of the invention, any specific communication conducted using the device 140 after activation and/or subscription may serve as the primary transaction 134. To serve as the primary transaction 134, a given communication need not be completed to a specified point, but instead, merely initiating a given specific communication may be specific. For example, suitable triggering events might include the user 131 powering-up or turning on the device 140, entering any type of data into the device 140, or actually completing a given communication involving the device 140. Specific types of transactions might include initiating a specific communication with a communications device 140 to place an order for a specific item, to inquire about a specific item, to request customer service, to conduct a financial transaction, to request directory assistance information, or the like. For any of these types of primary transactions 134, the subject matter of the transaction can be input to the upsell system 70. For example, if the user 131 calls directory assistance—as first merchant 132 to request a listing for a nearby sporting goods store, this information is routed to the upsell system 70, which might analyze this information in conjunction with other information related to the user 131 to determine that the user 131 may have an interest in golf. The upsell system 70 may then generate third data 139 in the form of an upsell offering the user 131 a discount or other incentive to visit a second merchant 133, such as a golf-related retail outlet.

According to other embodiments of the invention, the method can include initiating a primary transaction 134 in the form of a communication using a device 140 capable of communicating either directly or indirectly with at least one satellite. Examples of such devices 140 might include devices 140 provided as part of satellite-based radio systems such as XM RADIO™ or SIRIUS™, satellite-based television systems such as DIRECTVT™, or satellite-based navigation systems, otherwise known as global positioning systems (GPS). The term "satellite-based" device 140 as used herein refers to a device 140 that is part of an overall system that includes at least one component adapted to communicate with a satellite orbiting the Earth. This component in turn communicates with the rest of the system to enable the system to fulfill its essential purpose, such as presenting radio or television signals to the user 131 or determining the current geographic position of the user 131. The device 140 with which the user 131 interacts need not in turn interact directly with this component, and the component may be integrated into or separate from the device 140. In general, the device 140 is preferably capable of communicating either directly or indirectly with a satellite and of facilitating operation of radio, television, navigation, or other satellite-based equipment. For example, in a satellite-based car radio context, the component that communicates with the satellite may be included on-board integrally with the rest of the radio unit with which the user 131 interacts, or may reside in a unit separate from the radio with which the user 131 would not typically be expected to interact.

Initiating the primary transaction 134 in this satellite-based context can include tuning the device 140 to a specific channel, or simply turning on or powering-up the device 140. In various embodiments, data representing the viewing or listening history of the user 131 can be routed as input to the upsell system 70 to help identify specific areas of interest to the user 131. For example, if the upsell system 70 determines that the user 131 listens predominately to a dedicated jazz channel on a satellite-based radio system, the upsell system 70 may analyze this information along with other information to identify and formulate third party data 139 in the form of an appropriate upsell offer, for example, an incentive to visit, a second merchant 133 music store, or to purchase a specific jazz album. In this example, the first merchant 132 may be the satellite-radio services provider. Another example might be analyzing data representing the user's history of viewing specific programming on a satellite-based television system.

Turning in more detail to illustrative GPS embodiments, initiating the primary transaction 134 can include the user 131 interacting with a navigation system capable of communicating with at least one satellite, as discussed above. This interaction can include the user 131 manually entering data into the navigation system or entering such data by speech or voice input, including processing such speech or voice input using known speech recognition/analysis systems. In various embodiments, this entered data can represent a travel destination, at least a portion of a route from a travel origin to a destination, or a travel origin, or an intermediate point along the route.

In various embodiments of the invention, the method can include obtaining first data 137 to identify the user 131 by obtaining data provided by a communications network accessed by the user 131, or otherwise related to the device 140. As an illustrative but non-limiting example, Automatic Number Identification (ANI) technology is well known as a means by which a telephone network can forward information identifying the billing number from which a telephone call originates. In the wireless network context, similar technology enables the wireless network to forward information that identifies the originating device 140 by using the Mobile Identification Number (MIN) and the Electronic Serial Number (ESN) associated with a given mobile device 140. It is well known in the art to validate an incoming call from a mobile user 131 by examining the MIN/ESN pair associated with that call, with the ESN being a unique identifier for a given hardware device 140, and the MIN providing the telephone number assigned to that device 140. These technologies provide various non-limiting examples of first data 137 that can be used to identify a device 140 from which the user 131 accessed the communications network.

Given the ANI, MIN/ESN, or other similar first data 137 identifying the originating/billing number from which the user 131 is originating a call or identifying the device 140 used to place the call, this first data 137 can readily be mapped to additional data corresponding or related to the user 131, for example stored in first data 137. This information can include account information related to a subscription associated with the user 131, for a non-limiting example, a subscription for wireless communications services. Conversely, in some circumstances, the user 131 may provide the account information directly, rather than deriving it indirectly from the originating telephone number or a hardware serial identifier as described above.

In further embodiments of the invention, the method can derive the account information by having the device 140 actively provide information to the communications network when the device 140 is turned on. Alternatively, the network may poll or ping the device 140 periodically thereafter to extract information from the device 140 in a more passive manner, from a device standpoint.

The identity of the user 131 may also be established using voiceprints or other biometric means. In an illustrative but non-limiting embodiment, obtaining first data 137 to identify the user 131 can include obtaining a test sample of the user's voice and identifying the user 131 by comparing the test sample to a control voiceprint known to be associated with the user 131. Other embodiments can include capturing fingerprints, thumbprints or other biometric information from the user 131, and using them to authenticate or identify the user 131.

In still other embodiments, the method can include obtaining first data 137 in the form of identification data directly from the user 131, rather than deriving it indirectly as set forth above. In other words, the user 131 can simply self-identify when initiating the contact. As an anti-fraud measure, however, it may still be prudent in certain applications to confirm or corroborate the user's self identification using any of the indirect derivation means discussed herein.

As discussed above, the method includes obtaining second or further data 138 associated with the user 131. In various embodiments of this aspect of the method, the second data can be obtained during or in real time with the primary transaction 134. However, other embodiments include obtaining the second or further data 138 after the primary transaction 134 is completed, or otherwise not in real time with the primary transaction 134. In these latter embodiments, a bulk file containing information associated with numerous primary transactions 134 conducted with various different users 131 can be compiled and processed by the upsell system 70 to yield further information 138 related to each user 131, with a view toward generating third data 139 in the form of upsell transactions to be offered to each user 131 in the future.

The second data 138 obtained can take various forms in different embodiments of the invention. In addition to the various forms discussed previously, this second data 138 can represent specific prior transactions involving the user 131 that can suggest an area of interest to the user 131. These specific prior transactions can include, but are not limited to, prior purchases, inquiries, customer service requests, or requests for directory assistance involving the user 131. These prior transactions may be accessed from data store 136.

When the second data 138 refers to past specific transactions involving specific goods, those goods may be organized into at least the following illustrative, but not exclusive, set of categories. A first category includes goods having a relatively definite expected service life and needing replacement after expiration thereof. Common examples might include automobiles, tires, batteries, clothing, or other goods (durable or otherwise) that have similar characteristics. When it can be determined that the user 131 purchased an item of this type at a given point in the past, when the expected service life of the item is soon to expire, then possible third data 139 in the form of candidate upsell transactions include directing the user 131 to a merchant(s) 133 offering suitable replacement item(s).

Another category of third data 139 in the form of specific items might include items characterized as repetitive-purchase or consumable items, such as (but not limited to) fast food, movies, sporting events, or the like. For example, if past transaction history data indicates that a given user 131 frequents a given chain of restaurants for lunch, and the method determines that the user 131 may be ready to eat lunch, then possible third data 139 in the form of candidate upsell transactions may include directing the user 131 to a nearby restaurant that is a member of that chain. Likewise, if second data 138 in the form of previous transaction history indicates that the user 131 is a movie buff and has an interest in a particular genre or in a particular movie, and the method determines that a movie of possible interest to the user 131 is playing at a cinema near the user 131, then third data 139 in the form of a possible candidate upsell transaction may include directing the user 131 to the nearby cinema. The same example may readily be extended to sporting events near the user 131, or other types of activities.

Another category of third data 139 in the form of specific items might include items characterized as those that may periodically need accessories for proper use and enjoyment. Illustrative but non-exclusive examples might include recreational or outdoor equipment such as: hunting equipment such as firearms needing ammunition, cleaning supplies, carrying cases, optics, or other supporting equipment or the like; fishing rods needing accessories such as reels, tackle, line, weights, or the like; camping equipment; or skiing equipment. In these examples, if the user's past transaction history indicates that a given user 131 has purchased a given item, but has not purchased the accessories that typically accompany the given item, then third data 139 in the form of candidate upsell transactions might include those accessories.

Various embodiments of the method also include obtaining second data 138 in the form of data representing a time parameter representing the time at which the user 131 conducted one or more previous transactions other than the primary transaction 134 at hand second data 138 can also represent the time at which the primary transaction 134 was initiated. In either case, such time parameter may be expressed as a time of day, a time of month, or a time of year. As discussed above, this time parameter can be considered together with the subject matter of the previous transaction or primary transaction 134 to suggest possible candidates for third data 139 in the form of upsell transactions. In other embodiments, the time parameter alone may be the only further data 138 considered, without considering the subject matter of the previous transaction 134. In still other embodiments, the method can include obtaining respective second data 138 representing time parameters for both the primary transaction 134 and another transaction that occurred previously to the primary transaction 134. As before, both time parameters may be expressed as a time of day, a time of month, or a time of year. Those skilled in the art will recognize that the general data store 136 shown in FIG. 13 can be readily adapted to store this second data 138 in whatever form is appropriate in a given implementation of the teachings herein.

As discussed above, the method can include obtaining second data 138 associated with the user 131 that indicates one or more specific areas of interest to the user 131. Illustrative but non-limiting examples of these areas of interest may include a specific merchant 132 or 133 whom the user 131 appears to prefer, a favorite brand of the user 131, a specific location of a given merchant 132 or 133 that the user 131 frequents, or other specific sports, hobbies, or other activities that appear to interest the user 131.

Further embodiments of the method can include obtaining second data 138 in the form of data representing one or more accounts held by the user 131 that indicate at least one specific area of interest to the user 131. As illustrative but non-limiting examples, such accounts might include credit cards or other types of financial accounts bearing a logo of a favorite sports team, specially-branded or private label cards issued on behalf of or paying benefits to an organization of interest to the user 131, or the like.

Other embodiments of the method can include obtaining second data 138 representing one or more club memberships held by the user 131 that indicates at least one specific area of interest to the user 131. Illustrative but non-limiting examples of such clubs include customer loyalty programs, buyer's discount clubs, warehouse membership clubs, wholesale clubs, frequent traveler programs, customer rewards programs, or other types of clubs that a given user 131 might join to obtain the opportunity to purchase goods and/or services at a discount relative to non-club members. The method of the invention as described herein may be implemented as part of such a club, with a given user 131, especially a mobile user 131, being presented third data 139 in the form of upsell transactions offered on behalf of merchants 132 or 133 who may be associated with the club.

As part of joining such a club, or at some time thereafter, the user 131 may provide one or more preference parameters, which may be stored in data store 136 for subsequent retrieval as at least part of second data 138. These preference parameters may specify characteristics of specific or general goods and/or services sought by the user 131. Illustrative but non-limiting examples of such preference parameters may include a description of desired goods/services, a price range that the user 131 is willing to pay for such goods/services, a time period during which the user 131 wishes to obtain such goods/services, how far the user 131 is willing to travel to obtain such goods/services, preferred brands, expectations of quality or service life, or other similar parameters. For example, if a given user 131 were in the market for a new lawn mower, suitable preference parameters might include a price range of $200-$500, a specific brand or make of mower, and a time period of 60 days. These parameters can be routed to merchants 132 or 133 who are affiliated with the club or who are otherwise linked or networked together via the upsell system 70. These merchants 132 or 133 can, in turn, search for goods/services satisfying the user-specified preference parameters, and when the mobile user 131 is proximate a merchant 132 or 133 who stocks goods or is willing to offer services meeting the specified preference parameters, the mobile user 131 can be alerted via the device 140. In essence, the user 131 receives the benefit of window-shopping in a mall without the geographic limitations of a mall and without spending time leafing through telephone books, calling numerous merchants to check availability or pricing, or wandering through retail establishments.

According to other aspects of the invention, the method can include obtaining second data 138 representing a geographic position or location of the user 131 when initiating the primary transaction 134 and/or when conducting another transaction previous to the primary transaction 134. This geographic position or location of the user 131 when conducting such transaction(s) can be determined using a variety of known technologies, including but not limited to satellite-based positioning systems such as global positioning systems (GPS). Further embodiments utilize known technologies such as Assisted GPS (AGPS) or Wireless Assisted GPS (WAGPS), which combine the location capabilities of satellite-base systems with similar capabilities provided by mobile handsets (such as device 140) and/or network servers associated with ground-based wireless networks. Those skilled in the art will recognize that some or all of these aspects of these technologies can be deployed in a given application of the invention, depending on the accuracy requirements of that given application.

In further embodiments of the method, the geographic position of the user 131 when conducting the one or more previous transactions or the primary transaction 134 can be stored in the transaction history file (represented generally by the data store 136) for subsequent access. Storing this geographic position data enables the method to identify a merchant 132 or 133 nearby the present or the past geographic position of the user 131, with a view toward motivating the user 131 to visit that merchant 132 or 133 to conduct at least a second transaction 135 as a result of the user 131 receiving the third data 139. In addition to this geographically oriented history data, the transaction history file can store data representing the user's previous purchases, inquiries, requests for customer service, or requests for directory assistance.

In other embodiments of the invention, the method can obtain second data 138 in the form representing the user's history of viewing television programs. Such history data may be stored as a service provided by a satellite-based television network such as the DIRECTV® network, which is provided as an illustrative but non-limiting example. Further examples include devices that feature recording and delayed-playback capabilities, such as TIVO® systems or other devices and related services that provide similar functionality. Certain of these devices can be adapted to monitor the types of shows that a user 131 appears to enjoy viewing. For example, based on a user's repeated viewing of a given first program (e.g., a police drama), these system can intelligently detect any patterns in the user's viewing habits and automatically record further programs of the same type broadcast on other channels or at different times under the assumption that if the user 131 liked the first program, then he/she may also like the further programs. This record of viewer history as captured and processed by such devices can be a valuable resource when selecting which third data 139 to offer to a mobile user 131.

As discussed above, the method includes presenting the third data 139 to the user 131. This aspect of the method can include presenting third data 139 in the form of data or signals representing an upsell item or proposed transaction 135 to the user 131 on behalf of an on-line merchant or a merchant having a traditional, physical storefront, both of whom are generally represented as merchants 132 and 133 in FIG. 13. The latter merchants 132 or 133 are referred to in the art as "brick and mortar" merchants. Further, the initiated primary transaction 134 or other transactions previous to the primary transaction 134 can be conducted with either an on-line merchant or a "brick and mortar" merchant.

Upsell transactions 135 as represented by third data 139 can be offered to mobile users 131 using a variety of known devices 140, including one or more of the following, as noted above: a cellular telephone; a wireless-enabled personal digital assistant; a pager; a satellite-based radio, television, or telephone; a satellite-based navigation system; an in-vehicle, satellite-based navigation system; an in-vehicle, satellite-based telephone system; or the like. Further, the upsell item may be offered to the user 131 via the same device 140 used to conduct the primary transaction 134, or via a different device 140 from that used to conduct the primary transaction 134. For example, a user 131 traveling in a vehicle could conduct the primary transaction 134 using a mobile phone 140 and receive third data 139 in the form of an upsell offer selected in accordance with the invention via a display coupled to an in-vehicle navigation system (not shown in FIG. 13).

The method can select the upsell item, as represented by the third data 139, to be presented to the user 131 in a variety of ways. In one embodiment, the data derived from the device 140 used to conduct the primary transaction 134, or from the network with which the device 140 is associated, serves as at least one input to the upsell system 70. As noted above, illustrative but non-limiting examples of such devices 140 include: a cellular telephone; a wireless-enabled personal digital assistant; a pager; a satellite-based radio, television, or telephone; a satellite-based navigation system; an in-vehicle, satellite-based navigation system; an in-vehicle, satellite-based telephone system; or the like.

In other embodiments, the method can base the selection of the upsell item on the geographic position of the user 131, and presents the user 131 third data 139 in the form of an upsell item selected based upon a geographic position of the user 131 in relation to a merchant 132 or 133 on whose behalf the upsell item is offered. In still other embodiments, the method offers the user 131 an upsell item that is selected based not only upon the geographic position of the user 131 in relation to the merchant 132 or 133, but also upon a type of item purchased previously by the user 131. More specifically, the method may determine that a merchant 132 or 133 from whom the user 131 has purchased previously is proximate the user's present position, and that an upsell offer to incentivize or otherwise direct the user 131 to visit that merchant 132 or 133 again may be appropriate, especially, for example, if goods purchased previously from that merchant 132 or 133 may be nearing the end of their expected service life. The method can also base the upsell determination upon how much time has elapsed since the user's previous purchase from the merchant 132 or 133 or from another merchant, or upon a parameter or other data representing an expected frequency of repurchase associated with the type of item previously purchased by the user 131.

In other examples, the user 131 may exhibit a preference for a given chain of merchants 132 or 133, and the method may determine that the user 131, especially a mobile user 131, is near a first merchant 132 or 133 who is a member of the same franchise chain as a second merchant 132 or 133 from whom the user 131 has purchased previously. In this case, third data 139 in the form of an upsell offer directing the user 131 to the first merchant 132 or 133 may be appropriate.

Other embodiments of the method can consider a destination of a mobile user 131, by presenting third data 139 in the form of upsells to the user 131 that are selected based upon the destination associated with the user 131. For example, the user 131 may enter a travel destination into a GPS system as described above, a navigation system, or—even more specifically—an in-vehicle navigation system as are increasingly being offered as factory standard, factory optional, or after-market available equipment in automobiles.

Given knowledge of the user's destination, the method can present the user 131 an upsell item that is selected based upon at least one activity associated with the destination. As an illustrative but non-limiting example, if the user's destination is somewhere in the Rocky Mountain region, the upsell system 70 may offer skiing, camping, hiking, or other types of outdoor equipment as upsell items. Likewise, a coastal destination may suggest the desirability of beach apparel or the like. Given these examples, those skilled in the art can readily extend the teaching herein to other applications within the scope of the invention.

In other aspects of the method, if the user's projected route takes him/her past or near a merchant 132 or 133 who deals in such outdoor equipment or other goods/services reasonably related to the user's destination, then the upsell system 70 may incentivize the user 131 to visit that merchant 132 or 133, for example, with a coupon or discount offer applicable toward purchase of such goods/services useful for activities related to such destination. As a non-limiting example, a user 131 traveling across Nebraska on I-80 to hunt in the Rocky Mountains may pass several merchants 132 or 133 in the form of sporting goods stores that are near the expressway. These aspects of the method may incentivize him/her to exit the expressway temporarily to visit those merchants 132 or 133 and obtain provisions, accessories, or the like for the trip, for example, by sending third data 139 to the user 131 via any of the devices 140 discussed herein.

In yet other aspects of the method, the upsell system 70 may incentivize the user 131 to visit merchants 132 or 133 who, rather than dealing in goods/services related to a given activity, are directly dealing in the activity itself. As a non-limiting example, these aspects of the method might include incentivizing the user 131 to visit a merchant 132 or 133 who operates a ski resort, a beachfront amusement park, an off-shore fishing charter, or other similar merchants 132 or 133 who operate businesses that enable users 131 to partake in activates associated with a given geographic area.

Other aspects of the method can include presenting the user 131 with third data 139 in the form of an upsell item that is selected based upon data representing a route associated with the user 131. The data representing this route may be actively provided by the user 131 using devices 140 in the form of any of the hardware discussed above (or other hardware as well), or the route of the user 131 may be determined passively by GPS systems or the like. In any event, should the route of the user 131 bring him/her proximate a merchant 132 or 133 who deals in goods, services, or activities that may be of interest to the user 131, then the upsell system 70 may send third data 139 to the user 131 in the form of an upsell item accordingly.

Those skilled in the art will recognize that the terms "near", "proximate", or other similar terms dealing with geographic distance as used herein may refer to a definite distance limit affirmatively specified by the user 131. However, in the absence of such a limit specified by the user 131, these terms may also refer to a more flexible limitation on geographic distance between a merchant 132 or 133 and the user 131, such that this geographic distance is only one factor among all the data considered by the upsell system 70. As a non-limiting example of this concept, a given user 131 may be willing to travel a greater distance to visit a merchant 132 or 133 who deals in goods of particular interest, cost, or significance to that user 131, but may be willing to travel only a short distance for goods of marginal interest, cost, or significance to that user 131. As a yet more concrete example, a mobile user 131 who collects crystal may be willing to travel 100 miles or more out of his/her way to obtain the last piece of a given collection from a merchant 132 or 133 in a small town, but may not be willing to travel more than a few hundred yards from an expressway exit to visit a fast food merchant 132 or 133. The upsell system 70 can readily be configured to consider all these factors when recommending potential upsell transactions 135 to a mobile user 131.

Other embodiments of the method can include analyzing data input by a given user 131 representing one or more specific items of interest to the user 131, and identifying to the user 131 one or more merchants 132 or 133 that stock or otherwise handle the item of interest who are near the user's current position. As discussed above in connection with buyer's clubs or the like, the user 131 may provide a type of "shopping list" of specific items, with one or more preference parameters that may be applicable to each item in the list. The method and system provided according to the teaching herein can then serve as a shopping agent to notify a mobile user 131 through a wireless device 140 when he/she is near a merchant 132 or 133 who offers goods/services that may satisfy items on the list, in addition to providing other third data 139 in the form of upsell offers as discussed herein. In this manner, the method and system can shop for the user 131, thereby relieving the user 131 of the burden of contacting multiple merchants 132 or 133 to search for the items on the list. Instead, the user 131 merely goes about his/her daily routine, and the method shops on the user's behalf.

Other embodiments of the method can present third data 139 in the form of upsell items that are selected based on the user's history of viewing television programs or other forms of entertainment. As discussed above, the method can include capturing and analyzing data representing the user's viewing history, and the method can further include presenting upsell items selected at least in part based on this data. The viewing history can include a history of programs transmitted via a satellite-based television network or a cable television network, recorded via a delayed-playback device, or captured via other devices or services.

As discussed above, various embodiments of the method can access and process second data 138 in the form of transaction history related to given users 131. The method can also include presenting third data 139 in the form of upsell items to the user 131 that are selected based upon the transaction history associated with the user 131. Transaction history data related to a given user 131 can include data representing inquiries relating to goods and services, requests for customer service, requests for directory assistance, purchase or other acquisitions of specific goods or services, viewing of television programs or other forms of entertainment, or the like. Also, this transaction history data can store not only the subject matter of the transaction, but also the merchant 132 or 133 with whom the user 131 conducted the past transaction.

The specific content of the third data 139 in the form of the upsell item may take several forms in different embodiments of the invention. The content of the upsell item may be an offer of one or more specific upsell transactions 135 relating to goods, services, or information involving a merchant 132 or 133, one or more complete advertisements featuring the merchant 132 or 133, merely a name or logo associated with the merchant 132 or 133, other indicia associated with the merchant 132 or 133, or the like.

Various embodiments of the invention provide a wireless device 140 having a user interface that is adapted to enable the user 131 to initiate, check the status of, modify, terminate, or otherwise interact with the system and method of the invention as taught herein. The user 131 can interact with this device 140 to realize the above functions using any means known to the art. It is anticipated, but not required, that most implementations of the instant teachings would provide the device 140 with one or more graphic icons as known in the graphic user interface (GUI) field. Further, software implementing such icons would enable the user 131 to interact with such icons to effect the above functions, such as by tapping the icon with a pointer, mouse, stylus, or the like, or by pressing one or more buttons or keys that may or may not be dedicated to carrying out the function of the invention. It will be understood that any function disclosed herein could be implemented so as to execute in response to user interaction with a user interface provided by the device 140.

Figure 14:
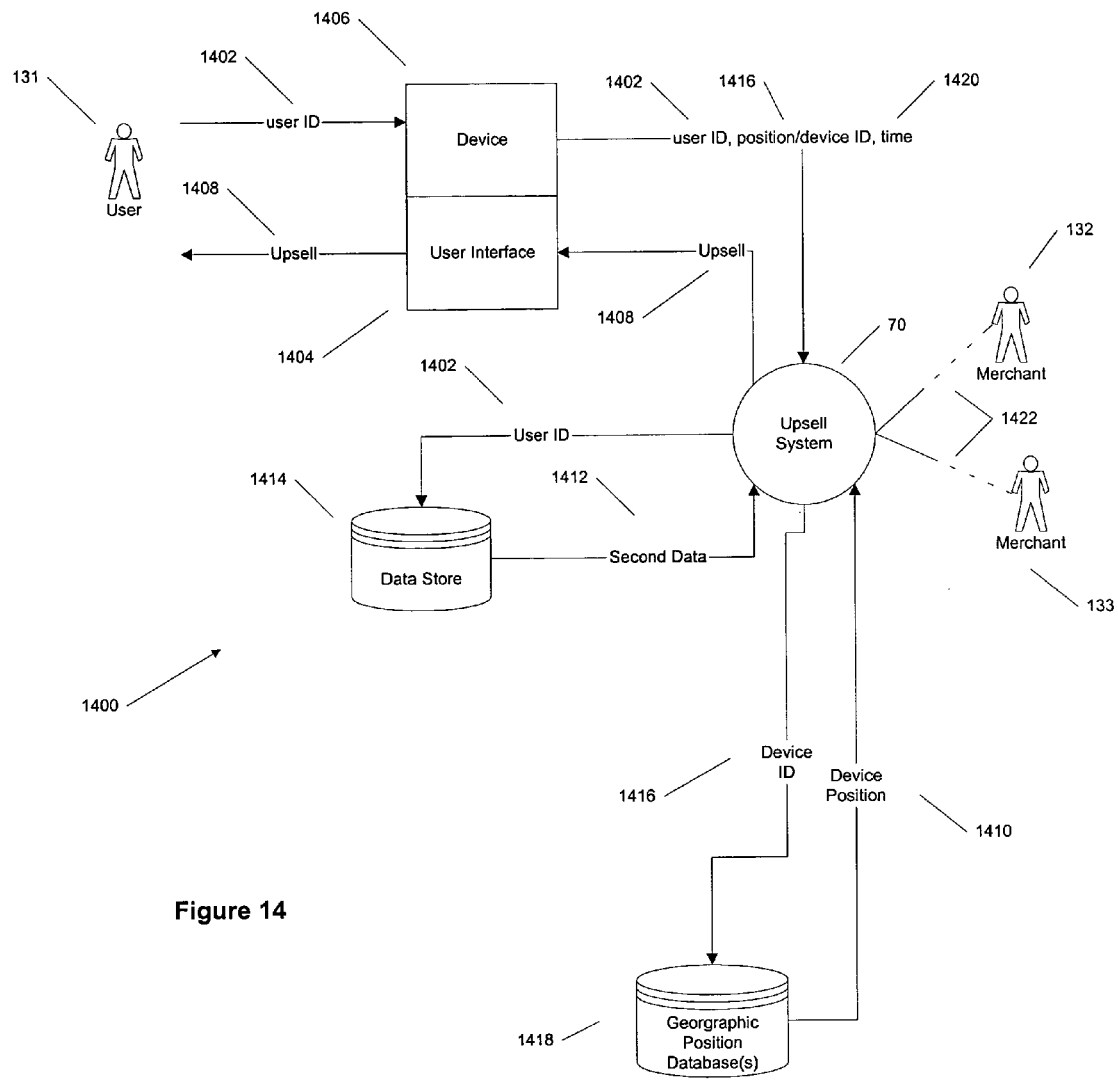
FIG. 14 is a block diagram of components and data flows associated with further embodiments of the invention related to mobile commerce.

FIG. 14 is a block diagram of components and data flows associated with further embodiments of the invention related to mobile commerce. The invention provides various embodiments of methods, computer-readable media, and systems for providing an upsell offer 1408 of an item to a user 131 of a system, with these embodiments of the inventions, media, and systems comprising at least the following. As noted previously in this description, the term "upsell" is used to refer to an offered product or service 1408 that differs materially from a product or service for which the initial contact or primary transaction was made.

The invention enables at least initiation of a given primary transaction for a specific good or a specific service between a given user 131 and a self-service device 1406. For the purposes of the instant invention, the primary transaction need not be completed or consummated; enabling initiation of a given primary transaction may be sufficient, should the data flows described below otherwise be completed despite the possible truncation of the primary transaction. The term "given user" 131 is used herein to refer to a representative or specific user 131 for whom a given execution of the instant invention is performed, rather than to limit the invention to execution with only one particular user 131.

Data 1402 representing the identity of the given user 131 and the geographic position 1410 of the given user 131 when initiating the primary transaction are obtained by the upsell system 70. In short, this aspect of the method includes at least identifying and locating the given user 131. At least the user identification data 1402 and the geographical position data 1410 may be collectively labeled as primary transaction data. The identification data 1402 can take any of the forms discussed herein in relation to identifying the user 131. Regarding the geographic position data 1402, the given user 131 need not necessarily be located with exact or absolute precision, and those skilled in the art will recognize that the precision of this location may vary in different implementations of the teaching herein. Thus, as a non-limiting example, to offer certain upsell items 1408, the user's location need only be determined as being somewhere along a given highway, while to offer other upsell items 1408, the user's position would need to be fixed more precisely, for example, as being within a few feet or yards of a business establishment or other fixed point of reference.

At least a second data element 1412 (such as at least a portion of transaction data obtained from data store 1414)

relating to the given user is obtained, utilizing at least the data 1402 representing the identity of the given user 131. The second data element 1412 can be obtained using any of the methods discussed above, and can take any of the forms discussed herein. The upsell item 1408 for offer to the given user 131 is determined utilizing, at least in part, the second data element 1412 and the data 1410 representing the geographic position of the given user 131, and finally, the chosen upsell item 1408 is offered to the given user 131.

Self-Service Devices and Identification of the User

Turning specifically to the aspect of enabling at least initiation of the primary transaction, communication between the given user 131 and the upsell system 70 can be established several ways and with several devices, including, as an illustrative but non-limiting example, various forms of self-service devices 1406. These types of devices enable given users 131 to obtain, for example, a retail commodity item, such as motor vehicle fuel, snacks, tickets, drinks, or the like. Other non-limiting examples of such devices include ATM machines that dispense currency. Typically, the user 131 will initiate a given primary transaction. In this context, enabling at least the initiation of the primary transaction includes providing and configuring the hardware and/or software necessary to place the self-service device 1406 in a state ready to respond to an action by the user 131 to initiate the primary transaction.

One common theme among these various non-limiting examples of suitable devices 1406 is the existence of some type of user interface 1404 enabling the user 131 to interact with the upsell system 70 via the device 1406. Note that the user 131 need not be aware of the upsell system 70 when at least initiating primary transaction. The upsell system 70 can be transparent to the user 131, and further can be integrated into or separate from the conventional transaction processing systems and methods already in place to support primary transactions. For example, the user interface 1404 can be configured to support bi-directional data transfer between the device 1406 and the given user 131. This bi-directional transfer capability enables the user 131 to enter any data necessary to conduct the primary transaction, enables the upsell system 70 to route the data representing the upsell offer 1408 to the user 131 through the user interface 1404, and further may enable the user 131 to respond to the upsell offer 1408 through the same interface 1404, for example in real time with the offering of the upsell item 1408. Illustrative but non-limiting examples of suitable interfaces 1404 include features such as a touch-sensitive screen, a data display, a monitor, a keypad including a plurality of "hard" keys, a touch-sensitive screen including at least one "soft" key, speech synthesis, analysis, and/or recognition, and the like. "Hard" keys are well known in the user interface art as a collection of discrete hardware elements that dedicate a single respective function to each respective element, with a known keyboard being an example. "Soft" keys are also well known in the user interface art as one or more "hard" keys that are arranged adjacent a data display such that, instead of performing a single respective function, the keys perform different functions depending on what data is displayed on the screen. Thus, the function of a given key can vary within the context of a given primary transaction. Speech synthesis, analysis, and/or recognition systems are well known and are commercially available from a variety of vendors. In any event, this bi-directional interface 1404 can facilitate the primary transaction and also facilitate identifying the user 131, as discussed in further detail below.

Another example of a suitable device 1406 is a device having a unidirectional interface adapted to extract data from the user 131, either directly from the user 131 or from some tangible item presented by or associated with the user. Illustrative but non-limiting examples of such tangible items can include financial instruments such as credit cards, debit cards, or any other type of account-access card or instrument issued by a financial or banking institution. The tangible items are conventional and need not be modified to support the present invention. Other suitable instruments include smart cards having embedded microprocessors, memories, or other similar on-board components. Generally, such instruments include some type of machine-readable media, such as a magnetic strip, a bar code, optically-stored data, or the like, that stores account information such as account numbers, names of account holders, or the like. To operate with these types of cards, the unidirectional interface could be implemented as a swipe-reader, reader, scanner, or similar equipment suitable for extracting data from these instruments. Extracting this data not only facilitates payment for the primary transaction, but also can directly or indirectly identify the user 131 to facilitate selection of upsell items 1408 by deriving the user's identity from this extracted data.

A further example of tangible items that may be presented by a given user 131 is an item such as a key fob or transponder that is readable by the self-service 1406 device to obtain user-specific information. One instance of this latter example is the SPEEDPASS™ system offered by ExxonMobil Corporation, which system operates by defining an account for each user 131 containing payment or transaction preferences (such as a credit card said to be linked to the account), providing the user 131 with a portable transponder or "wand" that communicates via a radio-frequency link with a gas pump equipped with a device that "reads" data from the transponder, and reading that data from the transponder when the user 131 places the transponder near the reader when conducting this type of a primary transaction. The system then charges the transaction according to the account preferences previously stated by the user 131. In any event, this type of a system can also serve to identify the user 131 and to fix the user's location when conducting one or more primary transactions. This system can also cooperate with, or be integrated with, the upsell system 70 to offer upsell items 1408 to the user 131.

Another illustrative application of transponder technology could include primary transactions conducted using transponders issued as parts of automated toll collection systems, which are becoming more prevalent at toll roads. These toll systems establish respective accounts for drivers (users 131 in this embodiment), with the system charging tolls to the driver's account when the driver's transponder passes through an automated toll plaza. The transactions that occur as vehicles equipped with these toll transponders pass through automated toll plazas can serve as primary transactions that both identify the user 131 and track his/her position. As discussed in more detail below, given a history of such transactions, the method can capitalize on this history to infer a travel itinerary on which a given user 131 may be traveling, and accordingly recommend upsell items 1408 related to that travel itinerary.

Regardless of the type of specific tangible item presented by the given user 131, the self-service device 1406 can include a unidirectional interface adapted to extract user-specific data (including at least in part user ID data 1402) from these various tangible items during the course of the primary transaction. This user-specific data may be useful not only for facilitating and paying for the primary transaction, but also for identifying the user 131 and fixing his or her position as input to the upsell system 70. The user-specific data can take any form that can be extracted from the conventional tangible items discussed above. As non-limiting examples, the types of data can include account numbers (debit, credit, etc.), name-address-city-state-ZIP (NACSZ) information associated with the given user 131, telephone number, or the like.

In some aspects of the method, the identification data 1402 is extracted directly from the tangible item, but in other aspects, the user 131 is identified indirectly, with preliminary or intermediate data obtained from the tangible item being mapped to further data that, in turn, identifies the given user 131. One illustrative but non-limiting example of this mapping function is the transponder scenario discussed above, wherein the information obtained from the transponder may be a type of pointer, index, or key that can be used to access another data store to identify the user 131 and/or conduct the primary transaction. In other words, the extracted data is not itself the identification data 1402, but instead specifies where the identification data may be located.

Another illustrative but non-limiting example of this preliminary or intermediate data can include extracting biometric data from the given user 131, either as a means for identifying a user 131 or for authenticating the user 131 by confirming the user's purported identity as established by other means. In these embodiments, the device 1406 could be adapted or configured with software and/or equipment as necessary or appropriate to obtain the given biometric parameter of interest from the given user 131. Illustrative but non-limiting examples of biometric parameters of interest include fingerprints/thumbprints, voice samples, retina/iris characteristics, facial features, or the like. The data representing the biometric parameters captured from the given user 131 can then be mapped to further data residing in one or more data stores 1414 to identify the given user 131, as well as to access transaction history (second data element 1412) relevant to determining an optimum upsell offer 1408 for that given user 131.

Obtaining Geographic Position of User

Having identified the user 131, the invention also contemplates fixing the geographic position of the user 131. As discussed above, the geographic position need not necessarily be fixed with absolute precision, but instead, the precision to which the geographic position is fixed may vary depending on the nature of the upsell items 1408 being considered and offered.

The geographic position of the user 131 can be considered as a type of primary transaction information, as that term is used herein. The invention can determine the geographic position of the user 131 in a number of ways. The position of the given user 131 can be inferred based on a known position of a self-service device 1406 used to conduct the primary transaction. For example, given a unique identifier 1416 of a given device 1406, the invention can locate this device 1406 by referencing a data store 1418 that specifies where each one of a plurality of such devices 1406 is located. Having located the device 1406, the invention has now located a given user 131 who is interacting with the device 1406. In such embodiments, these devices 1406 can be stationary devices affixed permanently in a given position, such as gasoline pumps, transponders in toll plazas, or the like, or can be portable devices that have at least some degree of mobility, such as vending machines, lottery ticket machines, ATM machines, or the like. With the portable devices, the somewhat mobile or portable nature of these devices may impact the precision with which the user's position may be established, but this reduction in precision may be inconsequential to the overall functioning of the method. However, the method can address this issue by referencing a data store (such as data store 1418, or a different data store) that contains data indicating respective locations or positions 1410 of either stationary devices 1406 that are permanently affixed in respective known positions or of mobile devices 1406 that may be positioned at various locations within a respective structure or place of business. These data stores 1418 may be constructed as part of an enrollment process by which one or more given merchants 132 or 133 become associated with an upsell system 70 by which those merchant's products or services are considered as potential upsell transactions 1408 for proffer to given users 131.

According to other aspects of the invention, the user's position can be fixed by locating the position of a stationary or movable device 1406 with which the user 131 is interacting to conduct the primary transaction. Other aspects of the invention can include locating a given user 131 by processing a signal emitted from a transmitter associated with the device 1406, such as a signal related to a wireless or landline communication emanating from the device 1406, either in connection with the primary transaction or unrelated to the primary transaction. Still other aspects of the invention can include inferring the position of the given user 131 by processing a signal emitted from a global positioning system (GPS) or a vehicle associated with the user 131.

Multiple Primary Transactions and Inferred Travel Itineraries

The invention can also include enabling the given user 131 at least to initiate a plurality of primary transactions, with the invention obtaining respective primary transaction data for at least certain of these primary transactions. According to this aspect of the invention, the method can obtain data representing respective geographic locations 1416 of the given user 131 when conducting certain of the primary transactions, and/or respective times 1420 at which the given user 131 conducted certain of the primary transactions.

Given this data representing the recent transaction history of the given user 131, the invention can infer a travel itinerary on which the given user 131 may be traveling. This inference process can consider a plurality of other primary transactions conducted previously to and in chronological or geographic proximity to a given primary transaction.

Expressly-Specified Travel Itineraries

As an alternative to the inferred-itinerary embodiments discussed herein, the invention can also operate using a specified, predefined travel itinerary associated with a given user 131. This predefined travel itinerary can be defined or specified by the user 131, or generated on the user's behalf by a third party, such as a travel agent. An itinerary can be defined using, for example, travel-related merchants or websites, or the services of travel clubs, associations, or the like. In this aspect of the invention, the second data element 1412 can take the form of parameters established by this itinerary, including one or more of the following illustrative but non-limiting examples: a trip route, an trip origin, a trip destination, at least one intermediate stop, a home location for the user 131, a mode of travel, a vehicle type, a fuel capacity of a vehicle used on the trip, and an average fuel consumption parameter associated with the vehicle. In the inferred-itinerary embodiments above, some of these illustrative parameters may be inferred from the circumstances pertaining to one or more primary transactions, while other of these illustrative parameters may be defined by reference to data stores (such as data store 1414) or other pre-existing data associated with a given user 131. In the specified or defined—itinerary embodiments, at least some of these parameters may be specified by or obtained from the given user 131. In either case, at least some of these parameters can be analyzed as at least part of the process used to identify upsell item(s) 1408 to offer to the given user 131.

Projection of User's Future Position/Time of Arrival

Whether the itinerary is inferred or predefined, the invention can use this itinerary at least in part to project an expected future position of the given user 131 at some chosen time. These projections of future positions at future times can then be considered by the upsell system 70 to tailor upsell offers 1408 to the user's expected future position. For example, given knowledge of the user's present position (either directly via data 1416 or indirectly via data store 1418), the invention can analyze an average rate of travel parameter associated with the given user 131, and thus predict the user's future position after elapse of a given time interval after occurrence of a primary transaction. Also, the invention can predict when the user 131 might arrive at a given position this is a certain distance from where a primary transaction occurred. Another factor that may be considered is the subject matter that was involved in one or more primary transactions involving the given user 131. For example, by analyzing a vehicle fuel capacity parameter associated with the given user 131, the invention could compute when and where the user 131 may be due for his/her next fill-up, and offer an upsell item 1408 to a gas station near a projected position of the user 131. An expected or known route parameter associated with the given user 131 or a given trip taken by the user 131 may be beneficial to this calculation.

Consistent with this teaching, the invention can include obtaining second data elements 1412 in the form of any parameter appropriate to computing or projecting such expected positions or arrival times associated with the user 131, and determining one or more upsell offers 1408 selected based on analysis of parameters such as a expected future position parameter (e.g., where will the user be at time T?), an expected arrival time parameter (e.g., when will the user 131 arrive at location X?), a mode of travel parameter (e.g., how is the user 131 traveling, and what average speed is expected given this mode of travel?), an expected need parameter (e.g., what might the user 131 need when he/she arrives at location X and/or at time T?), or the like. Upsells 1408 selected based on at least one of these parameters can then be offered to the user 131.

The following illustrative but non-limiting examples are provided to aid understanding of the above discussion.

Scenario 1: Assume a given user 131 buys gas at a geographic position X at 300 pm. The invention may infer that the user 131 may need lodging at 700 pm at a location determined based upon 4 hours' travel at average speed of 60 mph, that is, approximately 240 miles away from position X. If the invention has been provided with the user's travel plans, it can project an expected future position of the given user 131 by (figuratively speaking) striking an arc having a radius of 240 miles that is centered on position X, and extending the arc along a highway along which the user 131 is traveling. If the invention does not know the user's exact travel plans, it may conduct a question-and-answer dialog with the user 131 to ascertain or refine such plans, or may infer these plans based on the locations and times of past primary transactions conducted by the user 131. If the user's exact route and/or direction of travel can only be narrowed to a given set of possible alternatives, the invention can offer respective upsell items 1408 corresponding to each one of these possible alternatives, or may offer one upsell item 1408 that could be redeemed at a plurality of different locations. In any event, once the plans are either known or estimated with a reasonable degree of certainty, the method can identify lodging establishments within some threshold distance from that 240-mile point, and can optionally filter them according to further preference data associated with the user 131, as discussed in more detail below.

Scenario 2: Similar to Scenario 1, but with the method offering a meal-related upsell item(s) 1408 (discount, coupon, or other incentive) good at a restaurant or other merchant 132 or 133 located near the user's projected location.

Scenario 3: Similar to 1, but if primary transaction is a fuel stop, then use data on expected vehicle mileage/fuel capacity and project user's expected location at next fill-up, and offer upsell 1408 to gas station proximate this expected location accordingly.

Scenario 4: Similar to 1, but with the following variations:
a. Use predefined itinerary as input to decide user's route, stop point(s), origin, destination, or other parameters discussed above, and offer upsell items 1408 on behalf of merchants 132 or 133 proximate the geographical locations corresponding to these parameters.
b. Use inferred itinerary as input to decide the above parameters, and offer upsell items 1408 on behalf of merchants 132 or 133 proximate the geographical locations corresponding to these parameters.
c. Consider mode of travel in projection (e.g., average vehicle speed, layovers, etc.) and offer upsell items 1408 accordingly.

Status Parameter Associated with Merchants

In other aspects, the invention can include obtaining a status parameter pertaining to a merchant 132 or 133 whose goods and/or services may be considered for offer as upsell items 1408. The invention may, but need not necessarily, consider respective status parameters 1422 pertaining to merchants 132 or 133 selected based on an indication that the merchant 132 or 133 may be of interest to the given user 131. More particularly, this status parameter 1422 can take different forms depending on the nature of the merchant 132 or 133 with which this parameter 1422 may be associated. For example, in the context of a lodging establishment, the status parameter 1422 can represent a vacancies parameter associated with that establishment. If management at a lodging establishment (a merchant 132 or 133) realizes that their vacancy rate for an upcoming night is higher than desired, they may request the upsell system 70 to offer more attractive incentives as upsell items 1408 to those users 131 whose travels might bring them near the lodging establishment. These incentives can include (as illustrative but non-limiting examples) discounts, coupons, free breakfasts, extra nights' stays, extra points applied toward guest loyalty programs, or the like. The attractiveness of the incentives available for a given night might vary according to the vacancy rate for that night; i.e., if the lodging establishment expects to be nearly empty on a given night, the incentives may become more generous to lure more guests (users 131), while if the lodging establishment expects to be nearly full on a given night, incentives for that night may be reduced sharply or eliminated altogether. The upsell system 70 can combine this status parameter(s) 1422 with a second data element 1412 in the form of user 131 preferences, history, or the like to result in an optimum offer of upsell item 1408 to the user 131.

In other examples, the status parameter 1422 could reflect the capacity of a given entertainment establishment, as well as reflecting a number of empty seats or unsold tickets for an event held at the entertainment establishment at a given time. For example, if a user's itinerary (whether expressly specified or inferred) indicates that he or she may be spending a night in a given locale, this aspect of the invention could enable a merchant 132 or 133 associated with an entertainment establishment in that locale to incentivise the user 131 to attend an event hosted at that establishment. In essence, this aspect of the invention could enable the merchant 132 or 133 to offer varying levels of discounts as upsell items 1408 to traveling users 131, if necessary to boost ticket sales and attendance at the event. Illustrative but non-limiting examples of this aspect of the invention could include offering discounts to: sporting events held at a stadium, track, or arena; musical performances or concerts, movies shown at cinemas; or the like. If excess capacity at an upcoming event in the form of status parameter 1422 is combined with a second data element 1412 in the form of preference or history parameters associated with the user 131 that indicate possible user interest in the event or in the specific entertainment establishment, then an upsell offer 1408 to the upcoming event may be successful.

Teaching similar to that above concerning entertainment establishments could enable the invention to offer upsell items 1408 in the form of discounts applicable toward meals at dining establishments, restaurants, inns, or the like (merchants 132 and 133). The same considerations could apply toward analyzing seating capacity, number of reservations for a given day or night, or the like, and combining these factors (status parameter(s) 1422) with second data elements 1412 in the form of customer-preference parameters relating to specific merchants 132 or 133 or chains thereof, geographic locations of such merchants 132 or 133 or franchisees of such chains, or the like to arrive at an optimum upsell offer 1408.

The following examples are provided as non-limiting illustrations of the above teaching.

Scenario 1: A lodging establishment (hotel, motel, inn, bed-and-breakfast, or the like in the form of merchant 132 or 133) near the user's present or projected future position has a high vacancy rate expected for a night on which the user 131 is expected to be near the lodging establishment. To boost vacancy, the lodging establishment notifies or authorizes the upsell system 70 to offer discounts on a night's stay to users 131 conducting primary transactions within a given radius of the lodging establishment. As discussed above, the level of discount can depend on the vacancy rate.

Scenario 2: Similar to Scenario 1, but invention obtains second data element 1412 in the form of prior transaction history or membership information indicating that a user 131 favors a given chain of lodging establishments, so the upsell system 70 offers user 131 a more generous discount, or offers bonus points toward a loyalty program membership associated with the user 131.

Scenario 3: Similar to Scenario 1, but invention obtains second data element 1412 in the form of prior transaction history indicating that the user 131 favors a given chain of dining establishments (merchants 132 or 133), which chain has a location near user's present or projected position, and offers upsell item 1408 in the form of incentive to visit that location.

Scenario 4: Similar to Scenario 1, but invention knows from prior transaction history that the user 131 favors a given merchant 132 or 133 that has a location near the user's present or projected position, or near the lodging establishment on whose behalf the user 131 is given an upsell item 1408 in the form of an incentive to visit this location.

Scenario 5: Similar to Scenario 1, but invention offers an upsell item 1408 directing the user 131 to goods/services in a merchant's store associated with the self-service device 1406 (such as a gas pump) with which the user 131 is interacting.

Scenario 6: Given the user's interest in certain areas as shown by the second data element 1412 in the form of purchase history, surveys, registrations, or the like, offer upsell items 1408 that direct the user 131 to nearby attractions that may appeal to those interest areas. Optionally, the invention can route directions to such attractions to a navigation system in the user's vehicle or to the user's handheld GPS unit.

Offer of Upsell Item

Once the above analysis is completed, resulting in one or more selected upsell items 1408 for proffer to the user 131, these items 1408 are offered to the user 131. In some aspects of the invention, the upsell items 1408 can be offered in real time with the primary transaction, for example, while goods are being transferred to the given user 131. More particularly, the upsell item 1408 could be offered to the user 131 while, as a non-limiting example, fuel purchased by the user 131 is being pumped into the user's vehicle, or shortly thereafter while completing the transaction.

In this illustrative fuel-purchasing scenario, the user 131 will most likely have to wait at least a few minutes while the fuel is being pumped into the user's vehicle, so this wait may present a good opportunity to present the upsell items 1408 to the user 131. If the upsells 1408 require any payment from the user 131, the user 131 could authorize payment using the same payment means used for the given primary transaction. In real-time or near-real-time embodiments, upsell items 1408 could, but need not necessarily, be offered via the same device 1406 used to conduct the primary transaction, such as a display device or user interface 1404 mounted on a stationary item not associated with the user 131 (e.g., a fuel pump or other illustrative device as discussed above). Such a device 1406 or 1404 can equipped with a keypad configured to accept user 131 input and/or responses to the offered upsell items 1408. This keypad can support hard keys or soft keys, as discussed above. In other aspects of the invention, the upsell item 1408 can be offered via a paper receipt printed by a device 1406 used to conduct the at least one primary transaction, or printed by a dedicated printer. The user 131 may then redeem the paper receipt in person or remotely with a merchant 132 or 133 on whose behalf the upsell item 1408 is offered.

Alternatively, the upsell item 1408 could be offered after the user 131 has resumed traveling. In these other than in real-time embodiments, the upsell item 1408 may be offered via a device other than the device 1406 used to conduct the primary transaction. Also, after the user 131 has resumed traveling, his/her travel route or direction may become more clear or certain, which clarity may be helpful in those instances where his/her itinerary has not been expressly specified and thus is inferred by the invention. If the primary transaction at hand is the first, or one of the first, primary transactions undertaken by the user 131 during a given trip, the system may not have sufficient data from which to infer the user's travel direction. After removing any uncertainty as to the user's travel direction, or confirming a previously-inferred itinerary, the invention can better tailor upsell items 1408 to the user's anticipated needs.

Whether the upsell item 1408 is offered in real-time, in near-real-time with the primary transaction, or after user 131 has resumed traveling, the upsell item 1408 can be offered via any of these illustrative but non-limiting technologies: a wireless communications device, a PDA, an in-vehicle navigation system, an in-vehicle satellite-based communication service (ONSTAR® or the like), a handheld navigation device, a handheld GPS unit, a satellite-based television system, a satellite-based radio system, a satellite-based telephone system, or the like.

In other aspects of the invention, the method can include offering the upsell item 1408 by transmitting data representing it audibly to the given user 131, for example via airwaves heterodyned directly to the user 131, for example, as described in issued U.S. Pat. No. 5,889,870 (hereafter the '870 patent), entitled "Acoustic Heterodyne Device and Method", which is incorporated herein by this reference in its entirety as if set forth verbatim herein. In brief, acoustic heterodyning operates by superimposing two ultrasonic wave trains, one carrier wave train and a second wave train carrying pre-defined information, so that two wave trains will interfere or interact with one another. Under the correct conditions, the interference or interaction between the two ultrasonic wave trains will produce an ultrasonic overtone having a frequency equal to the sum of the two ultrasonic wave trains, and a sonic or subsonic undertone having a frequency equal to the difference between the two ultrasonic wave trains. The ultrasonic wave trains are inaudible to the human ear, while the sonic or subsonic undertone should be audible to the human ear. The sonic or subsonic undertone has the useful characteristic of traveling in a relatively straight line from a source to a destination, rather than propagating radially from the source, as do conventional sound waves. Thus, this technology can be used to transmit information in a focused beam to a specific target at a specific location, such that only the specific target at the specific location will hear the information. The acoustical phenomenon underlying the technology taught in the '870 patent is well known in the art, having been discovered by $19^{th}$ century German engineer Heinrich Helmholtz.

In the context of the present invention, acoustical heterodyning may be particularly useful where the given user 131 is known to be physically present, and where the user's physical location is fixed with sufficient accuracy to make acoustically heterodyning the upsell item 1408 feasible. As a non-limiting example, if one or more motion detectors or other devices capable of fixing the user's location are arranged proximate the device 1406, the user's position could be fixed so as to enable the upsell item 1408 to be acoustical heterodyned to the given user 131. Thus, using this technology, the upsell item 1408 can be directed for hearing only by the given user 131, rather than broadcasting the upsell item 1408 over a conventional loudspeaker such that the upsell item 1408 would be heard by other persons proximate the given user 131. In this manner, this technology enables directed transmission of the upsell item 1408 without undue distraction, environmental noise, or irritation of those other persons.

Role of Additional Data in Upsell Selection

As discussed above, the invention can include obtaining a second data element 1412 related to the given user 131 as an additional data point provided to the upsell system 70. As discussed previously in this description, this second data element 1412 is typically obtained using the identity 1402 of the given user 131, and can include data representing parameters such as past transaction history, preferences, and interests associated with the given user 131.

Past transaction history data can take the forms of a general transaction history associated with the given user 131, a specific transaction history associated with a specific trip taken by the given user 131, merchants 132 or 133 favored by the given user 131 (whether the user 131 favors a given merchant 132 or 133 generally or specifically during a given trip taken by the given user 131) or other forms discussed herein. Past transaction history data can also include data representing one or more transactions involving the given user 131 that occurred previously to the present primary transaction. This data can represent content of these previous transactions, times and/or locations at which these previous transactions occurred, both, or other data parameters typically pertaining to such transactions.

Preference data or interest data can take the form of data indicating that the given user 131 is a member of a program associated with a given merchant 132 or 133, such as membership in a travel club, frequent flyer program, guest loyalty program, or the like. This type of preference data may indicate that upsells 1408 involving the given merchant 132 or 133 would be attractive to the user 131, especially when the user 131 would realizes benefits applicable toward the program by accepting the upsell 1408.

User Opt-In/Opt-Out

According to some aspects of the invention, a given user 131 can be given a choice between at least two scenarios under which to conduct the primary transaction, as described in U.S. patent application Ser. No. 10/335,061, filed on 31 Dec. 2002, entitled "METHODS, COMPUTER-READABLE MEDIA, AND APPARATUS FOR OFFERING USERS A PLURALITY OF SCENARIOS UNDER WHICH TO CONDUCT AT LEAST ONE PRIMARY TRANSACTION", the contents of which are incorporated herein by this reference as if reproduced verbatim herein. A first scenario can provide that the given user 131 may conduct the primary transaction at a first cost to the user 131, in exchange for the given user 131 receiving at least one offer of an upsell item 1408. At least a second scenario can provide that the given user 131 may conduct the primary transaction at a second cost to the given user 131 in exchange for receiving no offers of upsell items 1408. Typically, the first cost can be reduced relative to the second cost, in order to induce the given user 131 to "opt-in" and receive the upsell item 1408. After the user 131 selects a scenario, the primary transaction is conducted in accordance with a scenario selected by the given user 131.

User Acceptance of Upsells

After the upsell item 1408 is offered, the user 131 can choose whether to accept or decline the offered item 1408. Where the upsell item 1408 is offered via the same device 1406 used to conduct the primary transaction, the invention can enable the user 131 to accept the offer 1408 by responding to that same device 1406, for example, by pressing a key provided by that device 1406. In other aspects of the invention, the method enables the user 131 to contact a merchant 132 or 133 on whose behalf the upsell item 1408 is offered to accept or redeem the upsell item 1408, or to accept the upsell item 1408 by using a device other than the device 1406 used to conduct the primary transaction. In still other aspects of the invention, the method can provide the user 131 with a code or other indicia that enables the given user 131 to accept the upsell item 1408 by presenting the code to the merchant 132 or 133 on whose behalf the upsell item 1408 was offered. This code can be printed, for example, on a receipt associated with the primary transaction.

Once the upsell item 1408 has been offered, the user 131 can either accept or decline it. The offer can be accepted in real time with the offering of the upsell item 1408, for example, contemporaneously with or during the course of the primary transaction, during an exchange of goods associated with the primary transaction, or shortly thereafter. Alternatively, the upsell item 1408 can be accepted in other than real time with the offering of the upsell item 1408. As an illustrative but non-limiting example, a user 131 who is purchasing fuel as a primary transaction may receive an upsell item 1408 in the form of a lodging discount applicable to a hotel 100 miles away. This upsell item 1408 can be selected using the above processing and printed on a paper receipt. The user 131 may review the upsell 1408 and initially decide not to accept it because he/she intends to stay at another establishment farther than 100 miles away. However, congested roads, adverse weather, or simply a change of plans may afterwards necessitate a change in lodging plans, and in this case, the user 131 may change his/her mind on accepting the upsell item 1408.

A suitable application program can implement software residing on the computer-readable medium or media executable by at least the upsell system 70 and embodying the various aspects of the method discussed herein and shown in the drawing figures, and can be coded using any suitable programming or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like.

As those skilled in the art will understand, the program of instructions can be loaded and stored onto a program storage medium or device (see FIG. 1) readable and executable by the upsell system 70 or other machine, embodying a program of instructions executable by the machine to perform the various aspects of the invention as discussed and claimed herein, and as illustrated in the drawing figures. Generally speaking, the program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

FIG. 10 shows an on-screen programming guide on a display and an input device, such as a remote control. The on-screen programming guide typically includes a display as a function of time and channel. Ordinarily, the program guide displays programming from the current time forward for a number of hours. Channel information is displayed either simultaneously or in a scrolling manner. Within the contemplation of this system, the on-screen programming guide may provide input information into the decision system, such as by receiving an indication of a program that is selected, or is being considered. The user input device, such as the remote control, may provide position control of a cursor or other marker on the on-screen display. Alternatively, direct entry of data by the user on the pad of the remote control, or from a more fully functional keyboard may be utilized. Preferably, infrared communication between the remote control and the television or display including the on-screen programming guide is utilized.

By way of example, if a viewer selects a Pay-Per-View sports event, that selection may be used as an input to the system as described generally in this application which then results in the selection and offer of another good, service or set of information for the potential customer. Continuing with the example of an order for a Pay-Per-View sporting event, the system may determine, through the various methods described herein, to offer the viewer a series of entertainment events, such as a seasonal football schedule. The input device for such an onscreen programming guide application in the upsell context could be a remote control operated by the viewer.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

The foregoing cited references, patents and publications are hereby incorporated herein by reference, as if fully set forth herein. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A method for providing at least one offer of at least one upsell item to users of a given self-service device, the method comprising at least the following:

enabling at least initiation of a given primary transaction between a given user and the given self-service device communicably coupled to an upsell computing system, wherein the given primary transaction involves at least one of a specific good and a specific service obtained using the given self-service device;

determining an identity of the given user via the upsell computing system;

determining a geographic location of the given user when the given primary transaction is initiated;

obtaining at least a second data element relating to the given user utilizing data representing the identity of the given user via the upsell computing system;

determining the at least one upsell item utilizing, at least in part, the second data element and data representing the geographic position of the given user via the upsell computing system;

encrypting at least the second data and data representing the identity of the given user via the upsell computing system when transmitting data from, to or between at least one data store; and offering the at least one upsell item to the given user via the given self-service device without communicating at least the second data element to the self-service device.

2. The method of claim 1, wherein determining an identity of the given user includes obtaining primary transaction data related to the given primary transaction, wherein the primary transaction data includes, at least, data representing at least the identity of the given user.

3. The method of claim 1, wherein determining a geographic location of the given user includes obtaining primary transaction data related to the given primary transaction, wherein the primary transaction data includes, at least, data representing the geographic position of the given user when the given primary transaction is initiated.

4. The method of claim 1, wherein enabling at least initiation of a given primary transaction includes enabling the given user at least to initiate the given primary transaction using a self-service device adapted to enable the given user to obtain at least one commodity item.

5. The method of claim 1, wherein enabling at least initiation of a given primary transaction includes enabling the given user at least to initiate the given primary transaction using a self-service device adapted to enable the given user to obtain fuel.

6. The method of claim 1, wherein enabling at least initiation of a given primary transaction includes enabling the given user at least to initiate the given primary transaction using a self-service device adapted to enable the given user to purchase fuel.

7. The method of claim 1, wherein enabling at least initiation of a given primary transaction includes enabling the given user at least to initiate the given primary transaction using a self-service device adapted to enable the given user to obtain at least one ticket.

8. The method of claim 1, wherein enabling at least initiation of a given primary transaction includes enabling the given user at least to initiate the given primary transaction using a self-service device adapted to enable the given user to obtain currency.

9. The method of claim 1, wherein enabling at least initiation of a given primary transaction includes enabling the given user at least to initiate the given primary transaction using a self-service device having a user interface.

10. The method of claim 1, wherein enabling at least initiation of a given primary transaction includes enabling the given user at least to initiate the given primary transaction using a self-service device having a user interface that supports bi-directional data transfer between the self-service device and the given user.

11. The method of claim 1, wherein enabling at least initiation of a given primary transaction includes enabling the given user at least to initiate the given primary transaction using a self-service device having a user interface that incorporates at least one of the following features: a touch-sensitive screen, a data display, a monitor, a keypad including a plurality of hard keys, a touch-sensitive screen including a at least one soft key, and speech recognition.

12. The method of claim 1, wherein enabling at least initiation of a given primary transaction includes enabling the given user at least to initiate the given primary transaction using a self-service device having a unidirectional interface adapted to extract data.

13. The method of claim 1, wherein enabling at least initiation of a given primary transaction includes enabling the given user at least to initiate the given primary transaction using a self-service device having a unidirectional interface adapted to extract data from a tangible item associated with the given user.

14. The method of claim 1, wherein enabling at least initiation of a given primary transaction includes enabling the given user at least to initiate the given primary transaction using a self-service device having a unidirectional interface adapted to extract data from a financial instrument presented by the given user.

15. The method of claim 1, wherein enabling at least initiation of a given primary transaction includes enabling the given user at least to initiate the given primary transaction using a self-service device having a unidirectional interface adapted to extract data from a credit card presented by the given user.

16. The method of claim 1, wherein enabling at least initiation of a given primary transaction includes enabling the given user at least to initiate the given primary transaction using a self-service device having a unidirectional interface adapted to extract data from a debit card presented by the given user.

17. The method of claim 1, wherein enabling at least initiation of a given primary transaction includes enabling the given user at least to initiate the given primary transaction using a self-service device having a unidirectional interface adapted to process a magnetic strip located on a tangible item presented by the given user.

18. The method of claim 1, wherein enabling at least initiation of a given primary transaction includes enabling the given user at least to initiate the given primary transaction using a self-service device having a unidirectional interface adapted to read a bar code located on a tangible item presented by the given user.

19. The method of claim 1, wherein enabling at least initiation of a given primary transaction includes enabling the given user at least to initiate the given primary transaction using a self-service device having a unidirectional interface adapted to extract data from a smart card presented by the given user.

20. The method of claim 1, wherein enabling at least initiation of a given primary transaction includes enabling the given user at least to initiate the given primary transaction using a self-service device having a unidirectional interface adapted to scan a key fob presented by the given user.

21. The method of claim 1, wherein determining an identity of the user includes extracting data from a tangible item associated with the given user.

22. The method of claim 1, wherein determining an identity of the user includes extracting data from an instrument presented by the given user.

23. The method of claim 1, wherein determining an identity of the user includes extracting data from a credit card presented by the given user.

24. The method of claim 1, wherein determining an identity of the user includes extracting data from a debit card presented by the given user.

25. The method of claim 1, wherein determining an identity of the user includes processing a magnetic strip located on a tangible item presented by the given user.

26. The method of claim 1, wherein determining an identity of the user includes reading a bar code located on a tangible item presented by the given user.

27. The method of claim 1, wherein determining an identity of the user includes extracting data from a smart card presented by the given user.

28. The method of claim 1, wherein determining an identity of the user includes scanning a key fob presented by the given user.

29. The method of claim 1, wherein determining an identity of the user includes obtaining an account number associated with the given user.

30. The method of claim 1, wherein determining an identity of the user includes obtaining a credit card account number associated with the given user.

31. The method of claim 1, wherein determining an identity of the user includes obtaining a debit card account number associated with the given user.

32. The method of claim 1, wherein determining an identity of the user includes obtaining NACSZ information associated with the given user.

33. The method of claim 1, wherein determining an identity of the user includes obtaining a name associated with the given user.

34. The method of claim 1, wherein determining an identity of the user includes obtaining a telephone number associated with the given user.

35. The method of claim 1, wherein determining an identity of the user includes identifying the user.

36. The method of claim 1, wherein determining an identity of the user includes obtaining user-specific identification data.

37. The method of claim 1, wherein determining an identity of the given user includes obtaining primary transaction data related to the given primary transaction, wherein the primary transaction data includes, at least, data representing at least the identity of the given user, further comprising mapping the primary transaction data to further data to identify the given user.

38. The method of claim 1, wherein determining an identity includes obtaining data from a transponder adapted for use with an automated toll collection system.

39. The method of claim 1, wherein determining an identity of the given user includes extracting biometric data from the given user.

40. The method of claim 1, wherein enabling at least initiation of a given primary transaction includes enabling the given user to at least to initiate at least one primary transaction using a device adapted to obtain biometric data from the given user.

41. The method of claim 1, wherein enabling at least initiation of a given primary transaction includes enabling the given user to at least to initiate at least one primary transaction using a device adapted to obtain data representing at least one of a fingerprint and a thumbprint from the given user.

42. The method of claim 1, wherein enabling at least initiation of a given primary transaction includes enabling the given user to at least initiate at least one primary transaction using a device adapted to obtain data representing at least one voice sample from the given user.

43. The method of claim 1, wherein enabling at least initiation of a given primary transaction includes enabling the given user at least to initiate at least one primary transaction using a device adapted to obtain data representing at least one of a retina scan and an iris scan from the given user.

44. The method of claim 1, wherein enabling at least initiation of a given primary transaction includes enabling the given user at least to initiate at least one primary transaction using a device adapted to conduct a facial analysis of the given user.

45. The method of claim 1, further comprising mapping biometric data associated with the given user to further data to identify the given user.

46. The method of claim 1, determining a geographical location of the given user based on a known position of the self-service device.

47. The method of claim 1, wherein determining a geographic location of the given user includes referencing at least one data store.

48. The method of claim 1, wherein determining a geographic location of the given user includes referencing at least one data store containing data indicating respective locations of a plurality of stationary devices that are affixed in respective positions.

49. The method of claim 1, wherein enabling at least initiation of a given primary transaction includes enabling the given user at least to initiate the given primary transaction by interacting with a stationary device affixed in known position.

50. The method of claim 1, wherein determining a geographic location of the given user includes referencing at least one data store containing data indicating respective locations of a plurality of movable devices, each of which movable devices may be positioned at a plurality of locations within a respective structure.

51. The method of claim 1, wherein enabling at least initiation of a given primary transaction includes enabling the given user at least to initiate the given primary transaction by interacting with a movable device located at one of a plurality of possible locations within a respective structure.

52. The method of claim 1, wherein determining a geographic location of the given user includes processing a signal emitted from a transmitter associated with the device.

53. The method of claim 1, wherein determining a geographic location of the given user includes processing a signal emitted from a global positioning system associated with the given user.

54. The method of claim 1, wherein determining a geographical location of the given user includes processing a signal associated with a vehicular communication system.

55. The method of claim 1, further comprising enabling at least initiation of at least a second given primary transaction involving the given user.

56. The method of claim 55, further comprising enabling at least initiation of at least a second given primary transaction involving the given user, further comprising determining a geographical location of the given user when the second given primary transaction is initiated.

57. The method of claim 1, further comprising enabling at least initiation of at least a second given primary transaction involving the given user, further comprising obtaining data representing respective times at which the given primary transaction and the second given primary transaction are initiated.

58. The method of claim 1, further comprising determining a geographic location of the given user when at least a second primary transaction involving the given user is initiated.

59. The method of claim 1, further comprising obtaining data representing respective times at which the given primary transaction and at least a second given primary transaction are initiated.

60. The method of claim 1, further comprising analyzing data representing respective geographic locations of the given user when the given primary transaction and at least a second given primary transaction are initiated to project a travel itinerary associated with the given user.

61. The method of claim 1, further comprising analyzing data representing times at which the given primary transaction and at least a second given primary transaction are initiated to project a travel itinerary associated with the given user.

62. The method of claim 1, further comprising analyzing data representing respective geographic locations of the given user when the given primary transaction and at least a second given primary transaction are initiated and analyzing data representing the respective times at which the given primary transaction and at least a second given primary transaction are initiated to project a future location of the given user.

63. The method of claim 1, wherein obtaining the at least second data element includes obtaining data representing at least one of past transaction history, preferences, and interests associated with the given user.

64. The method of claim 1, wherein obtaining at least a second data element includes obtaining data representing a general transaction history associated with the given user.

65. The method of claim 1, wherein obtaining at least a second data element includes obtaining data representing a transaction history associated with a specific trip taken by the given user.

66. The method of claim 1, wherein obtaining at least a second data element includes obtaining data representing merchants favored by the given user.

67. The method of claim 1, wherein obtaining at least a second data element includes obtaining data representing merchants favored generally by the given user.

68. The method of claim 1, wherein obtaining at least a second data element includes obtaining data representing merchants favored during a specific trip taken by the given user.

69. The method of claim 1, wherein obtaining at least a second data element includes obtaining data indicating that the given user is a member of at least one program associated with at least one given merchant.

70. The method of claim 1, wherein obtaining at least a second data element includes obtaining data indicating that the given user is a member of at least one travel club.

71. The method of claim 1, wherein obtaining at least a second data element includes obtaining data indicating that the given user is a member of at least one frequent flyer program.

72. The method of claim 1, wherein obtaining at least a second data element includes obtaining data indicating that the given user is a member of at least one guest loyalty program.

73. The method of claim 1, wherein obtaining the at least second data element includes obtaining data representing at least one transaction executed by the given user previously to the given primary transaction.

74. The method of claim 1, wherein obtaining the at least second data element includes obtaining data representing content of at least one transaction executed by the given user previously to the given primary transaction.

75. The method of claim 1, wherein obtaining the at least second data element includes obtaining data representing a time of at least one transaction executed by the given user previously to the given primary transaction.

76. The method of claim 1, wherein obtaining the at least second data element includes obtaining data representing a location of at least one transaction executed by the given user previously to a given primary transaction.

77. The method of claim 1, wherein obtaining the at least second data element includes obtaining data representing a travel itinerary associated with the given user.

78. The method of claim 1, wherein obtaining the at least second data element includes obtaining data representing a predefined itinerary associated with the given user.

79. The method of claim 1, wherein obtaining the at least second data element includes obtaining data representing an itinerary defined by the user.

80. The method of claim 1, wherein obtaining the at least second data element includes obtaining data representing at least one of the following parameters of an itinerary associated with the given user: a route, an origin, a destination, at least one intermediate stop, a home location, a mode of travel, a vehicle type, a fuel capacity of a vehicle, and an average fuel consumption parameter associated with the vehicle.

81. The method of claim 1, further comprising inferring a travel itinerary associated with the given user based upon at least a second given primary transaction conducted previously to and in chronological proximity to the given primary transaction.

82. The method of claim 1, further comprising inferring a travel itinerary associated with the given user based upon at least a second given primary transaction conducted previously to and in geographic proximity to the given primary transaction.

83. The method of claim 1, further comprising projecting at least one expected future position parameter associated with the given user.

84. The method of claim 1, wherein projecting at least one expected future position includes analyzing an average rate of travel parameter associated with the given user.

85. The method of claim 1, wherein projecting at least one expected future position includes analyzing a vehicle fuel capacity parameter associated with the given user.

86. The method of claim 1, wherein projecting at least one expected future position includes analyzing an expected route parameter associated with the given user.

87. The method of claim 1, wherein projecting at least one expected future position includes analyzing a known route parameter associated with the given user.

88. The method of claim 1, further comprising projecting at least one expected arrival time parameter associated with the at least one based upon the expected future position parameter projected for the given user.

89. The method of claim 1, further comprising projecting at least one expected arrival time parameter associated with the given user.

90. The method of claim 1, wherein obtaining at least a second data element includes obtaining data suitable for projecting at least one expected future position associated with the given user.

91. The method of claim 1, wherein obtaining at least a second data element includes obtaining data suitable for projecting at least one expected arrival time associated with the given user.

92. The method of claim 1, wherein determining the at least one upsell item includes analyzing an expected future position parameter associated with the given user.

93. The method of claim 1, wherein determining the at least one upsell item includes analyzing an expected arrival time parameter associated with the given user.

94. The method of claim 1, further comprising projecting at least one expected need parameter associated with the given user.

95. The method of claim 1, further comprising projecting at least one expected need parameter associated with the given user, wherein projecting at least one expected need parameter includes analyzing an identity of subject matter associated with the at least one primary transaction.

96. The method of claim 1, wherein obtaining at least a second data element includes obtaining data suitable for projecting at least one expected need parameter associated with the given user.

97. The method of claim 1, wherein determining the at least one upsell item includes analyzing an expected need parameter associated with the given user.

98. The method of claim 1, wherein offering the at least one upsell item includes offering an upsell item selected based on analysis of at least one expected need parameter associated with the given user.

99. The method of claim 1, wherein offering the at least one upsell item includes offering an upsell item selected based on analysis of at least one expected future position parameter associated with the given user.

100. The method of claim 1, wherein offering the at least one upsell item includes offering an upsell item selected based on analysis of at least one expected arrival time parameter associated with the given user.

101. The method of claim 1, further comprising:
projecting at least one expected need parameter associated with the given user;
projecting at least one expected future position parameter associated with the given user; and
projecting at least one expected arrival time parameter associated with the given user.

102. The method of claim 1, further comprising analyzing a mode of travel parameter associated with the given user.

103. The method of claim 1, further comprising obtaining at least one status parameter pertaining to at least one merchant.

104. The method of claim 1, wherein obtaining at least a second data element includes obtaining at least one status parameter pertaining to at least one merchant, wherein the merchant is selected based on an indication that the merchant may be of interest to the given user.

105. The method of claim 1, further comprising obtaining data representing a vacancies parameter associated with at least one lodging establishment.

106. The method of claim 1, further comprising obtaining data representing a capacity parameter associated with at least one entertainment establishment.

107. The method of claim 1, further comprising obtaining data representing a preference parameter associated with the given user, wherein the preference parameter pertains to at least one entertainment establishment.

108. The method of claim 1, wherein obtaining at least one status parameter includes obtaining data representing a capacity parameter associated with at least one dining establishment.

109. The method of claim 1, wherein obtaining at least one status parameter includes obtaining data representing a customer-preference parameter associated with at least one dining establishment.

110. The method of claim 1, further comprising obtaining at least data representing a geographic location of the at least one merchant.

111. The method of claim 1, wherein obtaining at least a second data element includes obtaining at least data representing a geographic location of the at least one merchant.

112. The method of claim 1, wherein offering the at least one upsell item includes offering the at least one upsell item in real time with the at least one primary transaction.

113. The method of claim 1, wherein offering the at least one upsell item includes offering the at least one upsell item while goods are being transferred to the given user.

114. The method of claim 1, wherein offering the at least one upsell item includes offering the at least one upsell item after goods have been transferred to the given user.

115. The method of claim 1, wherein offering the at least one upsell item includes offering the at least one upsell item after the given user has resumed a trip.

116. The method of claim 1, wherein offering the at least one upsell item includes offering the at least one upsell item other than in real time with the at least one primary transaction.

117. The method of claim 1, wherein offering the at least one upsell item includes offering the at least one upsell item after determining a travel direction associated with the given user.

118. The method of claim 1, wherein offering the at least one upsell item includes offering the at least one upsell item after inferring a travel itinerary associated with the given user.

119. The method of claim 1, wherein offering the at least one upsell item includes offering the at least one upsell item after confirming an inferred travel itinerary associated with the given user.

120. The method of claim 1, wherein offering the at least one upsell item includes offering the at least one upsell item using the self-service device.

121. The method of claim 1, wherein offering the at least one upsell item includes offering the at least one upsell item via a display device mounted on a stationary item not associated with the user.

122. The method of claim 1, wherein offering the at least one upsell item includes offering the at least one upsell item via a device equipped with a keypad configured to accept user input.

123. The method of claim 1, wherein offering the at least one upsell item includes offering the at least one upsell item via a device equipped with a display that is adapted to accept user input via at least one soft key.

124. The method of claim 1, wherein offering the at least one upsell item includes offering the at least one upsell item via a paper receipt printed by a device used to conduct the given primary transaction.

125. The method of claim 1, wherein offering the at least one upsell item includes offering the at least one upsell item via a paper receipt printed by a printer.

126. The method of claim 1, wherein offering the at least one upsell item includes offering the at least one upsell item via a device other than the self-service device.

127. The method of claim 1, wherein offering the at least one upsell item includes offering the at least one upsell item via at least one of the following: a wireless communications device, a PDA, an in-vehicle navigation system, an in-vehicle communication system a handheld navigation device, a handheld GPS unit, a satellite-based television system, a satellite-based radio system, and a satellite-based telephone system.

128. The method of claim 1, wherein offering the at least one upsell item includes transmitting the at least one upsell item audibly to the given user.

129. The method of claim 1, wherein offering the at least one upsell item includes offering the at least one upsell item audibly to the given user via a wireless link.

130. The method of claim 1, wherein offering the at least one upsell item includes transmitting the at least one upsell item audibly to the given user in response to a signal indicating physical presence of the given user.

131. The method of claim 1, wherein offering the at least one upsell item includes transmitting the at least one upsell item audibly by superimposing two inaudible ultrasonic signals upon one another so as to produce a single signal audible only in a physical position occupied by the given user.

132. The method of claim 1, wherein offering the at least one upsell includes audibly transmitting the at least one upsell item to the given user so that the upsell item is audible only to the given user.

133. The method of claim 1, further comprising offering the given user a choice between at least two scenarios under which to conduct the given primary transaction, wherein a first scenario provides that the given user may conduct the given primary transaction at a first cost to the user in exchange for the given user receiving at least one offer of an upsell item, and wherein at least a second scenario provides that the given user may conduct the given primary transaction at a second cost to the given user in exchange for receiving no offers of upsell item.

134. The method of claim 1, further comprising offering the given user a choice between at least two scenarios under which to conduct the given primary transaction, wherein a first scenario provides that the given user may conduct the given primary transaction at a first cost to the user in exchange for the given user receiving at least one offer of an upsell item, and wherein at least a second scenario provides that the given user may conduct the given primary transaction at a second cost to the given user in exchange for receiving no offers of upsell items, wherein the first cost is reduced relative to the second cost.

135. The method of claim 1, further comprising conducting the given primary transaction in accordance with a scenario selected by the given user, wherein the scenario is chosen from at least two possible scenarios.

136. The method of claim 1, further comprising enabling the given user to accept an offer of the at least one upsell item by responding to the self-service device.

137. The method of claim 1, further comprising enabling the given user to accept an offer of the at least one upsell item by responding to a device used to conduct at least one primary transaction.

138. The method of claim 1, further comprising enabling the given user to accept the at least one upsell item by pressing a key provided by the self-service device.

139. The method of claim 1, further comprising enabling the given user to accept an offer of the at least one upsell item by pressing a key provided by a device used to conduct the given primary transaction.

140. The method of claim 1, further comprising enabling the given user to accept an offer of the at least one upsell item by contacting at least one merchant on whose behalf the at least one upsell item is offered to the given user.

141. The method of claim 1, further comprising enabling the given user to accept an offer of the at least one upsell item by using a device other than the self-service device.

142. The method of claim 1, further comprising enabling the given user to accept an offer of the at least one upsell item by using a device other than a device used to conduct the at least one primary transaction.

143. The method of claim 1, further comprising providing the given user at least one code that enables the given user to accept the at least one upsell item by presenting the code to at least one merchant on whose behalf the at least one upsell item is offered.

144. The method of claim 1, further comprising receiving an acceptance of the at least one upsell item from the given user.

145. The method of claim 1, further comprising receiving an acceptance of the at least one upsell item from the given user in real time with the offering of the at least on upsell item.

146. The method of claim 1, further comprising receiving an acceptance of the at least one upsell item from the given user other than in real time with the offering of the at least one upsell item.

147. The method of claim 1, further comprising receiving an acceptance of the at least one upsell item from the given user during the course of the given primary transaction.

148. The method of claim 1, further comprising receiving an acceptance of the at least one upsell item from the given user during the course of the at least one primary transaction.

149. The method of claim 1, further comprising receiving an acceptance of the at least one upsell item from the given user during an exchange of goods associated with the given primary transaction.

150. The method of claim 1, further comprising obtaining representing an identity of at least one specific good involved in the given primary transaction.

151. The method of claim 1, further comprising obtaining data representing an identity of at least one specific service involved in the given primary transaction.

152. The method of claim 1, wherein determining the at least one upsell item includes utilizing data representing an identity of at least one specific good involved in the given primary transaction.

153. The method of claim 1, wherein determining the at least one upsell item includes utilizing data representing an identity of at least one specific service involved in the given primary transaction.

154. The method of claim 1, wherein offering the at least one upsell item includes offering at least one upsell item selected by utilizing data representing an identity of at least one specific good involved in the given primary transaction.

155. The method of claim 1, wherein offering the at least one upsell item includes offering at least one upsell item selected by utilizing data representing an identity of at least one specific service involved in the given primary transaction.

156. A program storage device readable by a machine, tangibly embodying a program of instructions executable by the machine to perform a method for providing at least one offer of at least one upsell item to users of a given self-service device, the method comprising at least the following:
 enabling at least initiation of a given primary transaction between a given user and the given self-service device communicably coupled to an upsell computing system, wherein the given primary transaction involves at least one of a specific good and a specific service obtained using the given self-service device;
 determining an identity of the given user via the upsell computing system;
 determining a geographic location of the given user when the given primary transaction is initiated;
 obtaining at least a second data element relating to the given user utilizing data representing the identity of the given user via the upsell computing system;
 determining the at least one upsell item utilizing, at least in part, the second data element and data representing the geographic position of the given user via the upsell computing system;
 encrypting at least the second data and data representing the identity of the given user via the upsell computing system when transmitting data from, to or between at least one data store; and
 offering the at least one upsell item to the given user via the given self-service device without communicating at least the second data element to the self-service device.

157. A system for providing at least one offer of at least one upsell item to users of a given self-service device, the system comprising at least the following:
 means for enabling at least initiation of a given primary transaction between a given user and the given self-service device communicably coupled an upsell computing system, wherein the given primary transaction involves at least one of a specific good and a specific service obtained using the given self-service device;
 means for determining an identity of the given user via the upsell computing system;

means for determining a geographic location of the given user when the given primary transaction is initiated;

means for obtaining at least a second data element relating to the given user utilizing data representing the identity of the given user via the upsell computing system;

means for determining the at least one upsell item utilizing, at least in part, the second data element and data representing the geographic position of the given user via the upsell computing system;

means for encrypting at least the second data and data representing the identity of the given user via the upsell computing system when transmitting data from, to or between at least one data store; and means for offering the at least one upsell item to the given user via the given self-service device without communicating at least the second data element to the given self-service device.

* * * * *